United States Patent
Watanabe et al.

(10) Patent No.: US 7,516,203 B2
(45) Date of Patent: Apr. 7, 2009

(54) NETWORK CONTROL VERIFICATION SYSTEM, CONTROL COMMUNICATION TERMINAL, SERVER APPARATUS, AND NETWORK CONTROL VERIFICATION METHOD

(75) Inventors: Toshiyuki Watanabe, Tokyo (JP); Takashi Kitajima, Ibaraki (JP); Katsutoshi Sakao, Kanagawa (JP); Yasunori Matsui, Kanagawa (JP); Hirokatsu Kimata, Tokyo (JP); Satoru Maeda, Kanagawa (JP)

(73) Assignee: Sony Corporation (JP)

( * ) Notice: Subject to any disclaimer, the term of this patent is extended or adjusted under 35 U.S.C. 154(b) by 385 days.

(21) Appl. No.: 10/498,205

(22) PCT Filed: Oct. 8, 2003

(86) PCT No.: PCT/JP03/12858
§ 371 (c)(1),
(2), (4) Date: Mar. 17, 2005

(87) PCT Pub. No.: WO2004/034700
PCT Pub. Date: Apr. 22, 2004

(65) Prior Publication Data
US 2005/0165918 A1 Jul. 28, 2005

(30) Foreign Application Priority Data
Oct. 11, 2002 (JP) ............................. 2002-298857
Oct. 18, 2002 (JP) ............................. 2002-304086

(51) Int. Cl.
*G06F 15/173* (2006.01)
*G06F 15/16* (2006.01)

(52) U.S. Cl. ........................ 709/223; 709/203; 709/217; 709/219; 709/227

(58) Field of Classification Search ................. 709/201, 709/203, 217, 219, 223, 224, 225, 227
See application file for complete search history.

(56) References Cited

U.S. PATENT DOCUMENTS 6,192,257 B1 * 2/2001 Ray ........................... 455/566

(Continued)

FOREIGN PATENT DOCUMENTS

JP 5-103233 A 4/1993

(Continued)

OTHER PUBLICATIONS

Peter M Corcoran et al: "User Interface Technologies for Home Appliances and Networks" IEEE Transactions on Consumer Electronics, vol. 44, No. 3, Aug. 1998, pp. 679-685.
Supplementary European Search Report, EP 03 75 1371.

*Primary Examiner*—Saleh Najjar
*Assistant Examiner*—Farzana Huq
(74) *Attorney, Agent, or Firm*—Lerner, David, Littenberg, Krumholz & Mentlik, LLP

(57) ABSTRACT

This invention relates to a network control verification system, a control communication terminal, a server apparatus, and a network control verification method whereby a user away from a recording apparatus is notified of information such as whether the recording apparatus has completed unattended recording of a broadcast program as reserved. Specifically, a recording/reproducing apparatus 4 records a broadcast program to a recording medium in accordance with unattended recording reservation settings. The apparatus 4 extracts one picture frame from the pictures recorded on the recording medium and turns the extracted frame into a thumbnail image. The recording/reproducing apparatus 4 then transmits an e-mail including a recording start date, a recording start time, a recording stop time, a broadcast channel, and a recording mode regarding the recorded broadcast program to a mobile phone 53 together with an attachment of the thumbnail. By checking the e-mail sent to the mobile phone 53, the user can verify that the recording has been completed as reserved. This invention may be applied advantageously to networked electronic apparatuses.

14 Claims, 30 Drawing Sheets

U.S. PATENT DOCUMENTS

| | | | |
|---|---|---|---|
| 6,288,716 B1* | 9/2001 | Humpleman et al. | 715/733 |
| 6,510,212 B2* | 1/2003 | Ito et al. | 379/102.03 |
| 6,748,278 B1* | 6/2004 | Maymudes | 700/17 |
| 6,801,507 B1* | 10/2004 | Humpleman et al. | 370/257 |
| 6,850,149 B2* | 2/2005 | Park | 340/7.1 |
| 6,898,424 B2* | 5/2005 | Nishida | 455/420 |
| 6,968,365 B2* | 11/2005 | Hollstrom et al. | 709/217 |
| 7,010,294 B1* | 3/2006 | Pyotsia et al. | 455/420 |
| 7,136,914 B2* | 11/2006 | Motoyama | 709/223 |
| 7,197,579 B2* | 3/2007 | Saito et al. | 710/15 |
| 7,237,029 B2* | 6/2007 | Hino et al. | 709/227 |
| 7,245,271 B2* | 7/2007 | Nixon et al. | 345/2.1 |
| 2001/0029532 A1* | 10/2001 | Kato et al. | 709/223 |
| 2002/0059596 A1* | 5/2002 | Sano et al. | 725/39 |
| 2002/0131569 A1 | 9/2002 | Ito et al. | |
| 2003/0023671 A1* | 1/2003 | Abdulrahiman et al. | 709/203 |
| 2003/0073412 A1* | 4/2003 | Meade, II | 455/70 |
| 2003/0135539 A1* | 7/2003 | Kondo et al. | 709/201 |

FOREIGN PATENT DOCUMENTS

| | | | |
|---|---|---|---|
| 10-164487 | A1 | 6/1998 | JP |
| 2000-350142 | A1 | 12/2000 | JP |
| 2001-8276 | A1 | 1/2001 | JP |
| 2001-136452 | A1 | 5/2001 | JP |
| 2001-326881 | A | 11/2001 | JP |
| 2002-57686 | A1 | 2/2002 | JP |
| 2002-78047 | A1 | 3/2002 | JP |
| 2002-84483 | A1 | 3/2002 | JP |
| 2002-118805 | A | 4/2002 | JP |
| 2002-158951 | A1 | 5/2002 | JP |
| 2002-290630 | A | 10/2002 | WO |
| 00/25241 | | 5/2000 | WO |
| 00/76130 | | 12/2000 | WO |
| 01/41483 | | 6/2001 | WO |
| 02/13527 | | 2/2002 | |

* cited by examiner

FIG. 11

| SELECT EXTRACTION TIME | 1 MIN. LATER | ● 3 MIN. LATER | 5 MIN. LATER | 10 MIN. LATER ▲ |

NETWORK CONTROL VERIFICATION SYSTEM, CONTROL COMMUNICATION TERMINAL, SERVER APPARATUS, AND NETWORK CONTROL VERIFICATION METHOD

CROSS-REFERENCE TO RELATED APPLICATIONS

The present application is a national stage application under 35 U.S.C. § 371 of International Application No. PCT/JP2003/12858, filed Oct. 8, 2003, which claims priority from Japanese Application No. P2002-298557, filed Oct. 11, 2002, and Japanese Application No. P2002-304086, filed Oct. 18, 2002, the disclosures of which are hereby incorporated by reference herein.

BACKGROUND OF THE INVENTION

1. Technical Field

The present invention relates to a network control verification system, a control communication terminal, a server apparatus, and a network control verification method for effecting remote control over electronic devices installed illustratively in the household via a communication network such as the Internet.

2. Background Art

There already exist unattended recording reservation apparatuses and program recording result display-apparatuses (e.g., refer to Japanese Patent Laid-open No. 2000-350142, pp. 2-3, FIG. 1) whereby reservations for unattended TV program recording are received from a remotely-located terminal PC through a telephone line and whereby a table of recorded programs according to the reservations is displayed on the terminal PC.

There are other related arrangements designed to receive program guide information from a TV program information providing company over the Internet, to record the received information by a video tape recorder, and to display a table of what was recorded (e.g., refer to Japanese Patent Laid-open No. Hei 10-164487, pp. 5-6); to provide broadcast programs recorded by an external server to a user terminal via the Internet (e.g., refer to Japanese Patent Laid-open No. 2002-84483, pp. 7-8); or to use a remote controller to set and modify unattended recording reservations on a video tape recorder through the Internet (e.g., Japanese Patent Laid-open No. 2001-8276, pp. 5-6).

Furthermore, there have been proposals which allow an Internet-ready portable data terminal to execute remote control over starting, stopping and reserving the unattended recording of broadcast programs onto a hard disc drive while having recording status (i.e., recording being underway or stopped, recording reservations being set or absent, and details of recording reservations) displayed on a mobile phone (e.g., refer to Japanese Patent Laid-open No. 2002-57686, pp. 6-9).

As outlined above, diverse remote control systems have been proposed, each allowing the user away from home to operate a portable communication terminal such as a mobile phone in order to remotely control a VTR, an air conditioner, or other electronic or electronic devices in the user's household by way of a public switched network and/or the Internet. Many of these systems, however, are confronted with such inherent problems as wasteful power dissipation, complicated system configurations, and high costs involved.

In many cases, electronic appliances subject to remote control must be powered continuously so as to be started up promptly as instructed. The system often needs to be extensive in scale using various devices for rapid and accurate remote control purposes.

Some solutions to the problems above have been proposed. One such solution, disclosed illustratively in Japanese Patent Laid-open No. 2002-078047, involves a simply-structured, inexpensively-configured remote control system for remotely controlling household electronic devices targeted for control without wasteful power dissipation.

The need to resolve the above-mentioned problems of power dissipation and extensive system configuration has entailed users' requirements further regarding the remote control system. Specifically, it is desired that household electronic devices such as VTR's be remotely operated more rapidly and accurately than before. Users of portable communication terminals are also desirous of verifying, away from home, whether any electronic device set for remote control is correctly operating in real time.

With today's widespread use of mobile phones and PDA's (personal digital assistants) having communication capabilities, a need has been recognized for a system which remotely controls electronic devices such as the VTR using such portable communication terminals and which allows the user to verify remotely whether the devices targeted for control are correctly operating.

SUMMARY OF THE INVENTION

The present invention has been made in view of the above circumstances and provides a network control verification system, as well as a control communication terminal, a server apparatus, and a network control verification method for use with the inventive system which enables electronic devices to be remotely controlled through a communication network and which is operable in real time while permitting reliable verification of remote control status.

In carrying out the invention and according to one aspect thereof, there is provided a network control verification system including a portable communication terminal and a control communication terminal connected to the system via a communication network, the control communication terminal being connected to an electronic apparatus which can be controlled through the control communication terminal. The portable communication terminal includes: a control information transmitter for transmitting control information about the electronic apparatus to the control communication terminal upon receipt of, and in keeping with, an instruction input by a user with regard to the electronic apparatus; and a displaying mechanism for receiving and displaying result information representative of results of control over the electronic apparatus from the control communication terminal. The control communication terminal includes: a control information acquiring mechanism for receiving control information about the electronic apparatus from the portable communication terminal and supplying the received control information to the electronic apparatus; a result information acquiring mechanism for acquiring result information representative of results of control executed over the electronic apparatus in accordance with the control information; and a result information transmitter for transmitting the result information to the portable communication terminal.

As outlined above, the network control verification system of this invention has its portable communication terminal and control communication terminal connected to a wide-area communication network. The control communication terminal is connected to the electronic apparatus targeted for control by the system. A receiving mechanism of the portable communication terminal receives an instruction input by the user. The control information transmitter of the portable communication terminal transmits control information about the electronic apparatus to the control communication terminal over the communication network upon receipt of and in keeping with the user's instruction.

A control information receiving mechanism of the control communication terminal receives the control information from the portable communication terminal. The received control information is supplied to the target electronic apparatus by a control information supplying mechanism of the control communication terminal so that the electronic apparatus is remotely controlled substantially in real time by the portable communication terminal.

A result information acquiring mechanism of the control communication terminal acquires result information representative of results of remote control executed over the electronic apparatus, e.g., information as to how the apparatus has been operating. The result information thus acquired is transmitted by a result information transmitter of the control communication terminal over the communication network to the portable communication terminal which originated the control information. The returned information is output by an outputting means of the portable communication terminal as a notice to the terminal user.

The arrangements above enable the user away from home to remotely control the electronic apparatus at home in a substantially real-time manner using the portable communication terminal. The portable communication terminal acquires from the control communication terminal the result information representing the results of control over the electronic apparatus, and outputs the acquired information for the user to verify the manner in which the electronic apparatus has been controlled in substantially real-time fashion.

Preferably, the network control verification system of the invention may further include a server apparatus which is connected to the communication network and which mediates communication between the portable communication terminal and the control communication terminal. The server apparatus may include: an information notifying mechanism which, upon receiving the control information from the control information transmitter of the portable communication terminal, notifies the control communication terminal that the control information has been received; an information transmitter for transmitting the control information to the control communication terminal in response to a request from the control communication terminal to deliver the control information; a result notifying mechanism which, upon receiving the result information from the control communication terminal, notifies the portable communication terminal that the result information has been received; and a result-transmitter for transmitting the result information to the portable communication terminal in response to a request from the portable communication terminal to deliver the result information.

The network control verification system of the preferred structure above has the communication between the portable communication terminal and the control communication terminal mediated by the server apparatus connected to the communication network. The intervention of the server apparatus eliminates the need for the portable communication terminal and control communication terminal directly to communicate with each other, and ensures reliable delivery of control information and result information from one terminal to another; there will be no cases where the transmitting terminal would fail to deliver information to the other terminal because the latter is being busy.

Preferably, the electronic apparatus connected to the control communication terminal of the inventive network control verification system may be a recording apparatus which records an externally supplied information signal to a recording medium. If the control information from the portable communication terminal constitutes a recording start instruction, then the result information acquiring mechanism of the control communication terminal may acquire information about the information signal in effect when the recording of the information signal is started.

Illustratively, the electronic apparatus to be controlled by the control communication terminal of this network control verification system may be a VTR, a hard disc drive, or other suitable recording apparatus capable of recording the information signal to the recording medium. Pieces of information in effect when the recording is started and then subsequently stopped may be acquired and returned as the result information.

For example, where a TV broadcast program is recorded to the recording medium, a picture of the program in effect when its recording is started and another picture of the program in effect when its recording is stopped may be returned to the portable communication terminal. The user of the portable communication terminal is then able to verify whether unattended broadcast program recording and other related processes have been correctly performed.

BRIEF DESCRIPTION OF THE DRAWINGS

FIG. 11 is a schematic view of a typical display appearing on a fluorescent character display tube;

DETAILED DESCRIPTION

Best Mode for Carrying out the Invention

First Embodiment

The first embodiment of this invention will now be described with reference to the accompanying drawings.

Figure 1:
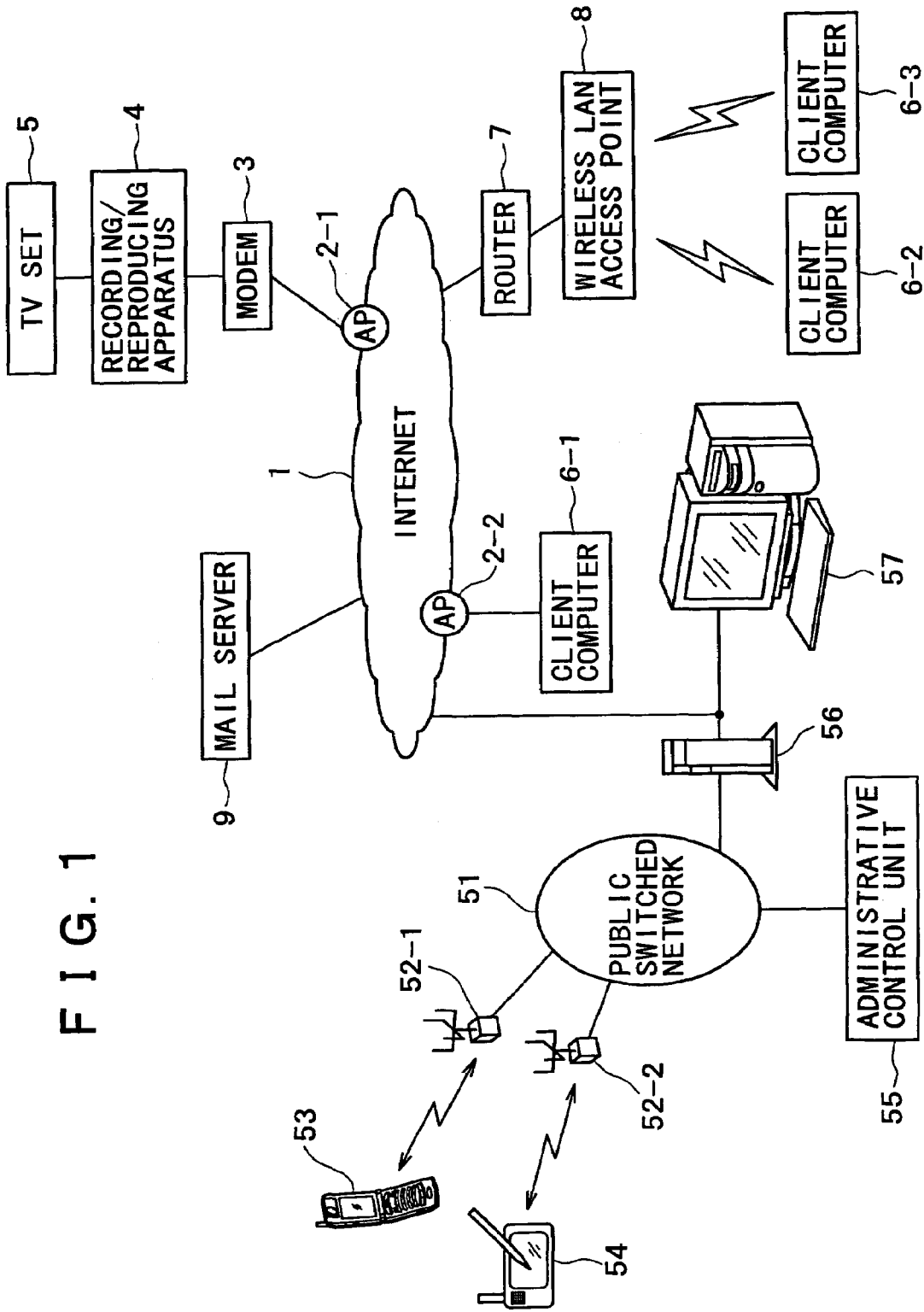
FIG. 1 is a schematic view showing a typical configuration of a service offering system practiced as a first embodiment of this invention.

FIG. 1 schematically shows a typical configuration of a service offering system practiced as the first embodiment of this invention. In FIG. 1, a recording/reproducing apparatus 4 is connected to the Internet 1 through a modem 3 and an access point (AP) 2-1. A TV set 5 is connected to the recording/reproducing apparatus 4. Through the latter connection, pictures and sounds reproduced by the recording/reproducing apparatus 4 are output to the TV set 5. In the example of FIG. 1, a broadcast program may be recorded by the recording/reproducing apparatus 4 to a recording medium. In that case, the recording/reproducing apparatus 4 transmits notice that the broadcast program has been recorded toward an electronic apparatus that may be utilized by the user (e.g., mobile phone 53, portable information terminal 54, or client computers 6-1 through 6-3), whereby the user is notified of the completion of the recording. The notice includes a thumbnail formed by a single frame of the recorded broadcast program.

The client computer 6-1 is connected to an access point (AP) 2-2. The client computer 6-1 is a general-purpose personal computer that is linked to the Internet 1 through the access point 2-2.

A wireless LAN (local area network) access point (AP) 8 is connected to the Internet 1 via a router 7. The wireless LAN access point 8 is set up illustratively inside a coffee shop to provide an Internet connection service (known as the hot spot service). The client computers 6-2 and 6-3 are also general-purpose personal computers that are connected to the Internet 1 through the wireless LAN access point 8.

A mail server 9 is also connected to the Internet 1. The mail server 9 is administered illustratively by an Internet service provider and serves as a repeater of e-mail exchanges between the apparatuses connected to networks including, the Internet 1. In the example of FIG. 1, it is assumed that the user of the recording/reproducing apparatus 4 subscribes to the Internet service provider administering the mail server 9. Thus all e-mails originated by the recording/reproducing apparatus 4 are transmitted via the mail server 9.

Shown on the left-hand side in FIG. 1 is a network system to which the mobile phone 53 and portable information terminal 54 are connected. The network system includes base stations 52-1 and 52-2, i.e., fixed wireless stations each allocated to one of the cells constituting a communication service area.

The mobile phone 53 and portable information terminal 54, both mobile wireless stations, are connected wirelessly to the base stations 52-1 and 52-2 respectively on a W-CDMA (Wideband-Code Division Multiple Access) basis. Using the frequency band of 2 GHz, the mobile wireless stations may transmit large quantities of data at data transfer rates of up to 2 Mbps.

Designed for wireless, high-speed communication of massive data under the W-CDMA scheme, the mobile phone 53 and portable information terminal 54 provide not only speech communication but also e-mail exchanges, browsing of simple-format website pages, picture exchanges, and other kinds of data communication. Although the setup in FIG. 1 is shown to include only two mobile wireless stations (mobile phone 53 and portable information terminal 54), there can be numerous mobile wireless stations utilized in practice.

The base stations 52-1 and 52-2 are wired to a public switched network 51. A large number of wired subscriber terminals, computer networks, and in-house networks, not shown, are connected to the public switched network 51.

An access server 56 of an Internet service provider is also connected to the public switched network. Through the access server 56, the mobile phone 53 and portable information terminal 54 can be connected to the Internet 1. A mail server 57 is also connected to the access server 56. Upon receipt of e-mails from other mail servers (e.g., mail server 9) over the Internet 1, the mail server 57 transfers the received e-mails to the mobile phones (e.g., mobile phone 53) or portable information terminals (e.g., portable information terminal 54) corresponding to the destination addresses of the e-mails in question.

On receiving e-mails from mobile phones (e.g., mobile phone 53) or portable information terminals (e.g., portable information terminal 54), the mail server 57 transfers the received e-mails to the mobile phones (e.g., mobile phone 53), portable information terminals (e.g., portable information terminal 54), or mail servers (e.g., mail server 9) corresponding to the destination addresses of the e-mails in question.

The mobile phone 53 and portable information terminal 54 communicate with the base stations 52-1 and 52-2 using a simple-format transport protocol of 2 Mbps. For communication from the base stations 52-1 and 52-2 to the servers through the Internet 1, the mobile phone 53 and portable information terminal 54 utilize the TCP/IP.

An administrative control unit 55 is connected through the public switched network 51 to wired subscriber terminals, mobile phone 53 and portable information terminal 54. With such connections established, the administrative control unit 55 performs authentication and billing processes with regard to the mobile phone 53 and portable information terminal 54.

In the description that follows, the base-stations 52-1 and 52-2 will be simply called the base station 52 if there is no need to distinguish therebetween. Likewise, the client computers 6-1 through 6-3 will be simply referred to as the client computer 6 and the access points 2-1 and 2-2 as the access point 2.

Figure 2:
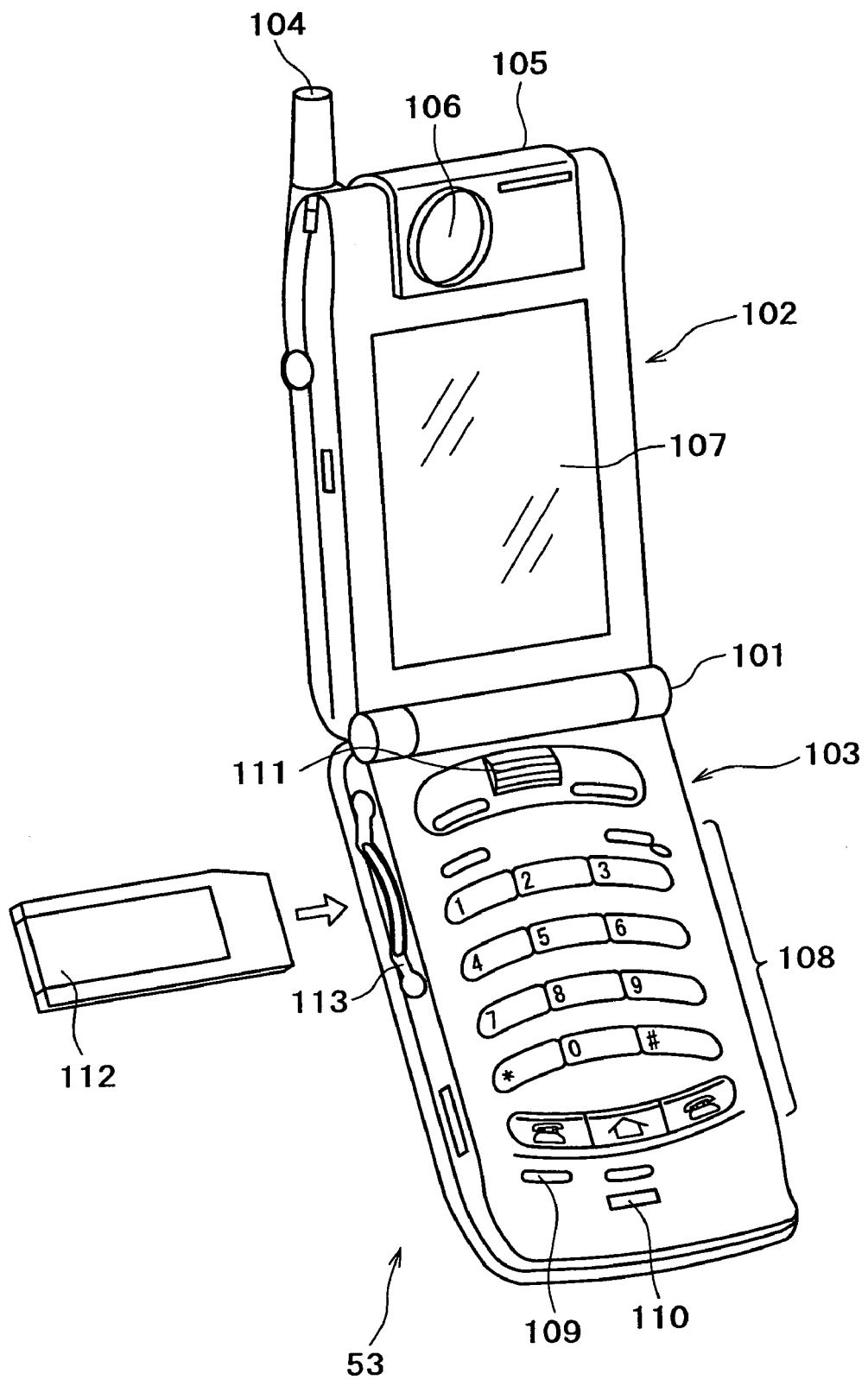
FIG. 2 is a perspective external view of a mobile phone.

An external structure of the mobile phone 53 is described below. As shown in FIG. 2, the mobile phone 53 is made up of a display unit 102 and a body 103 coupled by a hinge unit 101. The two components fold up when swung on the hinge unit 101 in the middle.

The display unit 102 has an antenna 104 mounted retractably on its top left part for signal transmission and reception. Radio waves are exchanged with the base station 52 by way of the antenna 104.

The display unit 102 has a camera unit 105 mounted on its top center part in a manner rotatable over a range of about 180 degrees. A CCD (charge coupled device) camera 106 of the camera unit 105 is pointed to a desired object to take its pictures.

Figure 3:
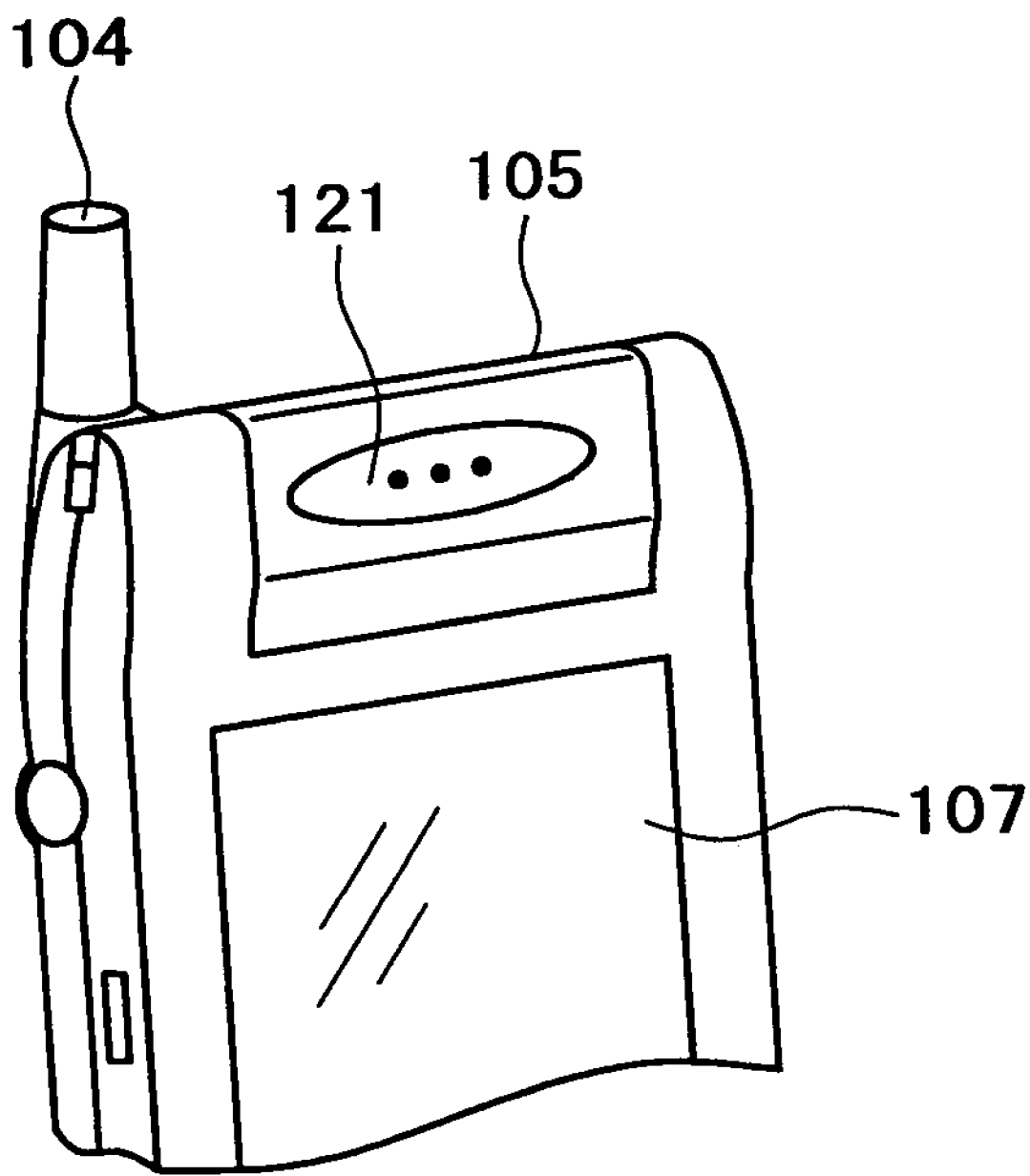
FIG. 3 is a perspective view of the mobile phone of FIG. 2 as its camera unit is swung into position.

When the user rotates the camera unit 105 of the display unit 102 by about 180 degrees into position, a speaker 121 at the back center of the camera unit 105 faces the front as shown in FIG. 3. This puts the mobile phone in its regular voice communication mode.

The display unit 102 has a liquid crystal display 107 mounted on its front. The display 107 indicates diverse kinds of information such as radio-receiving conditions, remaining battery capacity, names and telephone numbers of people listed in a telephone directory, a call history, pages of simple-format websites, pictures taken by the CCD camera 106 of the camera unit 105, and pictures sent over the public switched network 51 by servers, portable information terminal 54, digital cameras, video cameras or other mobile phones. The liquid crystal display 107 also displays e-mail contents. According to this invention, a typical e-mail content to be displayed is a recording end notice received from the recording/reproducing apparatus 4.

The body 103 is furnished on its surface with operation keys 108 including numeric keys ([0] through [9]), an off-hook key, a redial key, an on-hook/power key, a clear key, and an e-mail key. The user may manipulate the operation keys 108 to input desired instructions.

Under the operation keys 108 on the body 103 are a memo button 109 and a microphone 110. Pushing the memo button 109 allows the opposite party's speech to be recorded. The microphone 110 picks up the user's voice during a call.

Above the operation keys 108 on the body 103 is a rotatable jog dial 111 mounted in a manner slightly protruding from the surface of the body 103. Shown in FIG. 4 as viewed laterally, the jog dial 111 can be turned in an arrowed direction "a" and depressed in an arrowed direction "b" (i.e., into the body 103).

With the jog dial 111 rotated, the mobile phone 53 correspondingly executes operations such as scrolling of telephone directory lists and e-mail contents, turning of simple-format website pages, feeding of pictures, selection of items, and movement of the cursor. Depressing the jog dial 111 causes the mobile phone 53 to finalize the item being selected or to perform other relevant actions.

For example, when the user rotates the jog dial 111, the dial action selects one of a plurality of telephone numbers listed in the telephone directory on the liquid crystal display 107. Depressing the jog dial 111 where desired finalizes the telephone number currently selected and causes the phone to place a call automatically to the telephone number in question.

Figure 4:
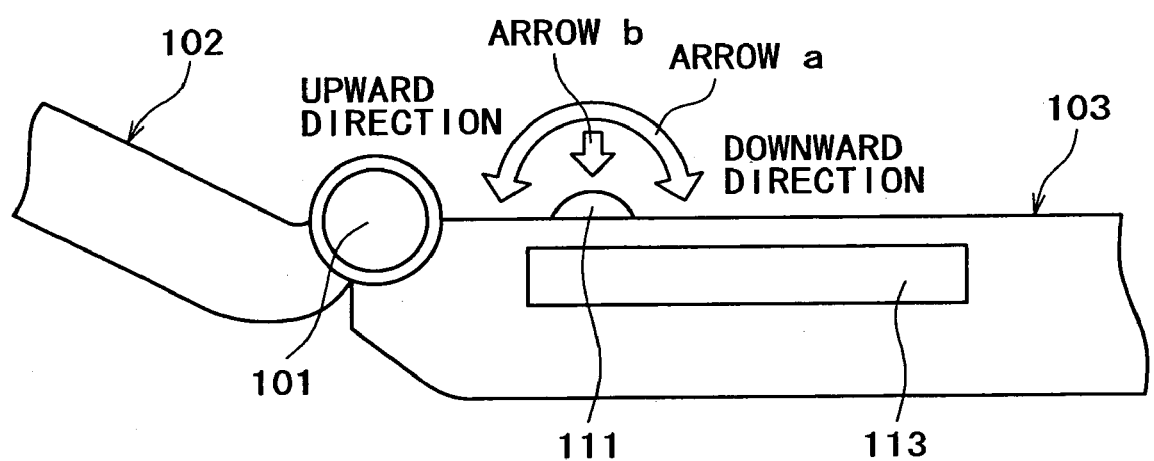
FIG. 4 is a side view of the mobile phone in FIG. 2.

In the description that follows, the rotation of the jog dial 111 toward the hinge unit 101 will be referred to as the upward direction rotation and the reverse rotation as the downward direction rotation, as shown in FIG. 4.

Returning to FIG. 2, the body 103 is furnished on its back with a battery pack, not shown. When the on-hook/power key is turned on, the power pack starts powering the phone circuitry and puts the phone in an operable state.

The top left-hand side part of the body 103 has a Memory Stick slot 113 that removably accommodates a Memory Stick (registered trademark of Sony Corporation) 112. Pushing the memo button 109 allows the opposite party's speech to be stored into a Memory Stick 112 in the slot 113 or permits recording of e-mails, simple-format website pages, pictures taken by the CCD camera 106, or wirelessly-received pictures into the Memory Stick 112.

The Memory Stick 112 is a flash memory card developed by Sony Corporation, this applicant. The Memory Stick 112 is formed by flash memory elements constituting an EEPROM (electrically erasable and programmable read only memory), a nonvolatile memory on which data may be rewritten and erased electrically. Diverse kinds of data such as pictures, voices and music may be written to and read from the Memory Stick 112 through a 10-pin terminal.

The Memory Stick 112 adopts a proprietary serial protocol that ensures compatibility with different host devices having their internal flash memory specifications modified for greater storage capacity. As such, the Memory Stick 112 provides high-speed performance at write speeds of up to 1.5 MB/S and read speeds of up to 2.45 MB/S. In addition, the memory Stick 112 is equipped with a write-protect switch to ensure high reliability.

By using the removable Memory Stick 112, the mobile phone 53 can share data with other electronic apparatuses capable of accommodating this memory device.

Figure 5:
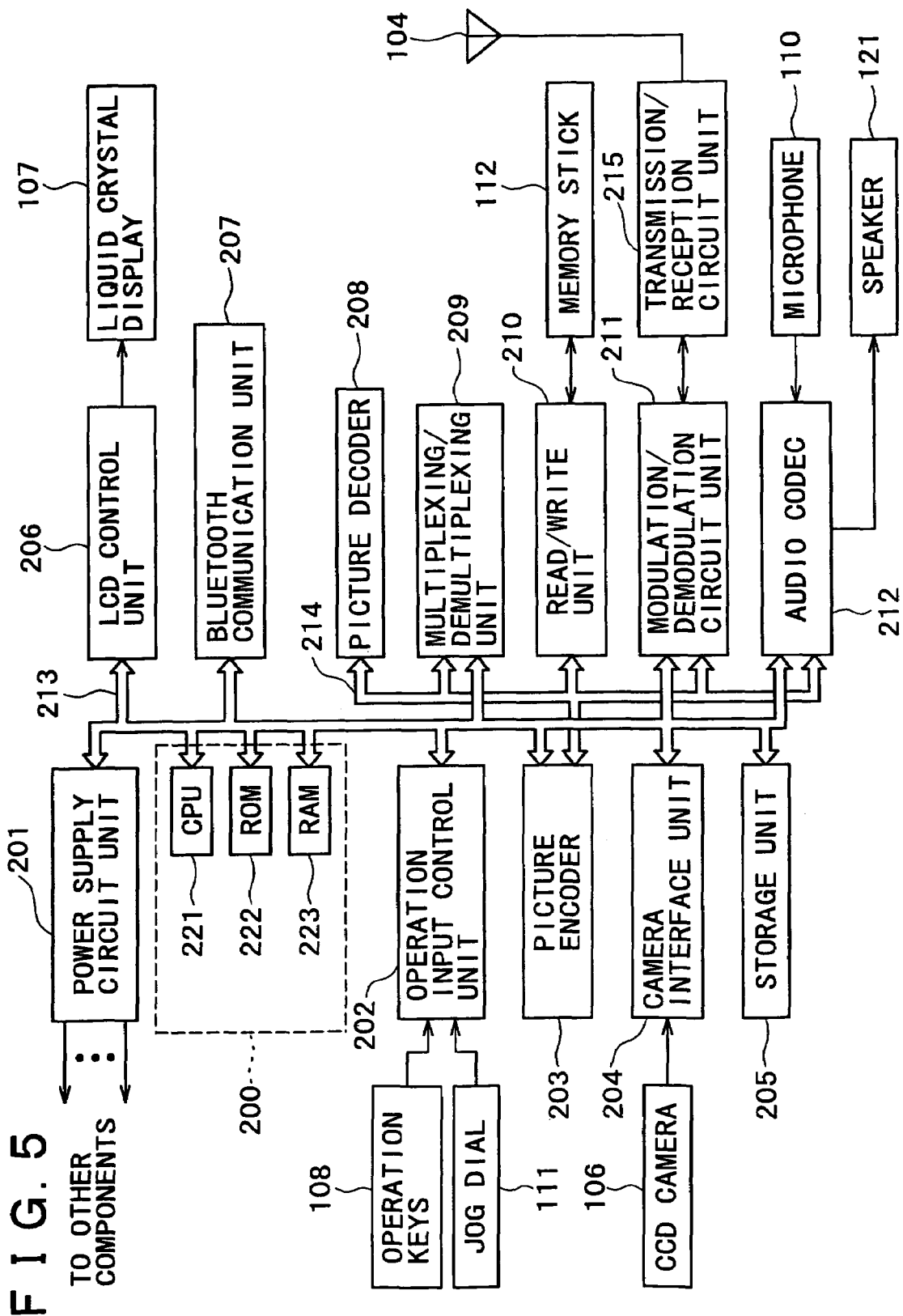
FIG. 5 is a block diagram depicting a typical structure of the mobile phone in FIG. 2.

FIG. 5 depicts a typical internal structure of the mobile phone 53 in FIG. 2. As shown in FIG. 5, the mobile phone 53 has a main control unit 200 that provides overall control of the display unit 102 and body 103 making up the phone, the main control unit 200 being connected via a main bus 213 to a power supply circuit unit 201, an operation input control unit 202, a picture encoder 203, a camera interface unit 204, a storage unit 205, an LCD (liquid crystal display) control unit 206, a Bluetooth communication unit 207, a picture decoder 208, a multiplexing/demultiplexing unit 209, a read/write unit 210, a modulation/demodulation circuit unit 211, and an audio codec 212. The picture encoder 203, picture decoder 208, multiplexing/demultiplexing unit 209, modulation/demodulation circuit unit 211, and audio codec 212 are interconnected by means of a synchronous bus 214.

When the on-hook/power key is turned on by the user, the power supply circuit unit 201 taps the battery pack to power the internal circuitry. This puts the mobile phone 53 in an operable state.

Under control of the main control unit 200 formed by a CPU (central processing unit) 221, a ROM (read only memory) 222 and a RAM (random access memory) 223, the mobile phone 53 has the microphone 110 pick up a voice signal in voice communication mode, gets the voice signal converted into digital audio data by the audio codec 212, subjects the digital audio data to spread-spectrum encoding by the modulation/demodulation circuit unit 211, causes the encoded data to undergo digital-to-analog conversion and frequency conversion by a transmission/reception circuit unit 215, and transmits the processed data from the antenna 104.

Also in voice communication mode, the mobile phone 53 receives signals via the antenna 104, gets the received signal amplified and subjected to frequency conversion and analog-to-digital conversion, subjects the processed signal to spread-spectrum decoding by the modulation/demodulation circuit unit 211, and outputs the decoded data from the speaker 121 through the audio codec 212.

In data communication mode, the mobile phone 53 transmits e-mails as follows: text data of an e-mail input by operation of the operation keys 108 and jog dial 111 are forwarded to the main control unit 200 via the operation input control unit 202. The main control unit 200 subjects the text data to spread-spectrum encoding by the modulation/demodulation circuit unit 211. The encoded data are subjected to digital-to-analog conversion and frequency conversion by the transmission/reception circuit unit 215. The converted data are transmitted to the base station 52 (FIG. 1) via the antenna 104.

The mobile phone 53 receives e-mails in data communication mode as follows: a signal received from the base station 52 via the antenna 104 is subjected to spread-spectrum decoding by the modulation/demodulation circuit unit 211, whereby the original text data are restored. The text data are output through the LCD control unit 206 to the liquid crystal display 107 for display as an e-mail. Thereafter, depending on the user's operation, the mobile phone 53 may store the received e-mail into the Memory Stick 112 through the read/write unit 210.

When transmitting picture data in data communication mode, the mobile hone 53 allows the CCD camera 106 to pick up picture data and causes the camera interface unit 204 to supply the picture data to the picture encoder 203.

When not transmitting picture data, the mobile phone 53 may have the CCD camera 106 pick up picture data and may get the picture data displayed directly on the liquid crystal display 107 by way of the camera interface unit 204 and LCD control unit 206.

The picture encoder 203 encodes picture data fed from the CCD camera 106 through a suitable compression encoding scheme such as MPEG (Moving Picture Experts Group)-2 or MPEG-4. The encoded picture data are output to the multiplexing/demultiplexing unit 209. Concurrently, the mobile phone 53 causes the microphone 110 to pick up sound during imaging by the CCD camera 106 and outputs the collected sound as digital audio data to the multiplexing/demultiplexing unit 209 through the audio codec 212.

The multiplexing/demultiplexing unit 209 multiplexes the encoded picture data coming from the picture encoder 203 and the audio data from the audio codec 212 using a suitable multiplexing method. The resulting multiplexed data are sent to the modulation/demodulation circuit unit 211 for spread-spectrum encoding. The data thus encoded are fed to the transmission/reception circuit unit 215 for digital-to-analog conversion and frequency conversion. The data thus converted are transmitted via the antenna 104.

For the reception in data communication mode of data in a moving picture file linked illustratively to a simple-format website, the mobile phone 53 first receives a signal from the base station 52 via the antenna 104. The received signal is fed to the modulation/demodulation circuit unit 211 for spread-spectrum decoding whereby multiplexed data are acquired. The multiplexed data thus obtained are output to the multiplexing/demultiplexing unit 209.

The multiplexing/demultiplexing unit 209 demultiplexes the multiplexed data into encoded picture data and audio data. The encoded picture data are fed to the picture decoder 208 while the audio data are supplied to the audio codec 212 through the synchronous bus 214.

The picture decoder 208 decodes encoded picture data using a suitable decoding method based on the relevant encoding method such as MPEG-2 or MPEG-4. The decoded data are fed to the liquid crystal display 107 via the LCD control unit 206, whereby the moving picture data in the moving picture file linked illustratively to a simple-format website are displayed.

Concurrently, the audio codec 212 converts the audio data to an analog audio signal and sends the converted signal to the speaker 121. This provides reproduction of the audio data in the moving picture file from the linked simple-format website.

As in the case of e-mails, the mobile phone 53 may record the received data from the linked simple-format website or like sources to the Memory Stick 112 by way of the read/write unit 210 in keeping with the user's operation.

For the transmission of a still picture as an attachment to an e-mail, the picture encoder 203 encodes still picture data from the CCD camera 106 using a suitable compression encoding method based illustratively on JPEG (Joint Photographic Experts Group) standards. The encoded picture data are output to the modulation/demodulation circuit unit 211 for spread-spectrum encoding. The encoded picture data past the modulation/demodulation circuit unit 211 are sent to the transmission/reception circuit unit 215 for digital-to-analog conversion and frequency conversion. The data thus converted are transmitted via the antenna 104.

For the reception of an e-mail including a still picture attachment in data communication mode, the mobile phone 53 first receives a signal from the base station 52 via the antenna 104. The received signal is fed to the modulation/demodulation circuit unit 211 for spread-spectrum decoding. The resulting picture data are sent from the modulation/demodulation circuit unit 211 to the picture decoder 208.

The picture decoder 208 decodes the encoded picture data it received using a suitable decoding method based on the relevant encoding method such as JPEG, thereby generating still picture data. The decoded still picture data are output through the LCD control unit 206 to the liquid crystal display 107, whereby the still picture data included in the e-mail are displayed.

The storage unit 205 accommodates programs received from servers for control of the mobile phone 53, audio data constituting a so-called ringing melody for announcing the receipt of a call (or e-mail), and picture data.

The Bluetooth communication unit 207 carries out Bluetooth-compliant communication processing.

The CPU 221 performs various processes in accordance with the programs held in the ROM 222 or with the programs loaded into the RAM 223 from the storage unit 205. The RAM 223 may also retain data that are needed by the CPU 221 in carrying out its processes.

Figure 6:
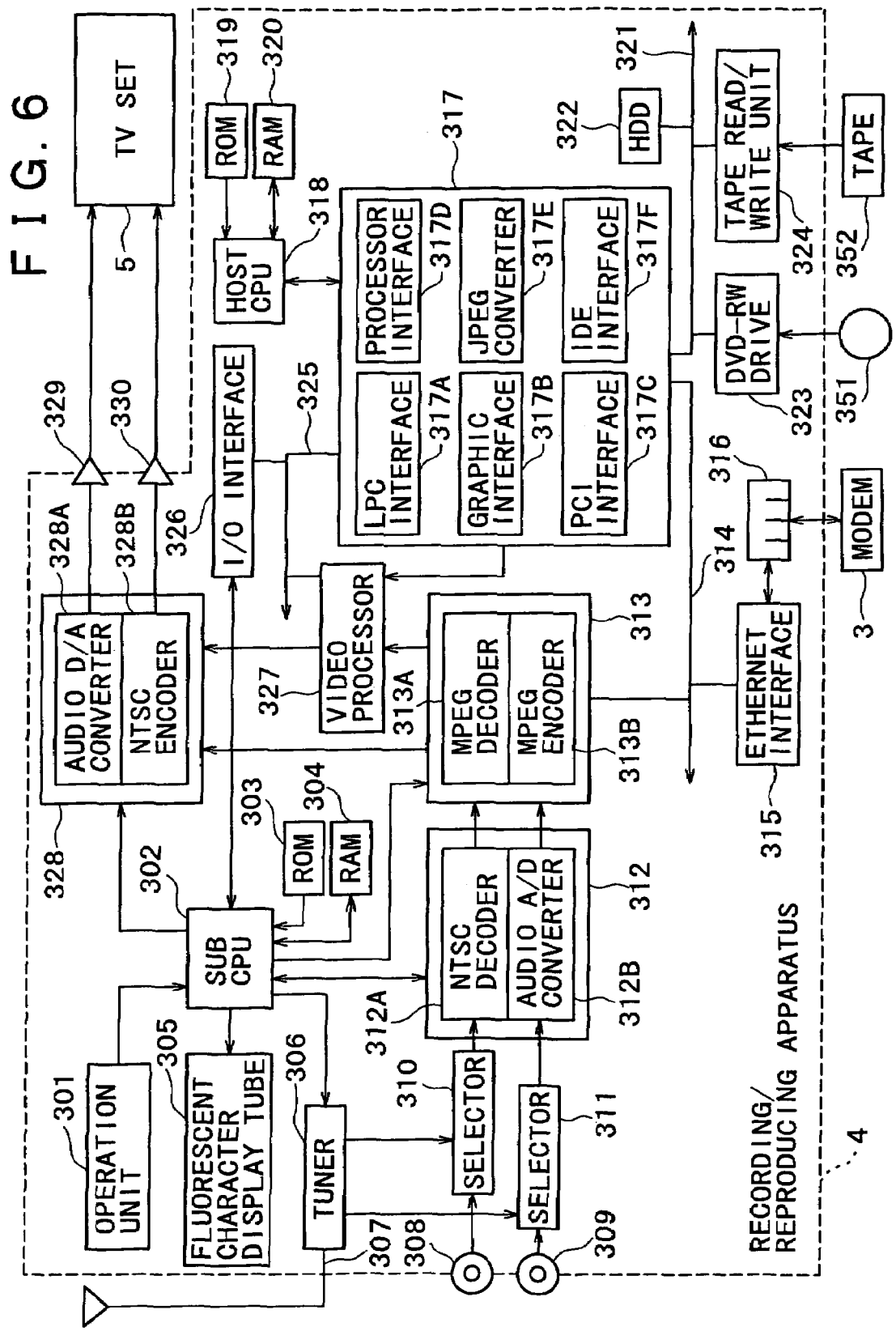
FIG. 6 is a block diagram indicating a typical structure of a recording/reproducing apparatus in FIG. 1.

FIG. 6 is a block diagram indicating a typical structure of the recording/reproducing apparatus 4.

An operation unit 301 is illustratively made up of a plurality of buttons and dials manipulated by the user for input. When operated by the user, the operation unit 301 supplies a sub CPU 302 with an operation signal reflecting the user's operation. A portion of the operation unit 301 is furnished on the body of the recording/reproducing apparatus; another portion of the unit 301 is provided as a remote commander (not shown) detached from the body.

The sub CPU 302 executes diverse processes in keeping with programs held in the ROM 303. For example, given an operation signal from the operation unit 301, the sub CPU 302 controls the performance of a tuner 306, an input signal control unit 312, and an output signal control unit 328 correspondingly. The sub CPU 302 also causes a host CPU 318 to perform via an I/O interface 326 a recording or reproducing process corresponding to the operation signal from the operation unit 301. The sub CPU 302 allows a fluorescent character display tube 305 to display the operating status of the recording/reproducing apparatus 4 and other information. Furthermore, the sub CPU 302 controls compression rate settings for encoding by an MPEG encoder 313B.

Upon receipt of an operation signal for an unattended recording reservation from the operation unit 301, the sub CPU 302 stores into a RAM 304 such information as the date for recording a broadcast program unattended, recording start time, recording stop time, the broadcast channel to be recorded, recording mode, timing for thumbnail acquisition (to be discussed later in detail), and an e-mail address, based on the received signal. In accordance with such items of information, the sub CPU 302 causes the host CPU 318 to record a broadcast program as reserved and, upon completion of the recording, to transmit an e-mail announcing the end of the recording to the e-mail address held in the RAM 304. In the description that follows, an expression "reservation information" will collectively represent the items input for recording reservation purposes, i.e., date for recording a broadcast program unattended, the recording start time, recording stop time, broadcast channel to be recorded, recording mode, timing for thumbnail acquisition, and the e-mail address to which to transmit an e-mail.

Under instructions from the sub CPU 302, the fluorescent character display tube 305 displays information about the operating status of the recording/reproducing apparatus 4. For example, the display tube 305 gives such indications as record, play, fast forward, and rewind, as well as the current day of the month, day of the week, time of day, and the broadcast channel selected by the user. When an instruction is input from the operation unit 301 for an unattended recording reservation, the fluorescent character display tube 305 displays reservation information, i.e., the reserved date for recording a broadcast program unattended, recording start time, recording stop time, broadcast channel to be recorded, recording mode, timing for thumbnail acquisition, and the e-mail address to which to transmit an e-mail.

In keeping with a broadcast station designation instruction from the sub CPU 302, The tuner 306 connected to an antenna 307 extracts video and audio signals coming from the designated broadcast station among the stations emitting TV broadcast radio waves covering terrestrial and satellite broadcast programs. After the signal extraction, the video signal is fed to a selector 310 and the audio signal to a selector 311.

An auxiliary video terminal 308 is connected by a cable to a video signal output terminal of external equipment (e.g., camcorder) and receives video signal input from the connected external equipment. Although the video signal of the NTSC (National Television System Committee) system is assumed to be used by this embodiment, this is not limitative of the invention. The invention also applies to the video signals of other TV systems than the NTSC.

An auxiliary audio terminal 309 is connected by a cable to an audio signal output terminal of external equipment (e.g., camcorder) and receives audio signal input from the connected external equipment.

The selector 310 selects video signals coming from one of two sources, i.e., from the external equipment connected to the auxiliary video terminal 308, or from the tuner 306. The selected video signal is supplied to an NTSC decoder 312A.

The selector 311 selects audio signals coming either from the external equipment connected to the auxiliary audio terminal 309 or from the tuner 306. The selected audio signal is fed to an audio A/D (analog-to-digital) converter 312B. Where the selector 310 is selecting the video signal from the auxiliary video terminal 308, the selector 311 selects the audio signal from the auxiliary audio terminal 309; where the selector 310 is selecting the video signal from the tuner 306, the selector 311 selects the audio signal from the tuner 306.

The input signal processing unit 312 comprising the NTSC decoder 312A and audio A/D converter 312B subjects the audio and video signals from the selectors 310 and 311 to analog-to-digital conversion and supplies the converted signals to an MPEG processing unit 313 according to instructions from the sub CPU 302. More specifically, the NTSC decoder 312A in the input signal processing unit 312 subjects the NTSC video signal from the selector 310 to A/D conversion (i.e., capture) to generate video data, and feeds the generated video data to the MPEG processing unit 313. The audio A/D converter 312B converts the audio signal coming from the selector 311 from analog to digital format to generate audio data, and supplies the generated audio data to the MPEG processing unit 313.

The MPEG processing unit 313 includes an MPEG decoder 313A and an MPEG encoder 313B. Using a suitable decoding method based on the relevant encoding method such as MPEG-2 or MPEG-4, the MPEG decoder 313A decodes encoded data sent from an IC (integrated circuit) unit 317 over a PCI (Peripheral Component Interconnect) bus 314, whereby reproduction-oriented video data (moving picture data) and audio data are generated. The MPEG decoder 313A then supplies the reproduction-oriented video data to a video processor 327 and the reproduction-oriented audio data to an audio D/A (digital to analog) converter 328A.

Given video data and audio data from the NTSC decoder 312A and audio A/D converter 312B respectively, the MPEG encoder 313B compressively encodes the received data using a predetermined compression encoding method such as MPEG-2 or MPEG-4. The encoded data are sent from the MPEG encoder 313B to the IC unit 317 over the PCI bus 314.

In response to requests from the sub CPU 302, the host CPU 318 starts up relevant programs in the ROM 319 to perform various processes. The RAM 320 retains data and other resources that may be needed by the host CPU 318 in carrying out diverse processes.

The IC unit 317 incorporates an LPC (Low Pin Count) interface 317A, a graphic interface 317B, a PCI interface 317C, a processor interface 317D, a JPEG converter 317E, and an IDE (Integrated Drive Electronics) interface 317F.

The JPEG converter 317E generates a thumbnail image by encoding one frame of video data using the JPEG encoding method.

The LPC bus 317A is connected to the I/O (input/output) interface 326 and video processor 327. The I/O interface 326 is connected to the sub CPU 302. Upon receipt of a request from the sub CPU 302, the I/O interface 326 notifies the host CPU 318 that the request has been received. The video processor 327 processes the reproduction-oriented video data coming from the MPEG decoder 313A preparatory to display on the TV set 5. The reproduction-oriented video data thus processed are fed to an NTSC encoder 328B.

The PCI bus 314 is connected to an MPEG processing unit 313 and an Ethernet interface 315. The Ethernet interface 315 is connected to the modem 3 via an Ethernet connector 316.

An IDE bus 321 is connected to a hard disc drive (HDD) 322, a DVD-RW (digital versatile disc-rewritable) drive 323, and a tape read/write unit 324. The data encoded by the MPEG encoder 313B are written to the HDD 322. For reproduction, encoded data records are read from the HDD 322. Under instructions from the host CPU 318, the data encoded by the MPEG encoder 313B are recorded to a DVD-RW disc 351. Also under instructions from the host CPU 318, the DVD-RW drive 323 reads encoded data from the DVD-RW disc 351.

Given instructions from the host CPU 318, the tape read/write unit 324 writes to a tape 352 (e.g., digital video cassette) the data encoded by the MPEG encoder 313B. Also in keeping with instructions from the host CPU 318, the DVD-RW drive 323 reads encoded data from the tape 352.

The output signal control unit 328 comprises the audio D/A converter 328A and NTSC encoder 328B. The audio D/A converter 328A converts the reproduction-oriented audio data coming from the MPEG decoder 313A into an analog audio signal. After the conversion, the analog audio signal is sent to the TV set 5 through an audio output terminal 329. The NTSC encoder 328B converts the reproduction-oriented video data coming from the video processor 327 into an NTSC video signal. Following the conversion, the NTSC video signal is supplied to the TV set 5 through a video output terminal 330.

The TV set 5 causes its internal speakers to output the audio signal received through the audio output terminal 329. The video signal supplied through the video output terminal 330 is displayed on a display unit of the TV set 5.

Figure 7:
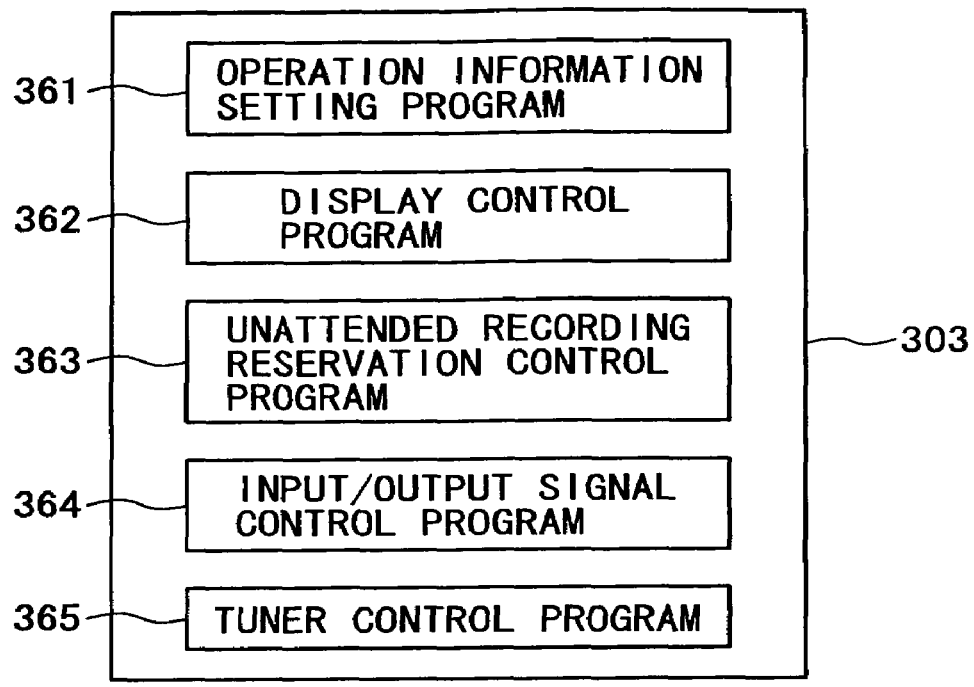
FIG. 7 is a schematic view outlining typical programs held in a ROM 303 in FIG. 6.

FIG. 7 outlines typical programs held in the ROM 303. As shown in FIG. 7, the ROM 303 stores an operation information setting program 361, a display control program 362, an unattended recording reservation control program 363, an input/output signal control program 364, and a tuner control program 365.

The operation information setting program 361 sets various actions to be performed by the recording/reproducing apparatus 4, in accordance with operation signals input through the operation unit 301. For example, as instructed through the operation unit 301, the operation information setting program 361 controls the MPG encoder 313B and establishes recording mode (i.e., quality setting of pictures to be recorded; to be discussed later in detail). The display control program 362 controls the display of information by the fluorescent character display tube 305. The unattended recording reservation control program 363 controls reservations for recording broadcast programs unattended.

More specifically, when an operation is input from the operation unit 301 to reserve the unattended recording of a broadcast program, the unattended recording reservation control program 363 sets the input reservation information into the RAM 304. When the current time is found to have reached a reserved recording start time, the unattended recording reservation control program 363 causes the host CPU 318 to start recording to a predetermined recording medium (HDD 322, DVD-RW disc 351, or tape 352) the data encoded by the MPEG encoder 313B (i.e., data constituting the program that is broadcast over the reserved channel and received by the tuner 306). Later, when the current time is found to have reached a reserved recording stop time, the unattended recording reservation control program 363 causes the host CPU 318 to stop recording the data encoded by the MPEG encoder 313B to the predetermined recording medium. Thereafter, the unattended recording reservation control program 363 causes the host CPU 318 to transmit information comprising the date when the program was recorded, recording start time, recording stop time, recorded broadcast channel, recording mode, and a thumbnail formed by one frame of the recorded program, to the e-mail address included in the reservation information.

The input/output signal control program 364 controls starting and stopping of both the A/D conversion of video and audio signals by the input signal processing unit 312, and the D/A conversion of video and audio data by the output signal control unit 328.

The tuner control program 365 controls the tuning of broadcast stations by the tuner 306.

Figure 8:
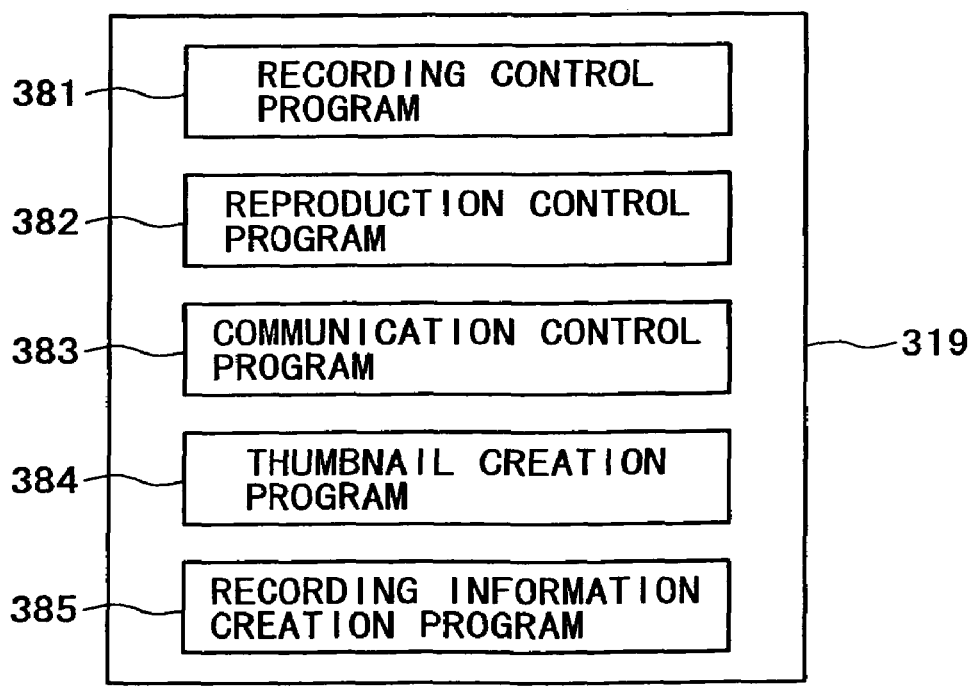
FIG. 8 is a schematic view listing typical programs stored in a ROM 319 in FIG. 6.

FIG. 8 lists typical programs stored in the ROM 319. Referring to FIG. 8, a recording control program 381 controls the recording of data encoded by the MPEG encoder 313B to a predetermined recording medium (HDD 322, DVD-RW 351, or tape 352). A reproduction control program 382 controls the retrieval of data from the predetermined recording medium (HDD 322, DVD-RW 351, or tape 352) and the supply of the retrieved data to the MPEG decoder 313A. A communication control program 383 controls communication-related processes including the transmission of e-mails via the Ethernet interface 315. A thumbnail creation program 384 creates a thumbnail image out of the encoded data constituting a broadcast program recorded on the predetermined recording medium (HDD 322, DVD-RW 351, or tape 352). A recording information creation program 385 creates recording information including the date when a program was recorded, recording start time, recording stop time, recorded broadcast channel, recording mode, and a thumbnail.

Figure 9:
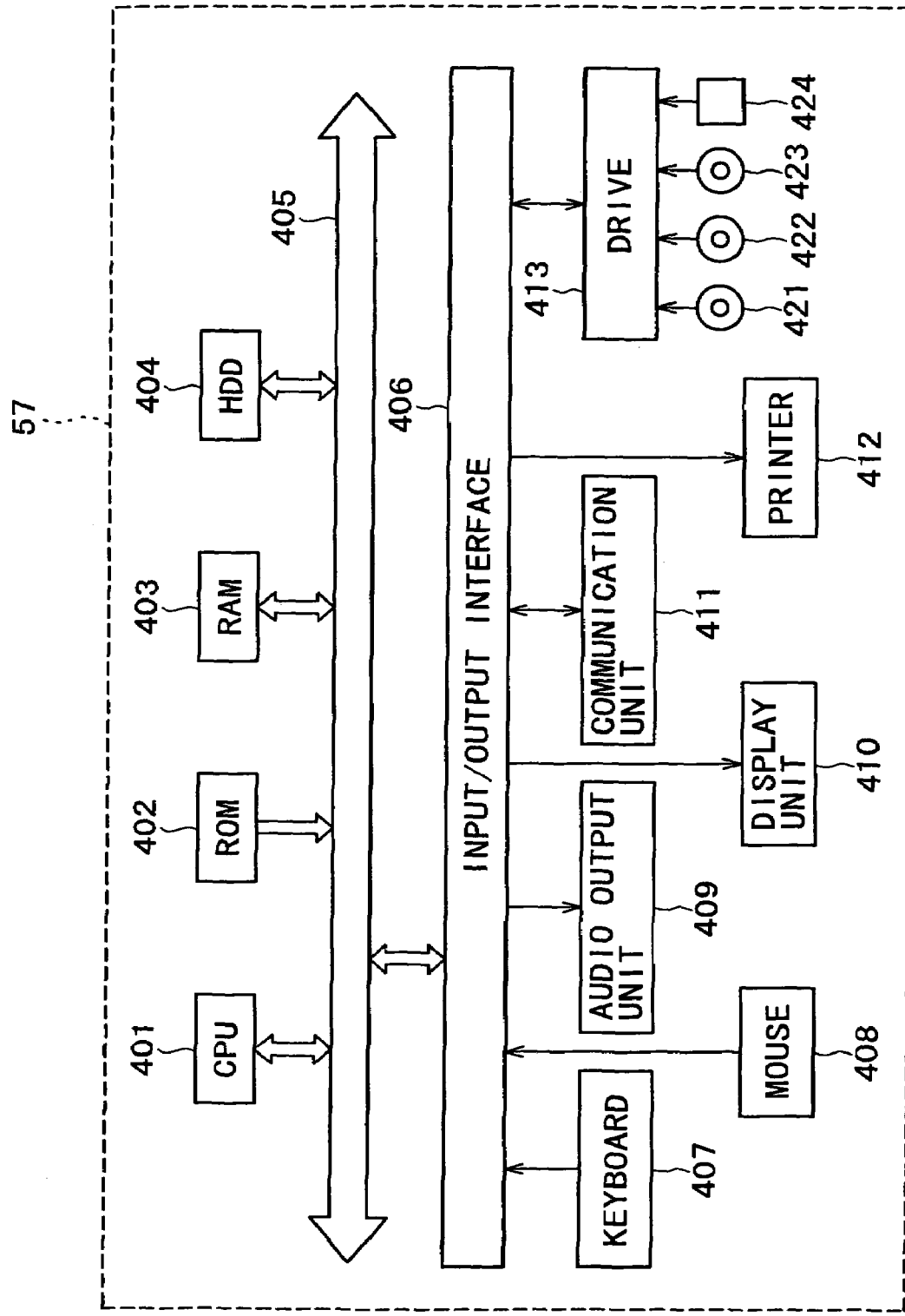
FIG. 9 is a block diagram sketching a typical structure of a mail server 57 in FIG. 1.

FIG. 9 is a block diagram sketching a typical structure of the mail server 57. Referring to FIG. 9, a CPU 401 performs diverse processes in accordance with programs held in a ROM 402 or with the programs loaded into a RAM 403 from an HDD 404. The RAM 403 may also accommodate data that are needed by the CPU 401 in carrying out various processes.

The CPU 401, ROM 402, RAM 403, and HDD 404 are interconnected via a bus 405. The bus 405 is also connected to an input/output interface 406.

The input/output interface 406 is connected to a keyboard 407, a mouse 408, an audio output unit 409 including speakers, a display unit 410 made of a CRT (cathode-ray tube), an LCD or like device, a communication unit 411 comprising a modem and a terminal adapter, and a printer 412. The communication unit 411 carries out communication-related processing over networks including the Internet 1.

The input/output interface 406 is also connected to a drive 413 as needed. The drive 413 is loaded with a magnetic disc 421, an optical disc 422, a magneto-optical disc 423, or a semiconductor memory 424. Computer programs are read from the loaded recording medium and installed into the HDD 404 as needed.

The client computer 6, mail server 9, administrative control unit 55 and access server 56, not shown, are basically the same in structure as the mail server 57.

Figure 10:
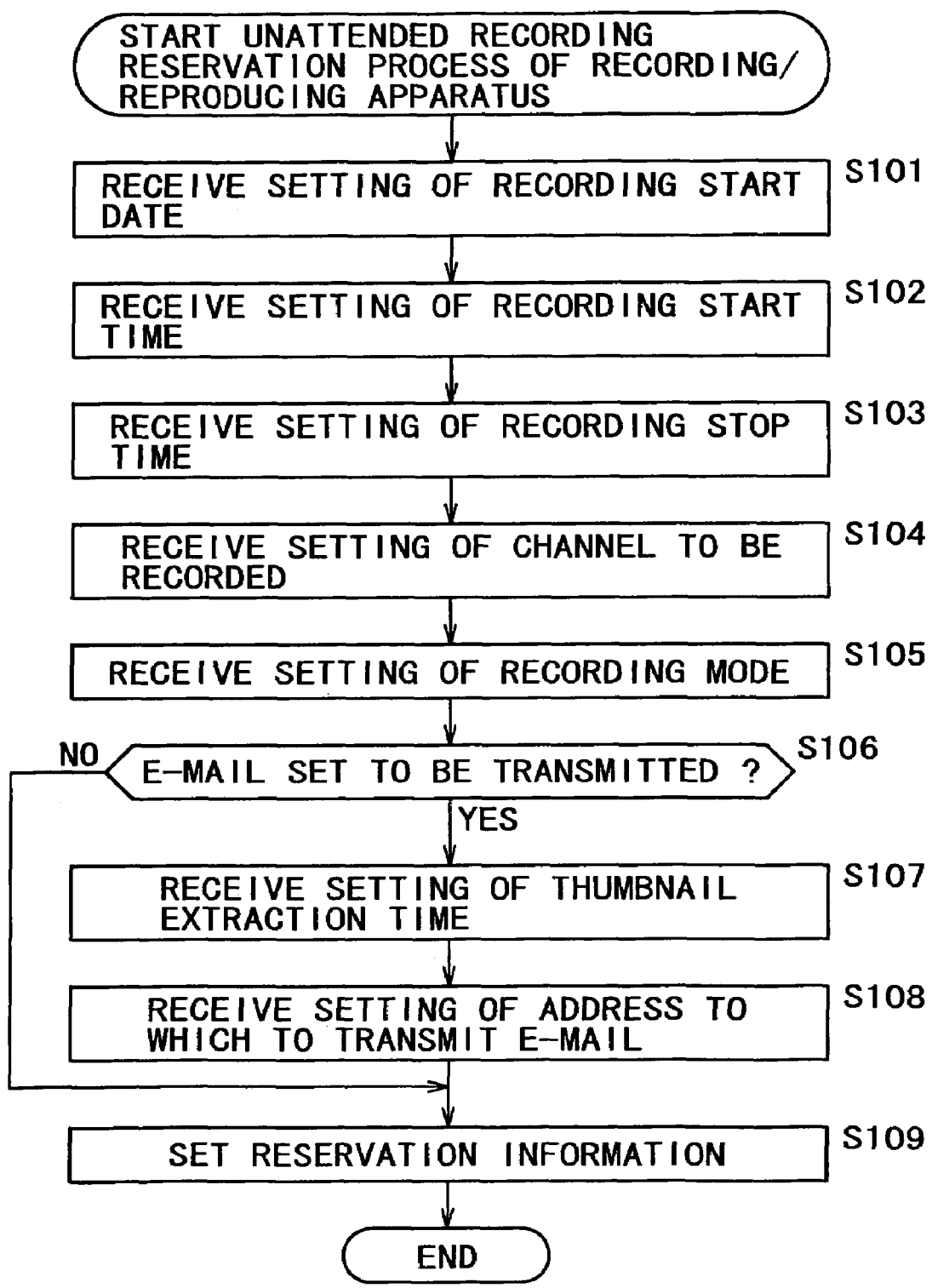
FIG. 10 is a flowchart of steps constituting an unattended recording reservation process performed by the recording/reproducing apparatus.

Described below with reference to the flowchart of FIG. 10 is an unattended recording reservation process of the recording/reproducing apparatus 4. The process of FIG. 10 is started when the user inputs an instruction for starting unattended recording reservation by means of the operation unit 301. It should be noted that the steps shown to be performed by the unattended recording reservation control program 363 in the subsequent description are in practice carried out by the sub CPU 302 executing the reservation control program 363.

In step S101, the unattended recording reservation control program 363 receives the setting of a recording start date input through the operation unit 301, and stores the received setting into the RAM 304. In step S102, the unattended recording reservation control program 363 receives the setting of a recording start time from the operation unit 301, and places the received setting into the RAM 304. In step S103, the unattended recording reservation control program 363 receives the setting of a recording stop time from the operation unit 301, and writes the received setting to the RAM 304. In step S104, the unattended recording reservation control program 363 receives the setting of a broadcast channel to be recorded from the operation unit 301, and records the received setting to the RAM 304. In step S105, the unattended recording reservation control program 363 receives the setting of a recording mode from the operation unit 301, and places the received setting into the RAM 304.

What follows is a description of the recording mode. The recording/reproducing apparatus 4 permits selection of one of a plurality of data compression rates for use by the MPEG encoder 313B encoding the video and audio data generated through A/D conversion by the input signal processing unit 312. If a high compression rate is selected, the quantity of compressed data is reduced but the quality of decoded data becomes low; if a low compression rate is selected, the quantity of compressed data is not reduced much but the quality of decoded data turns out to be high. The setting of a desired picture quality level signifies the setting of a desired recording mode. Illustratively, there are four picture quality levels (i.e., recording mode options) for data to be recorded: FINE, SP, LP, and EP. In this example, FINE represents the highest picture quality, followed by SP, LP and EP in descending order. The MPEG encoder 313B compressively encodes video and audio data in keeping with the recording mode thus selected.

The user may operate the operation unit 301 to make a setting specifying whether or not to have an e-mail transmitted so as to notify an end of the recording of a reserved broadcast program. In step S106, the unattended recording reservation control program 363 thus checks an operation signal from the operation unit 301 to determine whether the setting has been made for the transmission of an e-mail announcing the completion of program recording. If the e-mail transmission setting is found to have been selected, step S107 is reached.

As described above, the recording/reproducing apparatus 4 is capable of attaching a thumbnail image to the e-mail for announcing the end of the recording. Whereas the thumbnail is created using a single picture frame extracted from the recorded broadcast program, it is necessary to determine beforehand which of the multiple recorded frames is to be extracted. In step S107, the unattended recording reservation control program 363 causes the display control program 362 to have the fluorescent character display tube 305 display a thumbnail extraction time setting screen, i.e., a screen showing points in time at which to extract a frame for thumbnail creation. The unattended recording reservation control program 363 thus receives the setting of a selected thumbnail extraction time.

FIG. 11 is a schematic view of a typical setting screen appearing on the fluorescent character display tube 305 in step S107. In FIG. 11, an indication "Select extraction time" is shown appearing in the leftmost position of the display. The indication tells the user that a thumbnail extraction time is being selected. To the right of the indication "Select extraction time" are indications "1 min. later," "3 min. later," "5 min. later" and "10 min. later." These " . . . later" indications each signify a period of time from the start of the recording up to a point in time at which a thumbnail image is to be extracted. In the example of FIG. 11, a solid-circle symbol (●) prefixed to the indication "3 min. later" indicates that the setting of "3 min. later" is being selected. The user can select a desired thumbnail extraction time by prefixing the solid-circle symbol to the corresponding indication using the operation unit 301.

If the setting of "1 min. later" is illustratively selected, a single picture frame recorded one minute after the start of the recording is extracted and reduced into a thumbnail. Likewise, if the setting of "3 min. later," "5 min. later" or "10 min. later" is selected, then a single picture frame recorded three minutes, five minutes, or 10 minutes after the start of the recording is extracted respectively and turned into a thumbnail.

A triangle symbol is shown in the rightmost position in FIG. 11. If the triangle symbol is operated on by the user manipulating the operation unit 301, then the screen indicates further time setting options such as "15 min. later," "20 min. later," "25 min. later," etc. By suitably operating the operation unit 301, the user may then select a desired thumbnail extraction time from the optional time settings.

As long as the triangle symbol appears in the rightmost position of the screen for selection by the user operating the operation unit 301, further time setting alternatives can be displayed. A recording time period is determined in steps S102 and S103 (e.g., if the recording start time is set for 10:00 and the recording stop time for 11:00, then the recording time period is set for one hour). It is necessary to establish the thumbnail extraction time within the recording time period thus determined. The unattended recording reservation control program 363 then permits the display of thumbnail extraction time setting alternatives within the established recording time period.

In step S107, the unattended recording reservation control program 363 receives the setting of a thumbnail extraction time in accordance with an operation signal from the operation unit 301.

In step S108 following step S107, the unattended recording reservation control program 363 receives the setting of an e-mail address to which to transmit an e-mail for announcing the end of the recording. The user inputs the e-mail address by operating the operation unit 301. Step S108 is followed by step S109.

If in step S106 the unattended recording reservation control program 363 determines that there is no setting of an e-mail for announcing the completion of program recording, then steps S107 and S108 are skipped and step S109 is reached.

In step S109, the unattended recording reservation control program 363 writes to the RAM 304 the reservation information specifying the unattended recording of the desired broadcast program in accordance with the settings made in steps S101 through S108.

Figure 12:
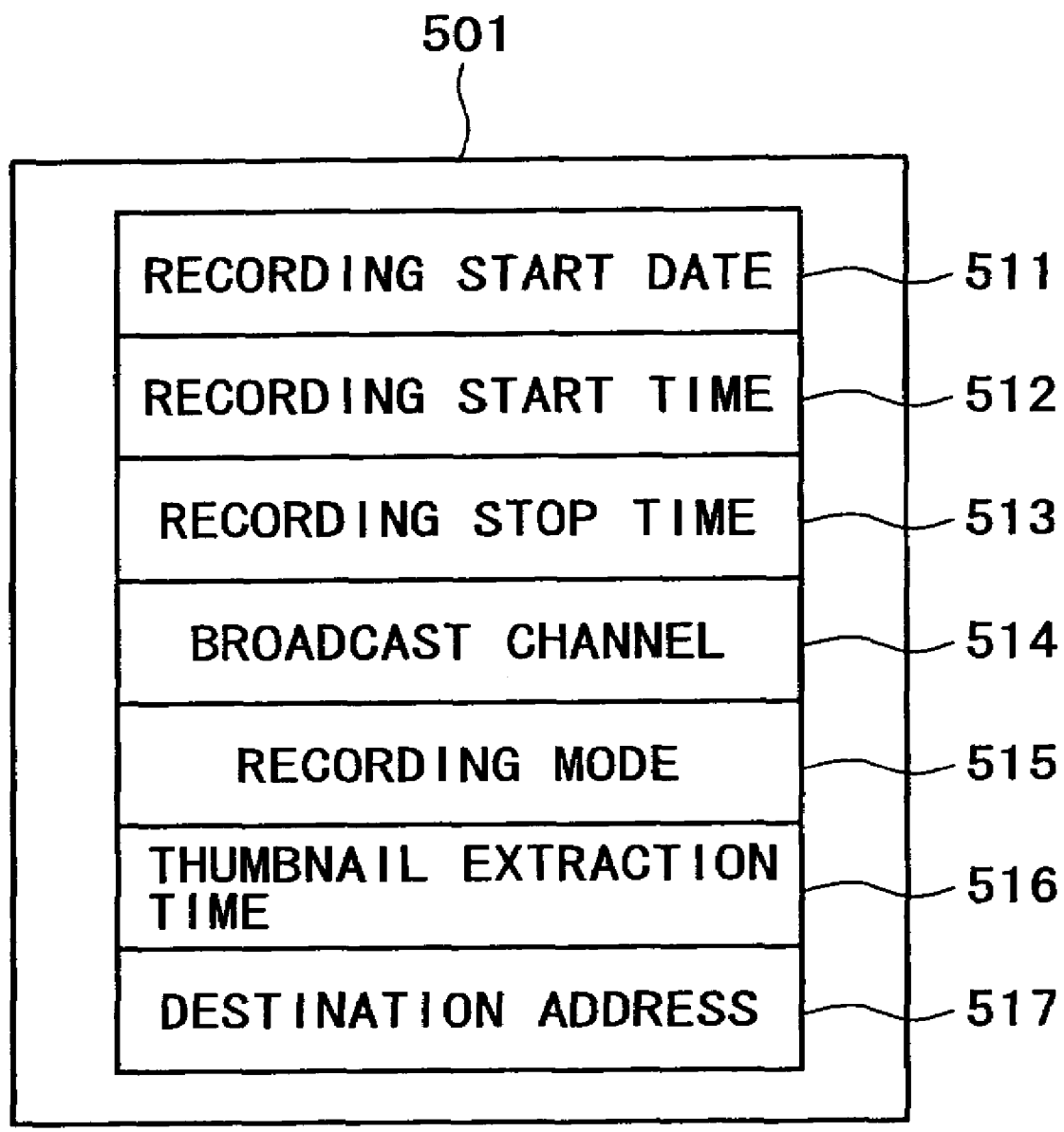
FIG. 12 is a tabular view of typical information included in reservation information.

FIG. 12 is a tabular view of typical reservation information held in the RAM 304. Referring to FIG. 12, the reservation information 501 includes a recording start date 511 set in step S101, a recording start time 512 set in step S102, a recording stop time 513 set in step S103; a broadcast channel 514 to be recorded, set in step S104; a recording mode 515 set in step S105, a thumbnail extraction time 516 set in step S107; and a destination address 517, an e-mail address of the destination to which to transmit an e-mail.

If the e-mail for announcing the end of recording is not found to be set for transmission in step S106 of the flowchart of FIG. 10, then the reservation information 501 in FIG. 12 does not include the thumbnail extraction time 516 and destination address 517.

Although the reservation information 501 is shown composed of the recording start date 511, recording start time 512, recording stop time 513, broadcast channel 514, recording mode 515, thumbnail extraction time 516, and destination address 517 in the example of FIG. 12, this is not limitative of the invention. Alternatively, the reservation information 501 may contain other information than the items mentioned above (e.g., name of the reserved broadcast program).

Although the flowchart of FIG. 10 is shown to have steps S101 through S105 executed in that order, this is not limitative of the invention. These steps may alternatively be carried out in any other order desired. Steps S107 and S108 may be reversed in order of execution. While the reservation information 501 is being set in step S109, any of the settings made so far can be modified if so desired.

Figure 13:
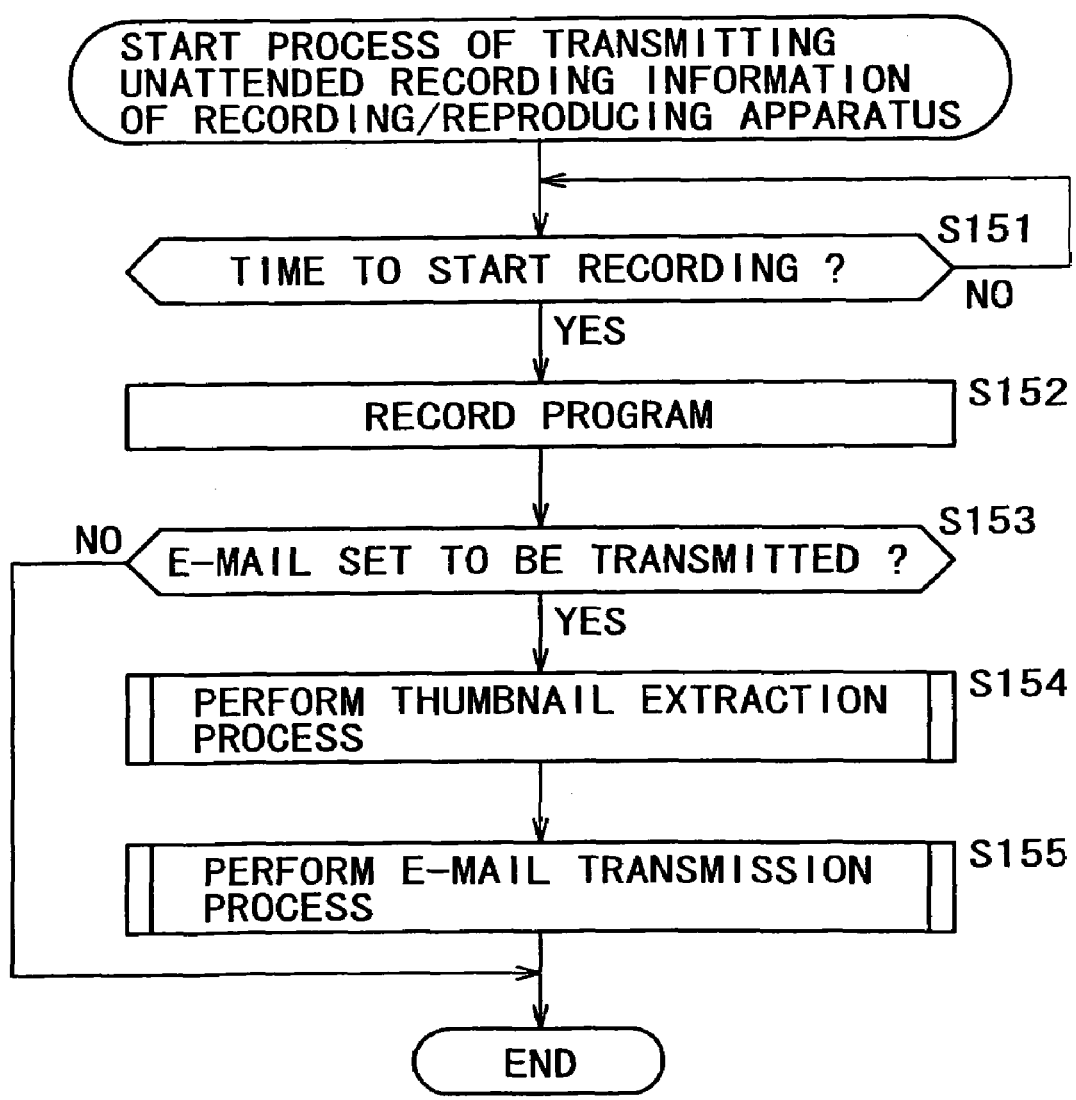
FIG. 13 is a flowchart of steps constituting a process of transmitting unattended recording information performed by the recording/reproducing apparatus.

Described below with reference to the flowchart of FIG. 13 is an unattended recording information transmitting process of the recording/reproducing apparatus 4. In the description that follows, a broadcast program will be shown getting recorded to the DVD-RW disc 351. Alternatively, the broadcast program may be recorded to the HDD 322 or tape 352 instead of to the DVD-RW disc 351.

In step S151, the unattended recording reservation control program 363 references the recording start date 511 and recording start time 512 in the reservation information 501 held in the RAM 304, to see whether the current time has reached the recording start time 512 of the recording start date 511. If the recording start time 512 of the recording start date 511 is found to be reached, control is passed on to step S152. For example, if the recording start date 511 is October 10 and if the recording start time 512 is 15:00, the unattended recording reservation control program 363 waits for the current time to reach 15:00, October 10. When the current time stands at 15:00 on October 10, step S152 is reached.

In step S152, the recording/reproducing apparatus 4 starts recording the reserved broadcast program. More specifically, the unattended recording reservation control program 363 starts up the tuner control program 365 and requests the program 365 to tune in to the broadcast channel 514 in the reservation information 501. Given the request, the tuner control program 365 sets the tuner 306 to select the channel designated by the broadcast channel 514. At this point, the selectors 310 and 311 are set to select the video and audio signals from the tuner 306 and to transfer the selected signals to the input signal processing unit 312. The input/output signal control program 364 causes the input signal processing unit 312 to convert the video and audio signals input to the unit 312 into video data and audio data respectively for output to the MPEG processing unit 313.

The unattended recording reservation control program 363 then sets the compression rate for the MPEG encoder 313B in accordance with the recording mode 515 included in the reservation information 501. Furthermore, the unattended recording reservation control program 363 requests the host CPU 318 to start recording the broadcast program, by way of the I/O interface 326 and IC unit 317. On receiving the request, the host CPU 318 starts up the recording control program 381 to start recording the broadcast program to the DVD-RW disc 351.

More specifically, the selectors 310 and 311 send the video and audio signals coming from the tuner 306 to the input signal processing unit 312. In turn, the input signal processing unit 312 converts the received video and audio signals from audio to digital format and forwards the converted data to the MPEG encoder 313B. The MPEG encoder 313B encodes the received video and audio data to generate encoded data. The recording control program 381 supplies the encoded data coming from the MPEG encoder 313B to the DVD-RW drive 323 through the PCI bus 314, IC unit 317, and IDE bus 321.

The recording control program 381 instructs the DVD-RW drive 323 to record the encoded data to the DVD-RW disc 351. Given the instruction from the recording control program 381, the DVD-RW drive 323 starts recording to the DVD-RW disc 351 the encoded data that have been supplied through the IDE bus 321.

Thereafter, the unattended recording reservation control program 363 waits for the recording stop time 513 to be reached. When the recording stop time 513 is found to be reached, the unattended recording reservation control program 363 requests the host CPU 318 to stop the recording via the I/O interface 326 and an LPC bus 325. For example, if the recording stop time 513 is set for 15:58, the unattended recording reservation control program 363 requests the host CPU 318 to stop the recording at 15:58. In accordance with the request, the recording control program 381 being activated by the host CPU 318 causes the DVD-RW drive 323 to stop recoding the encoded data to the DVD-RW disc 351.

The steps above accomplish the unattended recording of the reserved broadcast program when executed as described.

In step S153, the unattended recording reservation control program 363 determines whether or not to transmit an e-mail announcing the end of the recording, on the basis of the reservation information 501. If the destination address 517 is found to be included in the reservation information 501, the unattended recording reservation control program 363 determines that the e-mail for announcing the end of the recording is to be transmitted; if the destination address 517 is not found in the reservation information 501, then the unattended recording reservation control program 363 determines that the e-mail for recording end announcement is not be sent. If in step S153 the unattended recording reservation control program 363 determines that the e-mail is to be transmitted to announce the end of the recording, then control is passed on to step S154.

Figure 14:
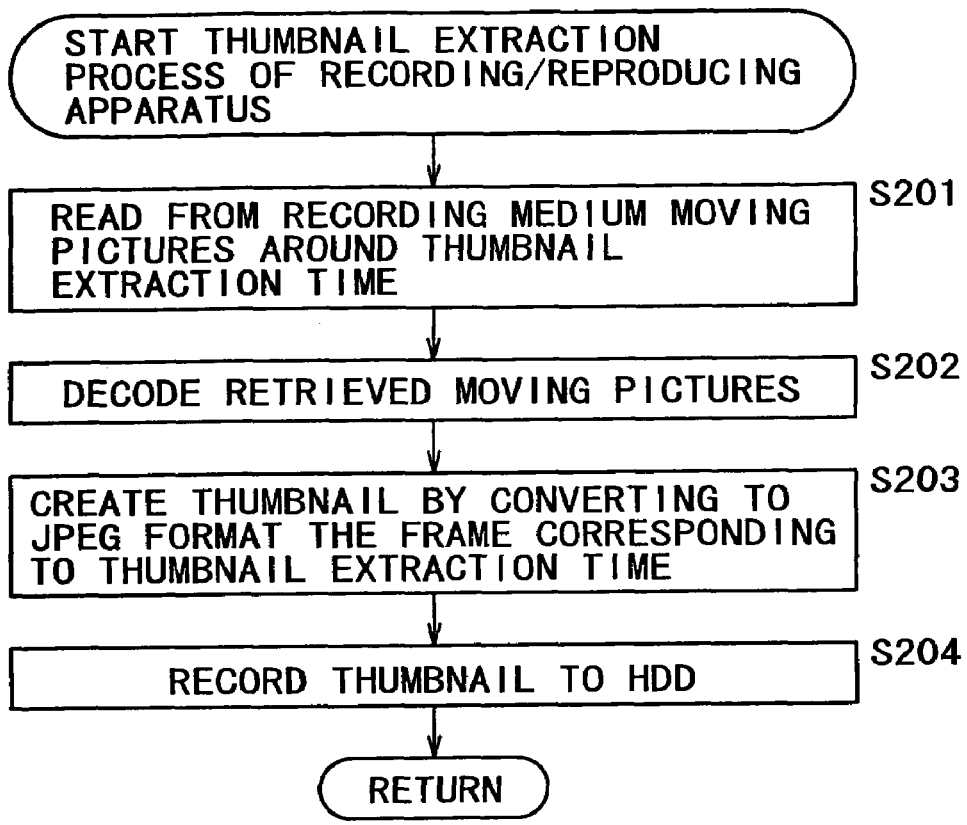
FIG. 14 is a flowchart of detailed steps making up step S154 in FIG. 13.

In step S154, the unattended recording reservation control program 363 carries out a thumbnail extraction process. The thumbnail extraction process of step S154 will now be described by referring to the flowchart of FIG. 14.

In step S201, the unattended recording reservation control program 363 reads the thumbnail extraction time 516 included in the reservation information 501 from the RAM 304, and transmits what is retrieved to the host CPU 318 through the I/O interface 326, LPC bus 325, and IC unit 317. At the same time, the unattended recording reservation control program 363 requests the host CPU 318 to extract a thumbnail image.

Given the request, the host CPU 318 starts up the thumbnail creation program 384 to proceed with thumbnail creation. More specifically, the thumbnail creation program 384 first starts up the reproduction control program 382 and requests the program 382 to read from the DVD-RW disc 351 the encoded data including the video data applicable to the thumbnail extraction time 516. In keeping with the request, the reproduction control program 382 causes the DVD-RW drive 323 to read from the DVD-RW disc 351 the encoded data including the video data applicable to the thumbnail extraction time 516. With this embodiment, video and audio data are compressively encoded by the MPEG encoding method. Thus the encoded data are recorded in units of GOP's (groups of pictures) to the recording medium. To extract a frame corresponding to the thumbnail extraction time 516 requires reading from the DVD-RW disc 351 all GOP's including the video data associated with the thumbnail extraction time 516.

In step S202, the thumbnail creation program 384 supplies the encoded data retrieved in step S201 to the MPEG decoder 313A through the IDE bus 321, IC unit 317, and PCI bus 314. The MPEG decoder 313A decodes the encoded data thus supplied and transfers the video data picked out of the decoded data to the IC unit 317 via the PCI bus 314.

In step S203 following step S202, the thumbnail creation program 384 extracts a single frame of data from the video data fed to the IC unit 317 in step S202, the frame being applicable to the thumbnail extraction time 516. The extracted frame is sent to the JPEG converter 317E. Illustratively, if the thumbnail extraction time was set for "3 minutes later" in step S107 of FIG. 10 discussed above, then the thumbnail creation program 384 extracts one frame of the video data exactly three minutes after the recording is started.

The JPEG converter 317E encodes the received single-frame video data using the JPEG encoding method to create a thumbnail image (still image). In creating the thumbnail image, the JPEG converter 317E sets the horizontal and vertical pixel counts of the thumbnail for predetermined pixel count values. The thumbnail to be created is arranged to be small enough to fit into the liquid crystal display 107 of the mobile phone 53.

Later in step S204, the thumbnail creation program 384 writes the thumbnail created by the JPEG converter 317E to the HDD 322 through the IDE bus 321.

The above steps accomplish the thumbnail extraction process when executed as described.

Returning to FIG. 13, the thumbnail extraction process of step S154 is followed by step S155. In step S155, the unattended recording reservation control program 363 carries out an e-mail transmission process. This e-mail transmission process of S155 is described below with reference to the flowchart of FIG. 15.

In step S221, the unattended recording reservation control program 363 reads from the RAM 304 the recording start date 511, recording start time 512, recording stop time 513, broadcast channel 514, recording mode 515, and destination address 517; transfers the retrieved items of information to the host CPU 318 via the I/O interface 326, LPC bus 325 and IC unit 317; and requests the host CPU 318 to transmit the e-mail to announce the end of the recording. The host CPU 318 temporarily places into the RAM 320 the received recording start date 511, recording start time 512, recording stop time 513, broadcast channel 514, recording mode 515, and destination address 517; and starts up the recording information creation program 385. When activated, the recording information creation program 385 reads from the HDD 322 the thumbnail image written thereto earlier in step S204 of FIG. 14. The recording information creation program 385 creates recording information including the recording start date 511, recording start time 512, recording stop time 513, broadcast channel 514, recording mode 515, and thumbnail image; and temporarily writes the created recording information to the RAM 320.

In step S222, the host CPU 318 starts up the communication control program 383. The communication control program 383 reads from the RAM 320 the recording information created in step S221 as well as the destination address 517, and attaches the destination address 517 to the recording information before transmitting the recording information together with the destination address 517 to the mail server 9 via the Ethernet interface 315, Ethernet connector 316, and modem 3.

The above steps accomplish the e-mail transmission process when executed as described. Returning to FIG. 13, step S155 when completed terminates the unattended recording information transmitting process of the recording/reproducing apparatus 4.

If in step S153 the unattended recording reservation control program 363 determines that the e-mail for recording end announcement is not to be transmitted, steps S154 and S155 are skipped. The unattended recording information transmitting process of the recording/reproducing apparatus 4 is then brought to an end.

Figure 15:
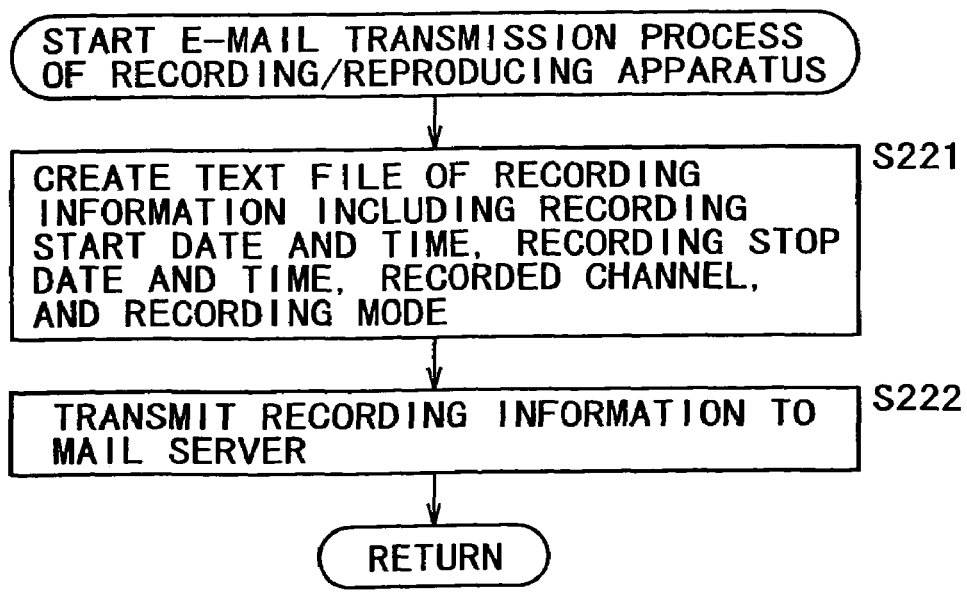
FIG. 15 is a flowchart of detailed steps making up step S155 in FIG. 13.

The recording information transmitted by the recording/reproducing apparatus 4 in step S222 of FIG. 15 is received by the mobile phone 53 by way of the mail servers 9 and 57.

Figure 16:
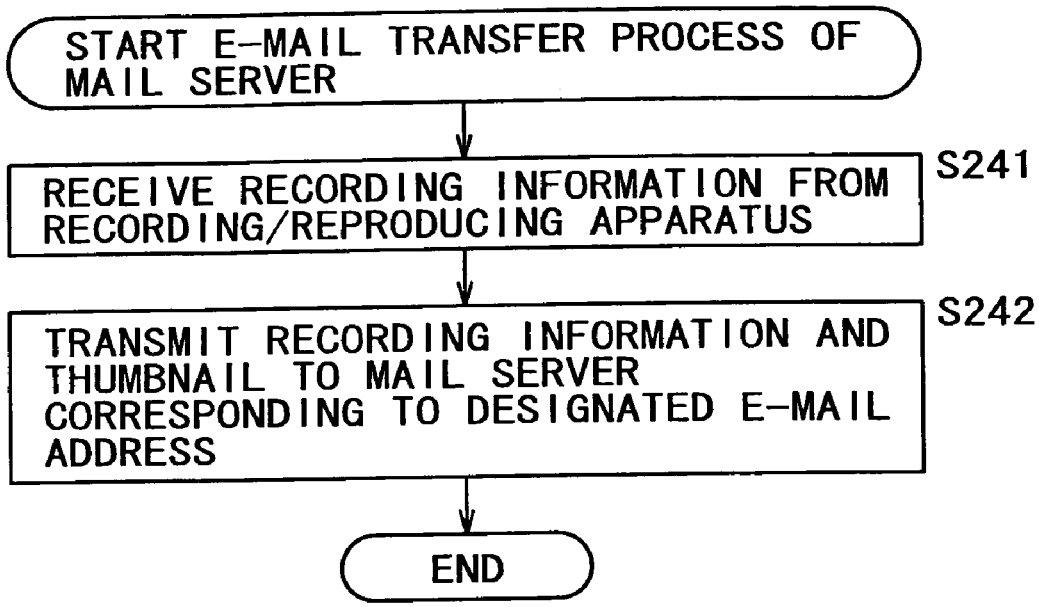
FIG. 16 is a flowchart of steps constituting an e-mail transfer process performed by a mail server 9 in FIG. 1.

Described below with reference to the flowchart of FIG. 16 is an e-mail transfer process of the mail server 9. In step S241, the mail server 9 receives the recording information that was transmitted by the recording/reproducing apparatus 4 in step S222 of FIG. 15. The destination address 517 is attached to this recording information. In step S242, the mail server 9 transmits the e-mail containing the recording information received in step S241 to the mail server 57 corresponding to the destination address 517 attached to the recording information.

An e-mail delivery process of the mail server 57 is described below with reference to the flowchart of FIG. 17.

In step S251, the CPU 401 of the mail server 57 receives via the communication unit 411 the recording information that was transmitted by the mail server 9 in step S242 of FIG. 16, and writes the received recording information to the HDD 404. The destination address 517 is attached to the recording information. In step S252, the CPU 401 of the mail server 57 transmits the e-mail containing the recording information received in step S251 to the mobile phone 53 via the communication unit 411, in accordance with the destination address 517.

Figure 18:
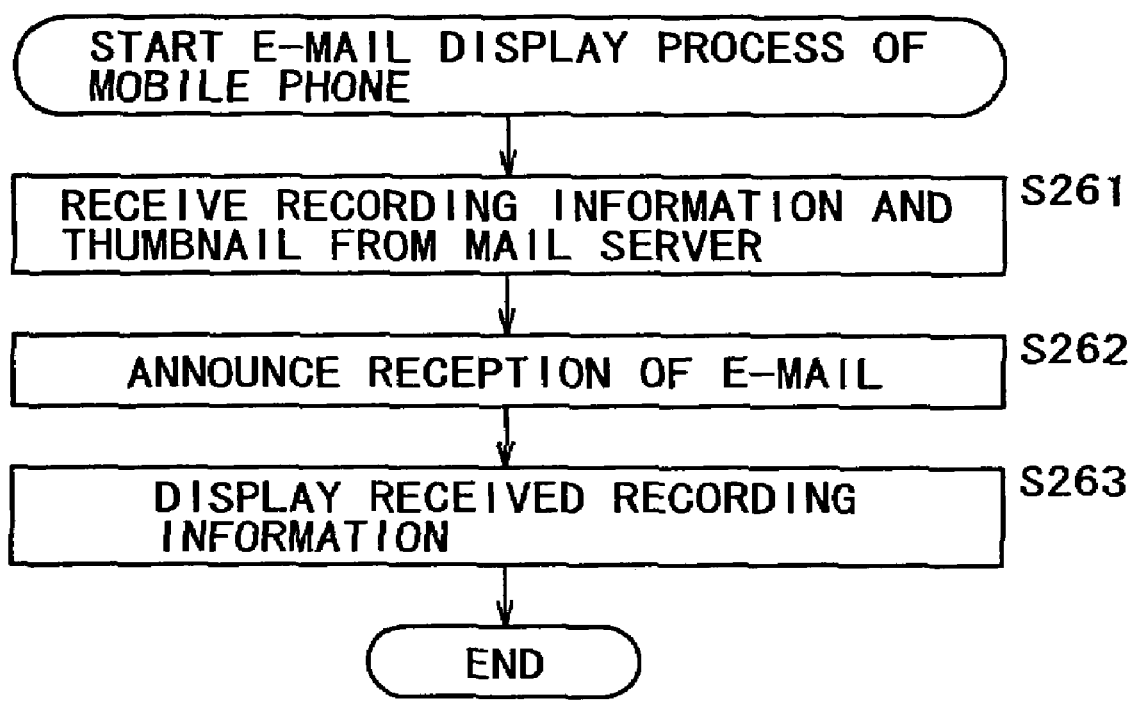
FIG. 18 is a flowchart of steps constituting an e-mail display process performed by the mobile phone.

An e-mail display process of the mobile phone 53 is discussed below by referring to the flowchart of FIG. 18.

Figure 17:
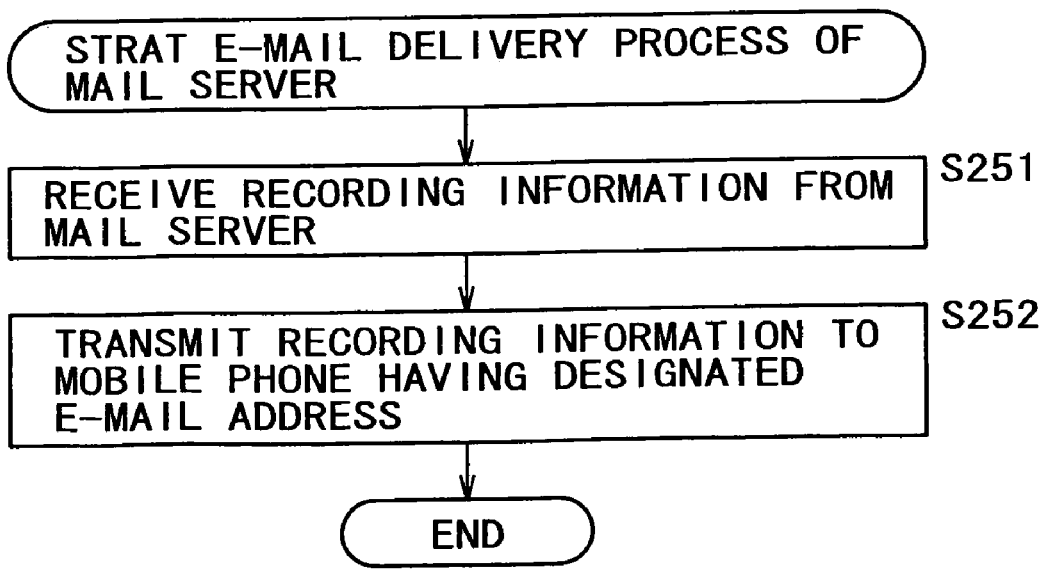
FIG. 17 is a flowchart of steps constituting an e-mail delivery process performed by the mail server 57 in FIG. 1.

In step S261, the CPU 221 of the mobile phone 53 receives the e-mail containing the recording information sent by the mail server 57 in step S252 of FIG. 17, through the antenna 104 and transmission/reception circuit unit 215. The received e-mail is fed to the modulation/demodulation circuit unit 211 for spread-spectrum decoding, whereby the original text data and the encoded picture data are restored. The encoded picture data are decoded by the picture decoder 208 into the picture data constituting the thumbnail. The restored text data and the decoded thumbnail are retained in the storage unit 205.

In step S262, the CPU 221 reads from the storage unit 205 predetermined audio data provided for use upon e-mail reception, and causes the audio codec 212 to output a sound corresponding to the retrieved audio data through the speaker 121. The sound notifies the user that an e-mail has arrived. In turn, the user may give an instruction to have the e-mail displayed by suitably operating the operation keys 108 and jog dial 111.

When the user gives the instruction to have the e-mail displayed, the CPU 221 goes to step S263 and reads from the storage unit 205 the text data and thumbnail contained in the e-mail received earlier in step S261. The CPU 221 causes the LCD control unit 206 to display the retrieved text data and thumbnail on the liquid crystal display 107.

Figure 19:
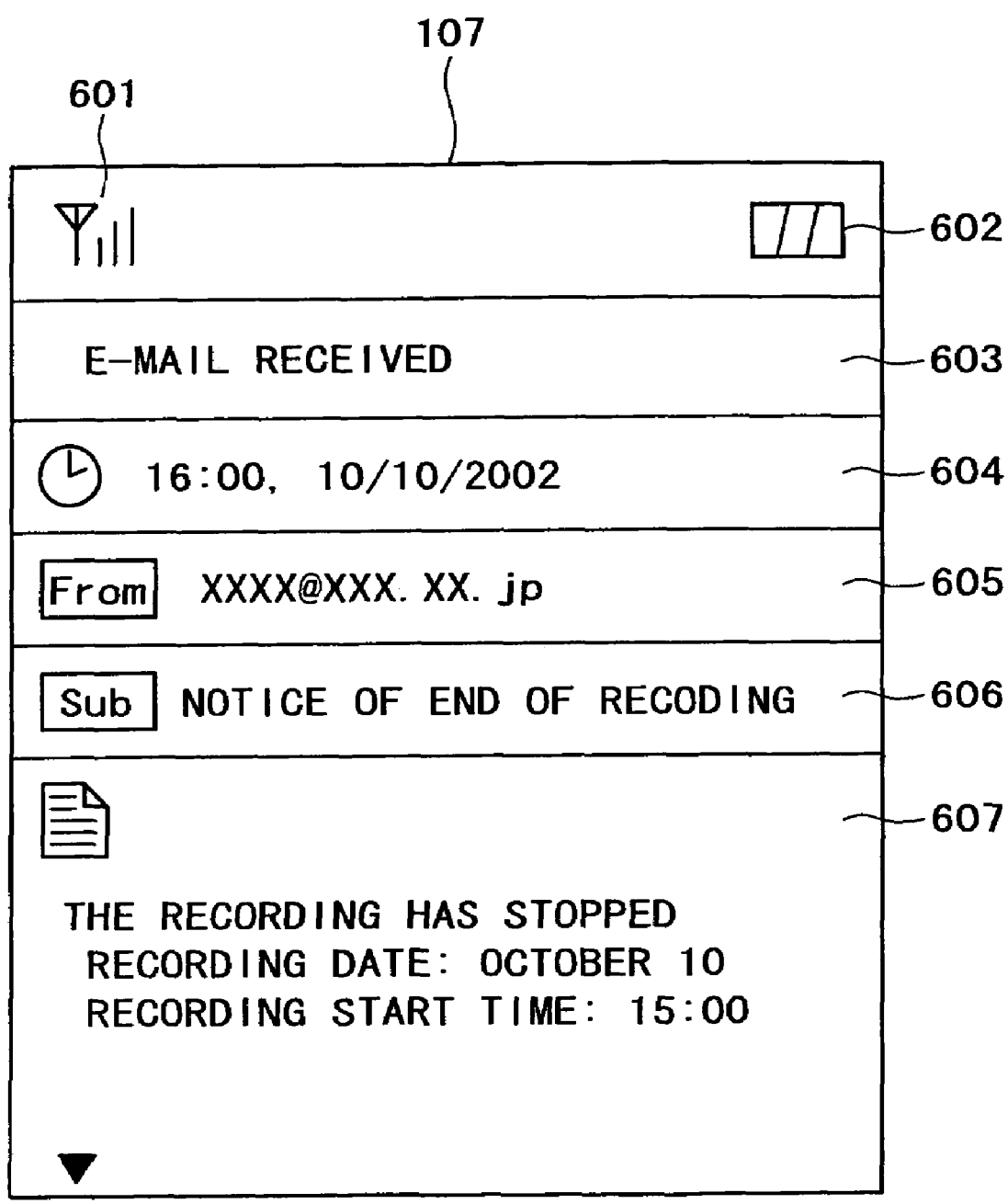
FIG. 19 is a schematic view of a typical display appearing on a liquid crystal display unit of the mobile phone.
Figure 20:
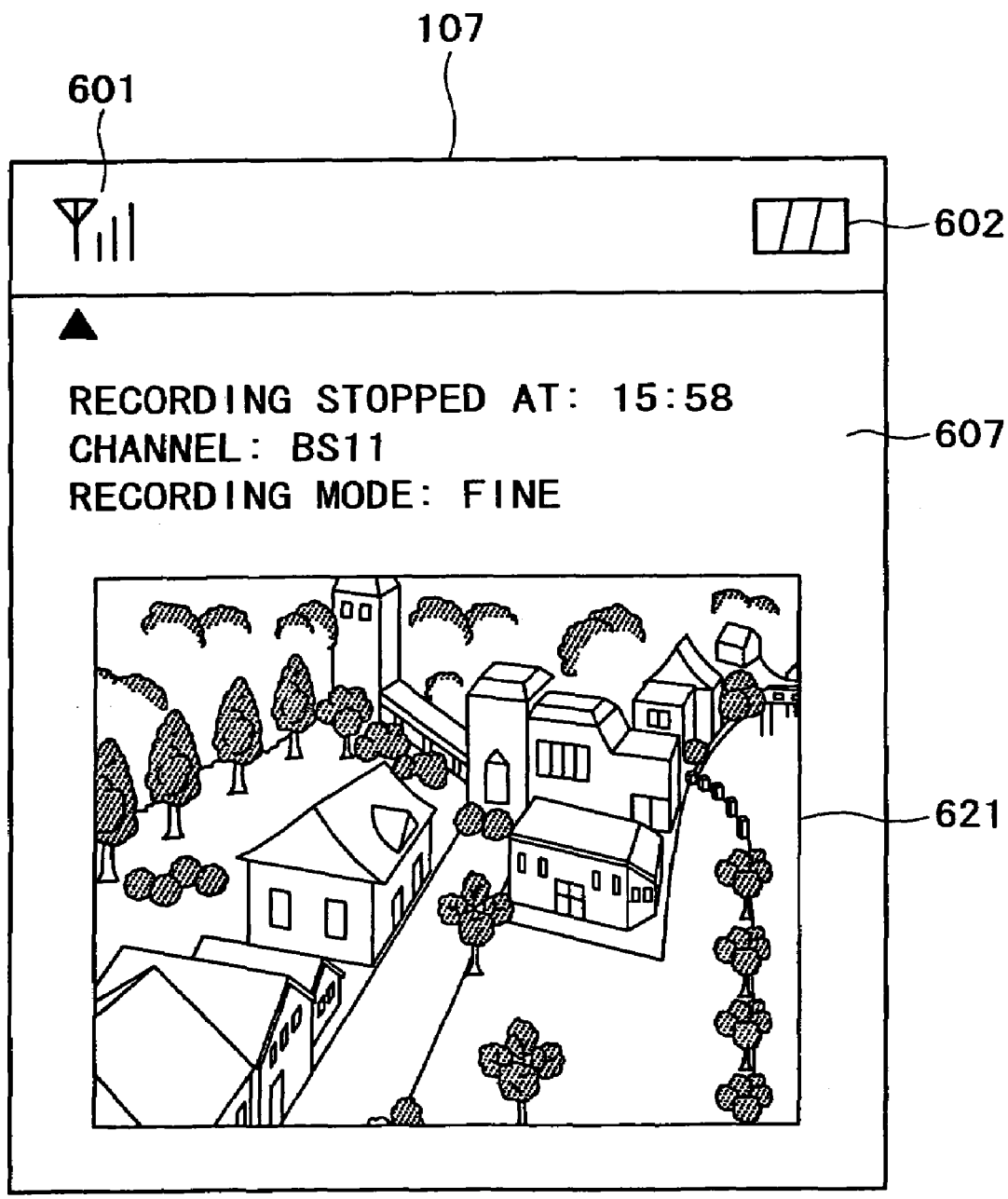
FIG. 20 is a schematic view of another typical display appearing on the LCD unit of the mobile phone.

FIGS. 19 and 20 show typical pictures that may be displayed on the liquid crystal display 107. Referring to FIG. 19, the liquid crystal display 107 shows in its top left corner a sensitivity indication 601 indicating the sensitivity of radio wave reception. To the right of the sensitivity indication 601 is a battery capacity indication 602 indicating the remaining battery capacity. Under the indications 601 and 602 is a heading 603 "e-mail received" announcing that the received e-mail is being displayed on the liquid crystal display 107. Under the heading 603 is a date indication 604 "16:00, Oct. 10, 2002" indicating the date and time at which the e-mail was received. Under the date indication 604 is an e-mail address display 605 "xxxx@xxx.xx.jp" showing the e-mail address of the person or entity that transmitted the e-mail. Under the e-mail address display 605 is an e-mail title 606 "Notice of end of recording" telling the user that the received e-mail is a notice of the end of unattended recording.

Under the e-mail title 606 is a text display area 607. In this example, the area 607 indicates "The recording has stopped," "Recording date: October 10," and "Recording start time: 15:00." The wording "The recording has stopped" is self-explanatory, announcing the end of the recording. The indication "Recording date: October 10" signifies that the recording start date is October 10, shown on the basis of the recording start date included in the recording information. The indication "Recording start time: 15:00" is also self-explanatory and signifies that the recording was started at 15:00, the indication being given in accordance with the recording start time included in the recording information. The text display area 607 continues downward. By rotating the jog dial 111 in the downward direction, the user may scroll the screen to have any downside indications displayed in the text display area 607.

FIG. 20 shows another screen display that may be displayed after the screen of FIG. 19 is scrolled by operation of the jog dial 111. In FIG. 20, the text display area 607 indicates "Recording stopped at: 15:58," "Channel: BS11," and "Recording mode: FINE" from the top down. The indication "Recording stopped at: 15:58" announces that the recording stop time is 15:58, displayed in accordance with the recording stop time included in the recording information. The indication "Channel: BS11" announces that the broadcast channel over which the program was recorded is BS11, displayed on the basis of the broadcast channel included in the recording information. The indication "Recording mode: FINE" announces that the recording mode is set to fine mode, shown in keeping with the recording mode included in the recording information.

Under the indication "Recording mode: FINE" is displayed a thumbnail 621 that allows the user intuitively to know what kind of program was recorded.

In the manner described, the e-mail announcing the end of the recording is presented to the user. This enables the user away from the recording/reproducing apparatus 4 to verify that the recording of the reserved broadcast program has been completed. When the e-mail permits display of the recording start date, recording start time, recording stop time, recorded broadcast channel, and recording mode, the user is able to know when the program of interest started and stopped getting recorded, on which channel the program was recorded, and in what picture quality the program was recorded. The thumbnail 621 representing one extracted frame of the recorded broadcast program allows the user intuitively to grasp the content of the recorded program, as opposed to the text-based display of the recording start date, recording start time, recording stop time, recorded broadcast channel, and recording mode.

Although the foregoing description showed recording information to be sent to the mobile phone 53, this does not mean that the invention applies only where recording information is transmitted to the mobile phone 53. Alternatively, recording information may be arranged to be transmitted illustratively to the portable information terminal 54, client computers 6-1 through 6-3, or other electronic apparatus capable of receiving e-mails.

Although the recording/reproducing apparatus 4 was shown creating a thumbnail image and transmitting recording information containing the thumbnail to a predetermined e-mail address, this does not mean that the picture to be created and transmitted is limited to a thumbnail image. The picture transmitted by the recording/reproducing apparatus 4 may be larger than a thumbnail if the e-mail destination is the client computer 6 or other apparatus having a display larger than that of the mobile phone 53. Illustratively, the size of the picture to be sent may be set as desired during the unattended recording reservation process of FIG. 10.

In the above-described recording reservation process of FIG. 10, the user was supposed to set the recording start date, recording start time, recording stop time, and broadcast channel to be recorded, one at a time. Alternatively, the reservation of a broadcast program to be recorded unattended may be received on the basis of EPG (electronic program guide), whereby the recording start date, recording start time, recording stop time, and broadcast channel to be recorded may be established. In this case, the name of the program to be recorded may also be acquired from EPG. The program name may then be included in the recording information transmitted by the e-mail, so that the name may appear on the liquid crystal display 107 of the mobile phone 53.

Although the recording/reproducing apparatus 4 above was shown recording the broadcast program received via the antenna 307, this does not mean that the apparatus 4 can only record broadcast programs received by way of the antenna 307. Alternatively, the recording/reproducing apparatus 4 may also be arranged to record broadcast programs delivered over a cable television network.

The series of steps or processes described above may be executed either by hardware or by software. For the series of software-based processing to be performed (e.g., by the recording/reproducing apparatus 4 or by the mobile phone 53), the programs constituting the software may be either incorporated beforehand in dedicated hardware of a suitable computer or installed upon use from a recording medium (i.e., program storage medium) illustratively into a general-purpose personal computer 700 shown in FIG. 21 or like equipment capable of executing diverse functions based on the installed, programs. The components making up the personal computer of FIG. 21, ranging from a CPU 701 to a semiconductor memory 724, are substantially the same as the components ranging from the CPU 401 to the semiconductor memory 424 in the mail server 57 of FIG. 9 and thus will not be described further.

Figure 21:
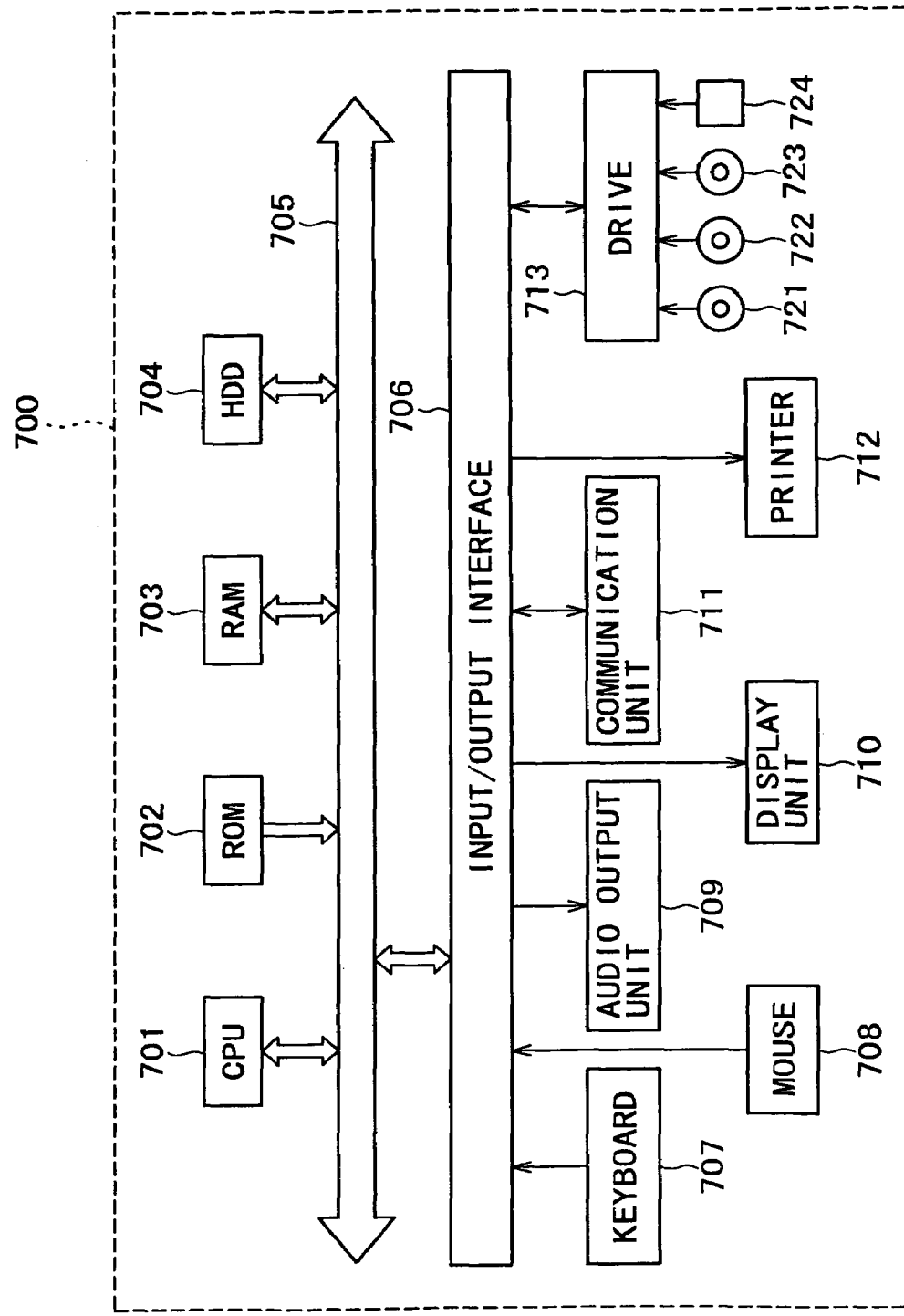
FIG. 21 is a block diagram outlining a typical structure of a personal computer.

As shown in FIGS. 9 and 21, the recording medium (program storage medium) carrying the programs to be installed into the computer for execution may be a package medium constituted by the magnetic disc 421 or 721 (including flexible discs), optical disc 422 or 722 (including CD-ROM (compact disc-read only memory) and DVD), magneto-optical disc 423 or 723 (including MD (Mini-disc)), or semiconductor memory 424 or 724; or may be offered in the form of the ROM 402 or 702 and the HDD 404 or 704 where the programs are stored temporarily or permanently. The recording medium (program storage medium) may have the programs recorded thereto as needed through wired or wireless communication media such as local area networks, the Internet 1, and digital satellite broadcasting networks by way of communication interfaces such as routers and modems.

As described, the service offering system practiced as the first embodiment of this invention allows the user to reserve the unattended recording of desired data in advance. Upon completion of the reserved recording, the system notifies the user thereof who may be away from the recording/reproducing apparatus.

The first embodiment constituting the service offering system enables portable communication terminals such as mobile phones and portable information terminals to receive diverse kinds of information about the recording/reproducing apparatus. Given notification of the end of reserved recording, the portable terminal displays the notice to let the user know that the recording has ended.

Second Embodiment

Described below with reference to the accompanying drawings is the second embodiment practiced in the form of a network control verification system, a control communication terminal, a server apparatus, and a network communication verification method.

[Network Control Verification System]

Figure 22:
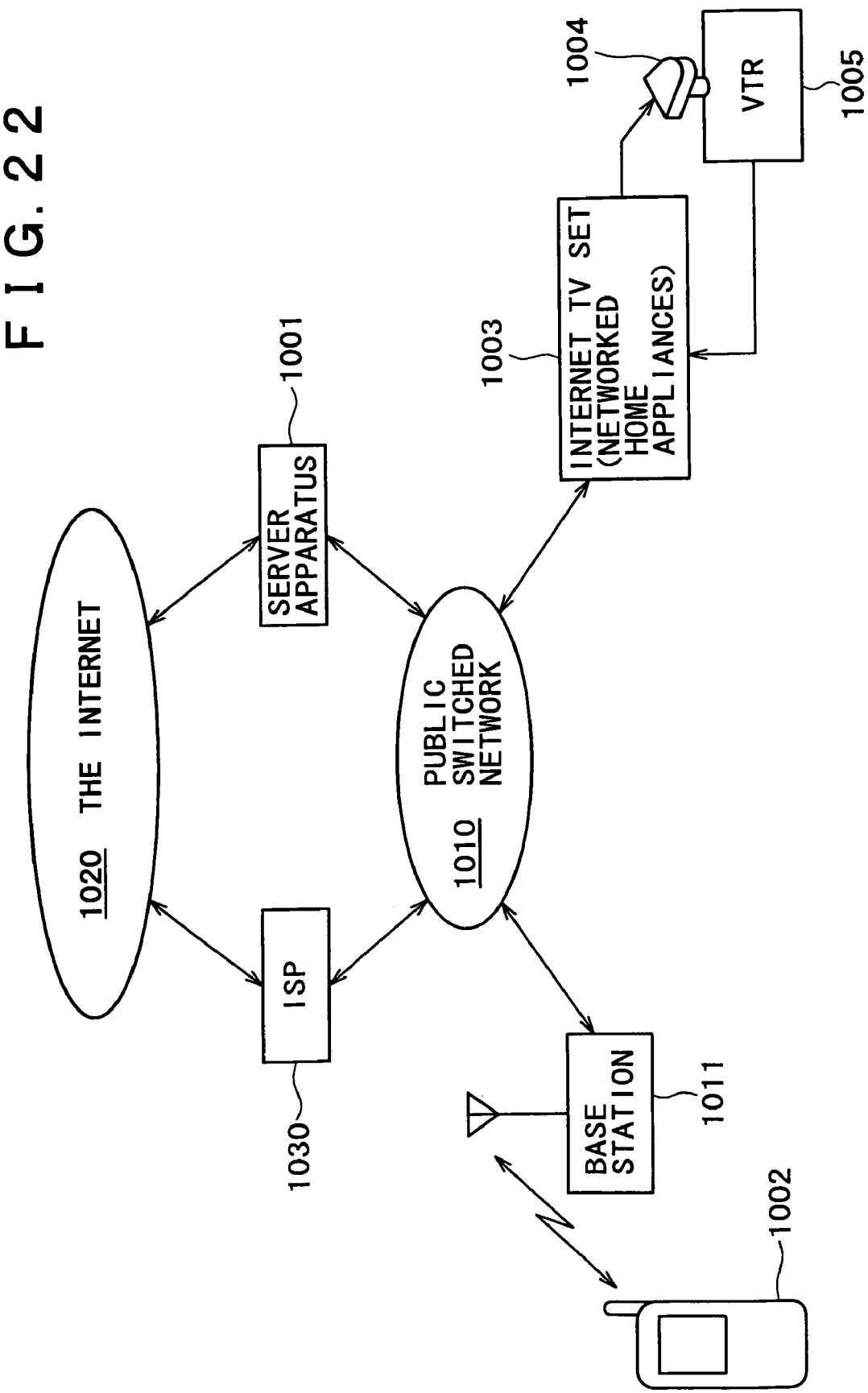
FIG. 22 is an explanatory view of a network control verification system operating in conjunction with a network control verification method, the system and the method being practiced as a second embodiment of this invention.

FIG. 22 is an explanatory view of a network system to which a network control verification system and a network control verification method of this invention are applied.

As shown in FIG. 22, this network system embodying the invention has a server apparatus 1001, a mobile phone terminal 1002 carried by the user, and an Internet TV set 1003 installed illustratively in the household of the user of the mobile phone terminal 1002, all interconnected either via a public communication network 1010 or through the public communication network 1010 and the Internet 102 for intercommunication purposes.

The Internet TV set 1003 is connected to a VTR 1005 as depicted in FIG. 22. Given signals from the VTR 1005, the Internet TV set 1003 reproduces pictures and sounds corresponding to the received signals. The Internet TV set 1003 is also connected to a so-called AV mouse 1004 which generates and outputs infrared remote control signals. The remote control signal emitted by the AV mouse 1004 allows the Internet TV set 1003 to control the VTR 1005.

In the network system structured as outlined above (to be described later in more detail), the server apparatus 1001 is applicable to a server apparatus of this invention and the Internet TV set 1003 to a control communication terminal of the invention. The mobile phone terminal 1002, usually acting as a common mobile phone, may also function as a remote controller (i.e., remote operation apparatus) for the Internet TV set 1003 when the phone is loaded with suitable information having been downloaded. The VTR 1005 has substantially the same structure and functions as those of conventionally-employed VTR's.

The public communication network 1010 may be PSTN (public switched telephone network), PSDN (public switched data network), ISDN (integrated services digital network), or some other network set up by a common carrier offering communication services to an indefinite number of users. In the case of the second embodiment, the network 1010 may also include cellular phone networks.

Where the second embodiment is in use, data exchanges between the mobile phone terminal 1002 and the Internet TV set 1003 are executed via the server apparatus 1001. More about this aspect of the second embodiment will be discussed below.

Specifically, when data are to be transmitted from the mobile phone terminal 1002 to the Internet TV set 1003, the mobile phone terminal 1002 first sends the TV set-bound data to the server apparatus 1001 by way of the nearest base station 1011, public communication network 1010, ISP (Internet service provider) server 1030, and the Internet 1020. The server apparatus 1001 receives and retains the data thus transmitted.

On receiving and retaining the data bound for the Internet TV set 1003, the server apparatus 1001 sends via the public communication network 1010 a notice to the Internet TV set 1003 saying that data are being held by the server for the TV set. The notice prompts the Internet TV set 1003 to access the server apparatus 1001.

When notified by the server apparatus 1001 that the TV set-bound data are being held thereby, the Internet TV set 1003 accesses the server apparatus 1001 through the public communication network 1010, ISP server 1030, and the Internet 1020. The connection thus established with the server apparatus 1001 allows the Internet TV set 1003 to acquire the retained TV set-bound data.

Likewise, when data are to be transmitted from the Internet TV set 1003 to the mobile phone terminal 1002, the TV set 1003 first sends the mobile phone-bound data to the server apparatus 1001 by way of the public communication network 1010, ISP server 1030, and the Internet 1020. The server apparatus 1001 receives and retains the data thus transmitted.

On receiving and retaining the data bound for the mobile phone terminal 1002, the server apparatus 1001 sends via the public communication network 1010 a notice to the mobile phone terminal 1002 saying that data are being held by the server for the mobile phone terminal 1002. The notice prompts the mobile phone terminal 1002 to access the server apparatus 1001.

When notified by the server apparatus 1001 that the mobile phone-bound data are being held thereby, the mobile phone terminal 1002 accesses the server apparatus. 1001 through the nearest base station 1011, public communication network 1010, ISP server 1030, and the Internet 1020. The connection established with the server apparatus 1001 allows the mobile phone terminal 1002 to acquire the retained mobile phone-bound data.

As described, the data to be exchanged between the mobile phone terminal 1002 and the Internet TV set 1003 in the second embodiment are relayed by the server apparatus 1001 as in the case of e-mail data. This makes it possible for transmitted data to reach the destination reliably even if the destination apparatus is being occupied. Although data exchanges are effected through the intervention of the server apparatus 1001, they are quick enough to be virtually real-time transfers if the destination apparatus is not occupied.

The network system of the second embodiment thus enables the user of the mobile phone terminal 1002 to transmit through the phone terminal 1002 control information such as unattended recording reservation request bound for the VTR 1005 connected to the Internet TV set 1003. The transmitted control information is received and retained by the server apparatus 1001.

The control information bound for the VTR 1005 and retained by the server apparatus 1001 is acquired by the Internet TV set 1003 gaining access to the server as discussed above. With the control information acquired, the Internet TV set 1003 causes a remote control mouse 4 to emit remote control signals reflecting the received information to the VTR 1005 for remote control.

If the Internet TV set 1003 has set the VTR 1005 to operate in keeping with control information sent from the mobile phone terminal 1002, the TV set, 1003 acquires information resulting from the VTR operation. For example, if the control information constitutes an unattended recording reservation request, then the Internet TV set 1003 may acquire a picture in effect upon start of the recording by the VTR 1005 and another picture at the end of the recording. The acquired pictures are transferred to the mobile phone terminal 1002. The mobile phone terminal 1002 is thus notified that the VTR 1005 has acted in accordance with the control information sent by the phone terminal 1002.

When the server apparatus 1001 is furnished with data bound for the mobile phone terminal 1002 and Internet TV set 1003 and when the server 1001 notifies the latter of the data being retained, there is no need for the mobile phone terminal 1002 or the Internet TV set 1003 to respond to the notice promptly. Simply identification information such as a telephone number allocated to the server apparatus 1001 is sent to the mobile phone terminal 1002 and Internet TV set 1003. Given the identification information, the mobile phone terminal 1002 and Internet TV set 1003 subsequently gains access to the server apparatus 1001 to acquire the data in question as described above.

As described, the network system shown in FIG. 22 allows the user of the mobile phone terminal 1002 to transmit control information to the VTR 1005 installed at home, thereby controlling the VTR 1005 remotely. The result of the remote control is arranged to be sent back to the mobile phone terminal 1002.

[Data Flows Within the Network System]

What follows is a description of data flows between the configured components of the network system in FIG. 22. It is assumed that the user of the mobile phone terminal 1002 remotely controls the VTR 1005 installed at home. An unattended recording reservation is explained here as an example in which the start and end of the reserved recording by the VTR 1005 are controlled by the mobile phone terminal 1002.

Figure 23:
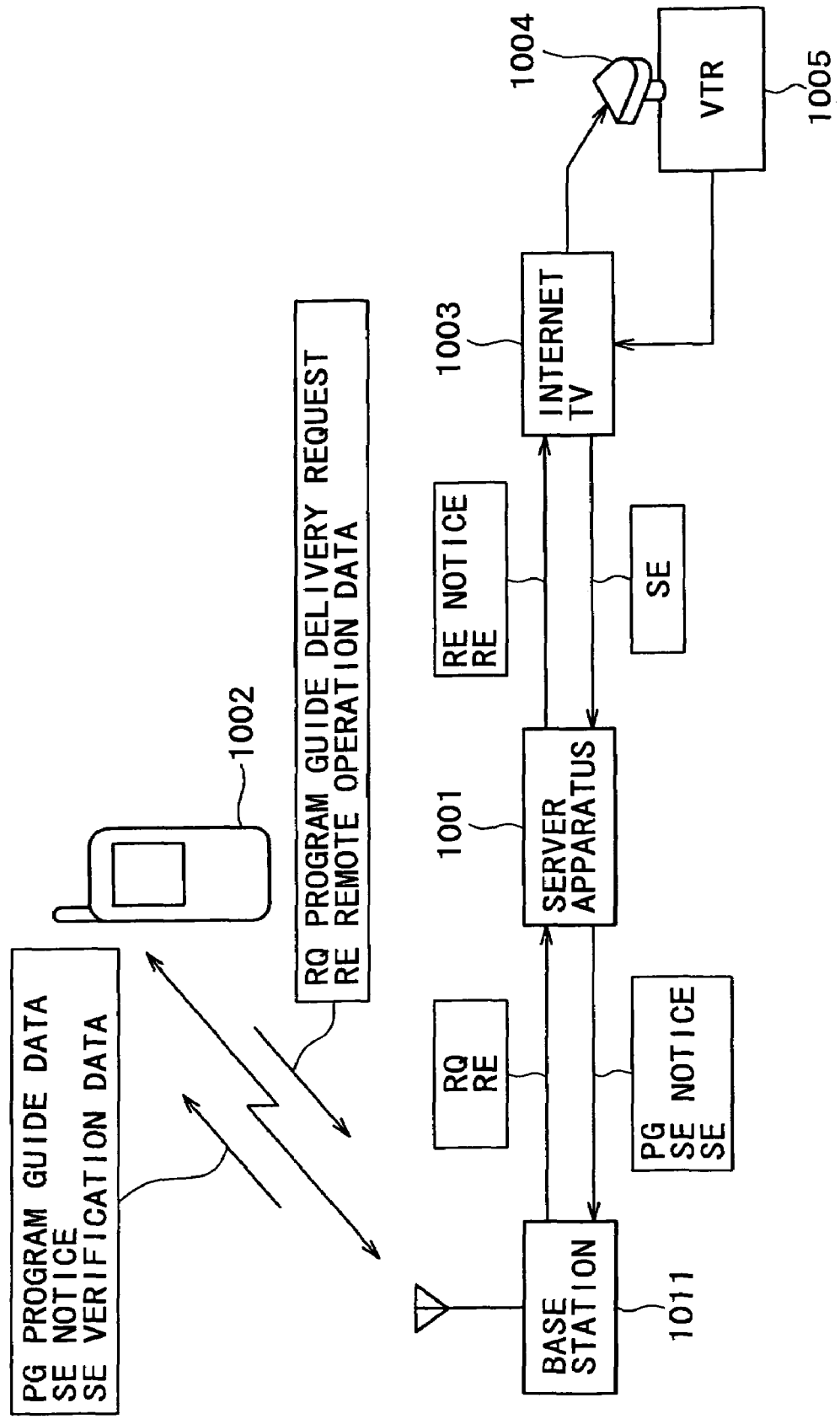
FIG. 23 is an explanatory view of data flows between configured components of the network system in FIG. 22.

FIG. 23 is an explanatory view of data flows between the configured components of the network system wherein the VTR 1005 is to be controlled by the mobile phone terminal 1002.

In the example of FIG. 23, the mobile phone terminal 1002 is arranged to receive an electronic program guide (i.e., a list of broadcast programs) from the server apparatus 1001 so that the phone user may accomplish the recording reservation on the VTR 1005 simply and unfailingly.

When the user of the mobile phone terminal 1002 wants to receive the electronic program guide from the server apparatus 1001, the user suitably operates the mobile phone terminal 1002 to generate a program guide delivery request RQ and, upon access to the server apparatus 1001 through the base station 1011, public communication network 1010, ISP server 1030 and the Internet 1020, transmits the request to the server apparatus 1001.

Given the program guide delivery request RQ from the mobile phone terminal 1002, the server apparatus 1001 performs an authentication process to determine whether the requesting mobile phone is a member of the system, authorized to receive the delivery program guide data PG making up the electronic program guide. Following the successful authentication, the server apparatus 1001 returns program guide data PG to the requesting mobile phone terminal 1002 in response to the program guide delivery request RQ.

The program guide data PG above may be categorized illustratively by date, by broadcast channel, by time zone, or by period (e.g., programs for the next week starting today) when downloaded. It is assumed that the mobile phone terminal 1002 has the ability to download data and that the server apparatus 1001 is capable of providing program guide data in diverse formats.

With the program guide data downloaded, the mobile phone terminal 1002 displays on its display device (e.g., LCD) an electronic program guide based on the downloaded data and receives from the user the input of an instruction to select a desired broadcast program. In turn, the user operates keys on the mobile phone terminal 1002 to position the cursor on the program guide display to the desired program to be reserved for unattended recording, and pushes the key to reserve the recording.

When the desired broadcast program is selected for recording reservation, the mobile phone terminal 1002 generates remote operation data (i.e., control information) RE constituting a recording reservation request made up of the selected broadcast channel, broadcast date, broadcast start time, broadcast stop time, and identification information of the mobile phone terminal 1002. The remote operation data RE are transmitted from the mobile phone terminal 1002 to the server apparatus 1001 via the base station 1011, ISP server 1030, and the Internet 1020.

On receiving the remote operation data RE from the mobile phone terminal 1002 with regard to the VTR 1005, the server apparatus 1001 retains the data RE preparatory to letting the data be transmitted to their destination. Based on relevant information in the remote operation data RE as well as on member information held in the server apparatus 1001, the server 1001 identifies a destination control communication terminal which, in this example, is the Internet TV set 1003.

Using a telephone number assigned to the identified Internet TV set 1003, the server apparatus 1001 places a call to the TV set 1003 over the public communication network 1010. The call notifies the Internet TV set 1003 that the remote operation data RE destined for the TV set 1003 have arrived (i.e., an RE notice is effected).

More specifically, the server apparatus 1001 gives a single ring to the Internet TV set 1003 before hanging up. The transmitted telephone number of the server apparatus 1001 serves as the RE notice effected by the server to the Internet TV set 1003.

In response to the call made by the server apparatus 1001, the Internet TV set 1003 accesses the server apparatus 1001 through the public communication network 1010, ISP server 1030 and the Internet 1020 to download the TV set-bound remote operation data RE. The Internet TV set 1003 analyzes the downloaded data RE, and sends remote control signals reflecting the result of the analysis to the VTR 1005 to control VTR operations.

If the remote operation data RE constitute an unattended recording reservation, the Internet TV set 1003 activates the VTR 1005 by supplying it with a remote control signal containing a power-on command when the recording start time is reached. The Internet TV set 1003 then sends to the VTR 1005 a remote control signal carrying a recording start command that causes the VTR 1005 to start recording the designated broadcast program on the designated channel. The remote control signals are transmitted via the AV mouse 1004.

When the recording stop time is reached, the Internet TV set 1003 transmits through the AV mouse 1004 a remote control signal containing a recording stop command that causes the VTR 1005 to stop recording the broadcast program. The Internet TV set 1003 then transmits a power-off command to the VTR 1005 to deactivate it and put it in standby mode. In this manner, the user of the mobile phone terminal 1002 can control the VTR 1005 remotely by having the remote operation data for recording reservation transmitted to the VTR 1005.

With the network system of this example, an image capture function of the Internet TV set 1003 captures a picture from the VTR 1005 in effect immediately after the recording thereby has started. The captured picture is resized so that it can be eventually displayed on the mobile phone terminal 1002. The resized picture is transmitted via the server apparatus 1001 to the mobile phone terminal 1002 as part of verification data SE, i.e., result information derived from the start of the recording.

More specifically, the Internet TV set 1003 generates verification data SE destined for the mobile phone terminal 1002 immediately after the recording has started as described above, the data SE including a captured and resized picture of the broadcast program being recorded. The data SE thus generated are transmitted to the server apparatus 1001 through the public communication network 1010, ISP server 1030 and the Internet 1020.

Upon receipt of the verification data SE destined for the mobile phone terminal 1002, the server apparatus 1001 retains the data preparatory to letting the data be subsequently forwarded to the destination. Based on relevant information in the verification data SE as well as on the member information held in the server apparatus 1001, the server 1001 identifies the telephone number of the destination mobile phone terminal 1002. Using the telephone number thus identified, the server apparatus 1001 places a call to the mobile phone terminal 1002 over the public switched communication 1010. The call notifies the mobile phone terminal 1002 that the verification data SE destined for the phone 1002 have arrived (i.e., SE notice).

As in the case of the RE notice effected by the server apparatus 1001 to the Internet TV set 1003, the server apparatus 1001 gives a single ring to the mobile phone terminal 1002 before hanging up. The transmitted telephone number of the server apparatus 1001 serves as the SE notice made by the server to the mobile phone terminal 1002.

In response to the call made by the server apparatus 1001, the mobile phone terminal 1002 accesses the server apparatus 1001 through the base station 1011, public communication network 1010, ISP server 1030 and the Internet 1020 to download the mobile phone-bound verification data SE. A picture corresponding to the downloaded verification data appears on the display device of the mobile phone terminal 1002.

As described, when the VTR 1005 starts its recording process normally in response to the remote control operation performed by the mobile phone terminal 1002, the user of the mobile phone terminal 1002 is notified of the normal start of the unattended recording on an approximately real-time basis.

Toward the end of the recording by the VTR 1005, as at the start, the Internet TV set 1003 captures a picture from the VTR 1005 in effect immediately before the recording ends. The captured picture is resized so that it can be eventually displayed on the mobile phone terminal 1002. The resized picture is transmitted via the server apparatus 1001 to the mobile phone terminal 1002 as part of verification data SE generated at this point. The transmitted picture notifies the user of the mobile phone terminal 1002 that the unattended recording by the VTR 1005 at home has normally ended, on an approximately real-time basis.

As described, when the mobile phone terminal 1002 as part of this embodiment is used remotely to control the VTR 1005 in the household, the Internet TV set 1003 sends information resulting from the remote control operations back to the mobile phone terminal 1002 for verification.

The user of the mobile phone terminal 1002 is thus notified in virtually real-time fashion that the VTR 1005 at home normally started and stopped the unattended recording in response to the remote control operations. The user of the mobile phone terminal 1002 is able to verify that the VTR 1005 operated normally, starting and stopping its recording process at designated times.

There is no need for the VTR 1005 to stay activated all the time; it is unnecessary to keep the Internet TV set 1003 and VTR 1005 constantly operable. Usually placed in standby mode, the Internet TV set 1003 and VTR 1005 can come into action in response to the received instructions. This arrangement prevents wasteful dissipation of power by these devices.

The apparatuses to be installed in the household are only the Internet TV set 1003, AV mouse 1004, and VTR 1005. They do not constitute a conventional large-scale system where numerous devices would have to be configured.

On receiving the remote operation data RE destined for the VTR 1005 from the mobile phone terminal 1002, the server apparatus 1001 retains the data preparatory to letting the data be subsequently forwarded to the destination. Based on relevant information in the remote operation data RE as well as on the member information held in the server apparatus 1001, the server 1001 identifies the destination control communication terminal which, in this case, is the Internet TV set 1003.

Using the telephone number assigned to the identified Internet TV set 1003, the server apparatus 1001 places a call to the TV set 1003 over the public communication network 1010. The call notifies the Internet TV set 1003 that the remote operation data RE destined for the TV set 1003 have arrived (i.e., an RE notice is effected).

More specifically, the server apparatus 1001 gives a single ting to the Internet TV set 1003 before hanging up. The transmitted telephone number of the server apparatus 1001 serves as the RE notice effected by the server to the Internet TV set 1003.

In response to the call made by the server apparatus 1001, the Internet TV set 1003 accesses the server apparatus 1001 through the public communication network 1010, ISP server 1030 and the Internet 1020 to download the TV set-bound remote operation data RE. The Internet TV set 1003 analyzes the downloaded data RE, and sends remote control signals reflecting the result of the analysis to the VTR 1005 to control VTR operations.

If the remote operation data RE constitute an unattended recording reservation, the Internet TV set 1003 activates the VTR 1005 by supplying it with a remote control signal containing a power-on command when the recording start time is reached. The Internet TV set 1003 then sends to the VTR 1005 a remote control signal carrying a recording start command that causes the VTR 1005 to start recording the designated broadcast program on the designated channel. The remote control signals are transmitted via the AV mouse 1004.

When the recording stop time is reached, the Internet TV set 1003 transmits through the AV mouse 1004 a remote control signal containing a recording stop command that causes the VTR 1005 to stop recording the broadcast program. The Internet TV set 1003 then transmits a power-off command to the VTR 1005 to deactivate it and put it in standby mode. Thus the user of the mobile phone terminal 1002 can control the VTR 1005 remotely by having the remote operation data for recording reservation transmitted to the VTR 1005.

With the network system of this example, the image capture function of the Internet TV set 1003 captures a picture from the VTR 1005 in effect immediately after the recording thereby has started. The captured picture is resized so that it can be eventually displayed on the mobile phone terminal 1002. The resized picture is transmitted via the server apparatus 1001 to the mobile phone terminal 1002 as part of verification data SE, i.e., result information derived from the start of the recording.

More specifically, the Internet TV set 1003 generates verification data SE destined for the mobile phone terminal 1002 immediately after the recording has started as described above, the data SE including a captured and resized picture of the broadcast program being recorded. The data SE thus generated are transmitted to the server apparatus 1001 through the public communication network 1010, ISP server 1030 and the Internet 1020.

Upon receipt of the verification data SE destined for the mobile phone terminal 1002, the server apparatus 1001 retains the data preparatory to letting the data be subsequently forwarded to the destination. Based on relevant information in the verification data SE as well as on the member information held in the server apparatus 1001, the server 1001 identifies the telephone number of the destination mobile phone terminal 1002. Using the telephone number thus identified, the server apparatus 1001 places a call to the mobile phone terminal 1002 over the public communication network 1010. The call notifies the mobile phone terminal 1002 that the verification data SE destined for the phone 1002 have arrived (i.e., SE notice).

As in the case of the RE notice effected by the server apparatus 1001 to the Internet TV set 1003, the server apparatus 1001 gives a single ring to the mobile phone terminal 1002 before hanging up. The transmitted telephone number of the server apparatus 1001 serves as the SE notice made by the server to the mobile phone terminal 1002.

In response to the call made by the server apparatus 1001, the mobile phone terminal 1002 accesses the server apparatus 1001 through the base station 1011, public communication network 1010, ISP server 1030 and the Internet 1020 to download the mobile phone-bound verification data SE. A picture corresponding to the downloaded verification data appears on the display device of the mobile phone terminal 1002.

As described, when the VTR 1005 starts its recording process normally in response to the remote control operation performed by the mobile phone terminal 1002, the user of the mobile phone terminal 1002 is notified of the normal start of the unattended recording on an approximately real-time basis.

Toward the end of the recording by the VTR 1005, as at the start, the Internet TV set 1003 captures a picture from the VTR 1005 in effect immediately before the recording ends. The captured picture is resized so that it can be eventually displayed on the mobile phone terminal 1002. The resized picture is transmitted via the server apparatus 1001 to the mobile phone terminal 1002 as part of verification data SE generated at this point. The transmitted picture notifies the user of the mobile phone terminal 1002 that the unattended recording by the VTR 1005 at home has normally ended, on an approximately real-time basis.

As described, when the mobile phone terminal 1002 as part of this embodiment is used remotely to control the VTR 1005 in the household, the Internet TV set 1003 sends information resulting from the remote control operations back to the mobile phone terminal 1002 for verification.

The user of the mobile phone terminal 1002 is thus notified in virtually real-time fashion that the VTR 1005 at home normally started and stopped the unattended recording in response to the remote control operations. The user of the mobile phone terminal 1002 is able to verify that the VTR 1005 operated normally, starting and stopping its recording process at designated times.

There is no need for the VTR 1005 to stay activated all the time; it is unnecessary to keep the Internet TV set 1003 and VTR 1005 constantly operable. Usually placed in standby mode, the Internet TV set 1003 and VTR 1005 can come into action in response to the received instructions. This arrangement prevents wasteful dissipation of power by these devices.

The apparatuses to be installed in the household are only the Internet TV set 1003, AV mouse 1004, and VTR 1005. They do not constitute a conventional large-scale system where numerous devices would have to be configured.

[Chronologically-Ordered Operations of the Network System]

The data flows within the network system were described above with reference to FIG. 23. What follows is a description of how the network system of this embodiment operates when an unattended recording reservation is set on the VTR 1005 from the mobile phone terminal 1002. The operations will be described in chronologically ordered fashion.

Figure 24:
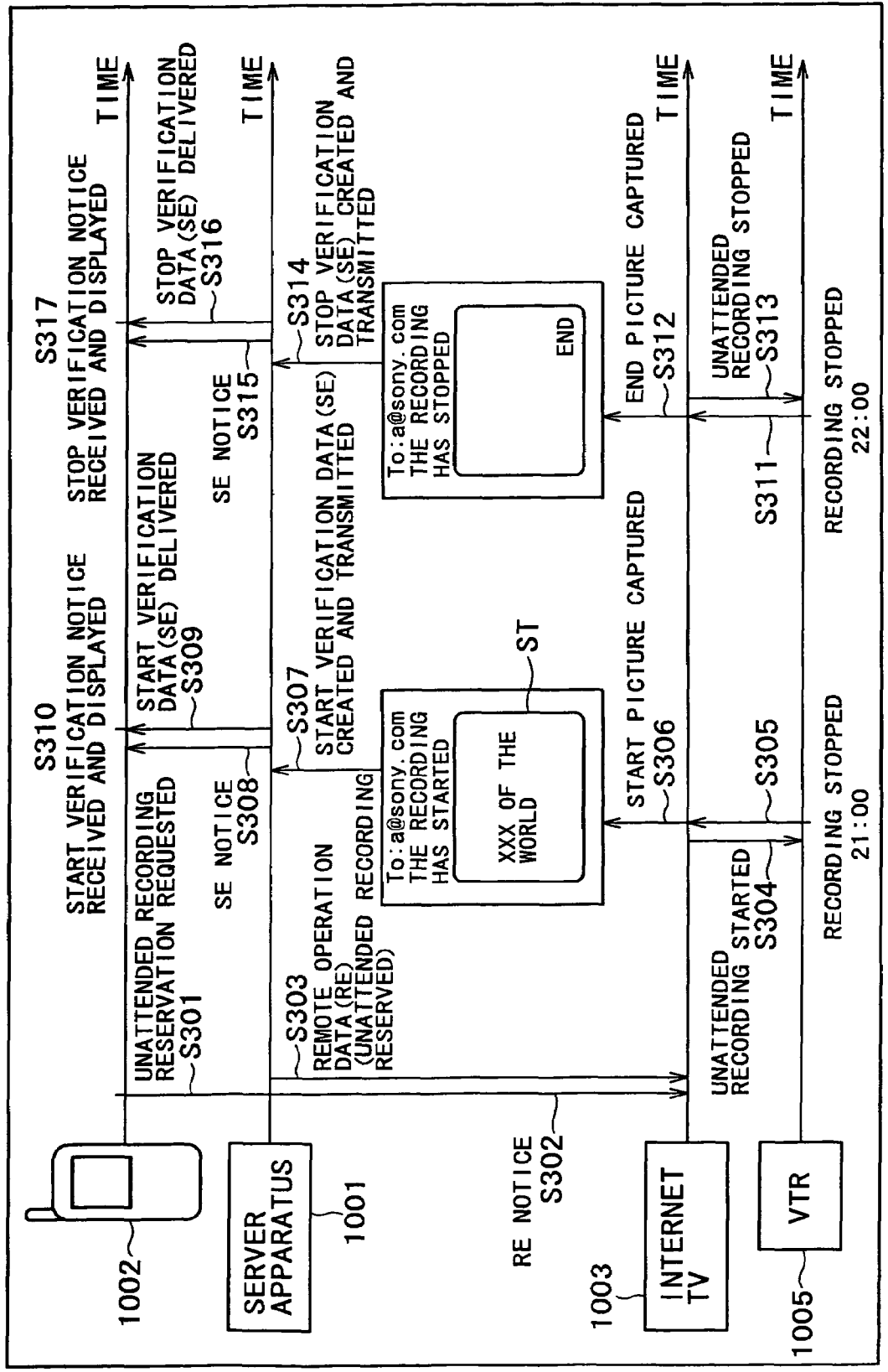
FIG. 24 is an explanatory view of operations performed by the network system in FIG. 22 when an unattended recording reservation is made on a VTR 5 through a mobile telephone terminal 2.

FIG. 24 is an explanatory view of operations performed by the network system of this embodiment where an unattended recording reservation is made on the VTR 1005 through the mobile telephone terminal 1002. In FIG. 24, vertical arrowed lines denote the flow of information, illustratively from the mobile phone terminal 1002 to the server apparatus 1001, and horizontal arrowed lines represent the passage of time.

In FIG. 24, it is assumed that the mobile phone terminal 1002 has already acquired program guide data. The operation to be performed on the mobile phone terminal 1002 to obtain the guide data will not be discussed hereunder.

As described above, when the user of the mobile phone terminal 1002 operates the phone to make a recording reservation on the VTR 1005, the mobile phone terminal 1002 generates at unattended recording reservation request having remote operation data RE including the broadcast channel to be recorded, broadcast date, broadcast start time, broadcast stop time, and identification information about the phone 1002. The generated request is transmitted from the mobile phone terminal 1002 to the server apparatus 1001 over the Internet 1020 (step S301) in the manner discussed above.

The server apparatus 1001 receives from the mobile phone terminal 1002 the unattended recording reservation request having the remote operation data RE with regard to the VTR 1005, and retains the received request. In accordance with the request, as discussed above, the server apparatus 1001 identifies the destination control communication terminal which, in this example, is the Internet TV set 1003. Over the public communication network 1010, the server apparatus 1001 then notifies the Internet TV set 1003 that the remote operation data RE have arrived (step S302).

When notified of the retained remote operation data RE (i.e., RE notice), the Internet TV set 1003 accesses the server apparatus 1001 through the Internet 1020 as described in order to receive the remote operation data RE destined for the TV set 1003 (step S303). With the received remote operation data RE analyzed, the Internet TV set 1003 controls the VTR 1005 in a manner reflecting the result of the analysis.

The remote operation data RE from the mobile phone terminal 1002 constitute the unattended recording reservation request in this example. The Internet TV set 1003 then causes the AV mouse 1004 to send to the VTR 1005 a remote control signal which activates the VTR 1005 when the recording start time (21:00 in this example) is reached and which causes the VTR 1005 to start recording the program broadcast over the designated channel (step S304). Given the remote control signal, the VTR 1005 starts recording the broadcast program in question (step S305).

The VTR 1005 supplies the Internet TV set 1003 with the broadcast signal being recorded., The Internet TV set 1003 captures a picture of the currently-recorded broadcast program (step S306). The Internet TV set 1003 then generates verification data SE for verifying the start of the recording, including the captured picture resized illustratively into a starting picture ST shown in FIG. 24. The generated verification data SE are transmitted from the Internet TV set 1003 to the server apparatus 1001 (step S307).

The server apparatus 1001 receives the recording start verification data SE from the Internet TV set 1003. With the received data SE retained, the server apparatus 1001 notifies the mobile phone terminal 1002 via the public communication network 1010 that the verification data SE have arrived (step S308).

When notified of the retained verification data SE (SE notice), the mobile phone terminal 1002 accesses the server apparatus 1001 through the Internet 1020 to receive the verification data SE destined for the phone 1002 (step S309) as discussed above. Given the verification data SE from the server apparatus 1001, the mobile phone terminal 1002 displays a picture reflecting the data SE on its display device (step S310). This notifies the user of the mobile phone terminal 1002 that the VTR 1005 has normally started recording the designated program in keeping with the recording reservation made through the phone 1002.

When the recording stop time (22:00 in this example) is about to be reached, the Internet TV set 1003 captures a picture of the currently recorded broadcast program whose broadcast signal is being fed to the TV set 1003 (step S303). The Internet TV set 1003 then causes the AV mouse 1004 to send to the VTR 1005 a remote control signal for ending the recording process and deactivating the VTR 1005 (step S313). This completes the recording process of the VTR 1005.

The Internet TV set 1003 generates recording end verification data SE containing a picture obtained by resizing the picture captured as described above, such as an ending picture ED shown in FIG. 24. The generated verification data SE are transmitted from the Internet TV set 1003 to the server apparatus 1001 (step S314).

The server apparatus 1001 receives the recording end verification data SE from the Internet TV set 1003. With the received data SE retained, the server apparatus 1001 notifies the mobile phone terminal 1002 via the public communication network 1010 that the verification data SE have arrived (step S315).

When notified of the retained verification data SE (SE notice), the mobile phone terminal 1002 accesses the server apparatus 1001 via the Internet 1020 to receive the verification data SE destined for the phone 1002 as described above (step S316). With the verification data SE received from the server apparatus 1001, the mobile phone terminal 1002 displays a picture reflecting the data SE on its display device (step S317). This notifies the user of the mobile phone terminal 1002 that the VTR 1005 has operated normally, stopping the recording process in keeping with the recording reservation made through the phone 1002.

The typical setup above was shown having the broadcast channel, recording start time, and recording stop time designated to make an unattended recording reservation for causing the reserved broadcast program to be recorded on a video tape consecutively from the reserved recording start time to the reserved recording stop time. However, this arrangement is not limitative of the invention.

For example, it is also possible to designate individually a particular process such as the start of the recording of a program over a specific channel, the stop of an ongoing recording, the rewinding of a recorded tape, or the stop of an ongoing rewind operation. That is, the VTR 1005 is controlled as desired in a virtually real-time manner by the mobile phone terminal 1002 and Internet TV set 1003 interconnected through the networks 10 and 20.

[Typical Structures of the Components Making up the System]

What follows is a description of typical structures of the components making up the network system configured as shown in FIG. 22, the system being arranged to provide communication as explained above with reference to FIGS. 23 and 24 to let the mobile phone terminal 1002 remotely control the VTR 1005.

[Typical Structure of the Server Apparatus 1001]

Figure 25:
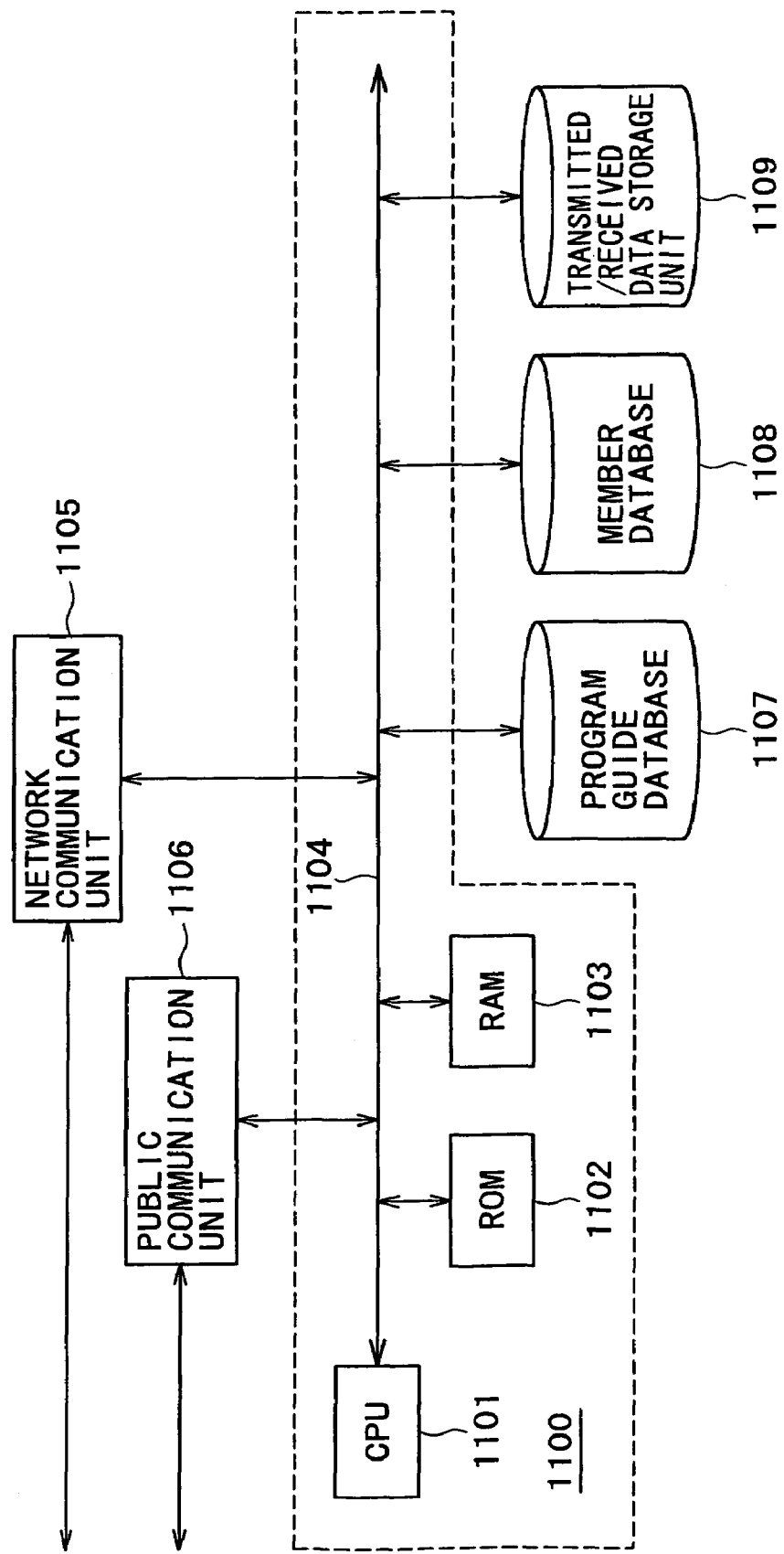
FIG. 25 is a block diagram showing a typical structure of a server apparatus 1001 embodying the invention and used by the network system in FIG. 22.

How the server apparatus 1001 is typically structured will now be described. FIG. 25 is a block diagram showing a representative structure of the server apparatus 1001 used by this embodiment of the invention. As shown in FIG. 25, the server apparatus 1001 of this invention includes a control unit 1100 for controlling the component parts of the server apparatus 1001.

The control unit 1100 is a microcomputer constituted by a CPU 1101, a ROM 1102 and a RAM 1103 interconnected through a CPU bus 1104. The ROM 1102 retains various programs executed by the CPU 1101 as well as data that may be needed by the CPU 1101 during program execution. The RAM 1103 mainly functions as a work area that temporarily accommodates halfway results of diverse processes.

As depicted in FIG. 25, the control unit 1100 is connected to a network communication unit 1105, a public communication unit 1106, a program guide database 1107, a member database 1108, and a transmitted/received data storage unit 1109. The network communication unit 1105 is designed to communicate over the Internet 1020. The public communication unit 1106 is arranged to communicate over the public communication network 1010. The program guide database 1107 is implemented illustratively by use of a hard disc drive.

The network communication unit 1105 connected to the Internet 1020 receives data bound for the server apparatus 1001 over the Internet 1020, demodulates the received data, and supplies the demodulated data to the control unit 1100. Under instructions from the control unit 1100, the network communication unit 1105 generates outgoing data illustratively by modulating data held in the transmitted/received data storage unit 1109, and transmits the generated data to a designated destination via the Internet 1020.

The public communication unit 1106 connected to the public communication network 1010 receives and responds to a call placed to the server apparatus 1001 through the public communication network 1010, receives transmitted data, demodulates the received data, and supplies the demodulated data to the control unit 1100. Under instructions from the control unit 1100, the public communication unit 1106 places a call to a designated destination and notifies the called party of the identification number assigned to the server apparatus 1001.

The program guide database 1107, as described above, is designed to retain the program guide data that are offered in response to the program guide delivery request RQ sent from the mobile phone terminal 1002 over the Internet 1020. The program guide database 1107 is updated in its content illustratively every day to retain the consecutive program guide data on available broadcast channels for a predetermined period of time starting today.

The member database 1108 holds member data about each member who has signed a membership contract with the administrator of the server apparatus 1001 for services related to communication within the system. The member data include the name and address of each member, member identification information, telephone number and e-mail address of the mobile phone terminal 1002 belonging to the member in question, and telephone number and e-mail address of electronic equipment such as the Internet TV set 1003 acting on behalf of the member as a control communication terminal communicating with the server. The server apparatus 1001 provides the members registered in the member database 1108 with diverse kinds of services including the delivery of program guide data and mediation between communicating parties.

The transmitted/received data storage unit 1109 is designed to store various transmitted and received data. Mostly, however, the storage unit 1109 retains data to be transmitted to the control communication terminal for controlling each member's mobile phone 1002 and electronic equipment such as Internet TV set 1003. In other words, the transmitted/received data storage unit 1109 serves like a mail box of the so-called mail server.

As described above, upon receiving a program guide delivery request from the mobile phone terminal 1002 via the network communication unit 1105, the control unit 1100 of the server apparatus 1001 extracts the requested program guide data from the program guide database 1107. The extracted program data are output onto the Internet 1020 through the network communication unit 1105 for transmission to the requesting mobile phone terminal 1002.

In addition, the control unit 1100 of the server apparatus 1001 receives through the network communication unit 1105 remote operation data RE from the mobile phone terminal 1002 with regard to the VTR 1005 connected to the Internet TV set 1003, as well as verification data SE sent by the Internet TV set 1003 for transfer to the mobile phone terminal 1002 that originated the remote operation data RE. The received data are placed into the transmitted/received data storage unit 1109 by the control unit 1100.

Based on relevant information in the remote operation data RE or verification data SE received and placed into the transmitted/received data storage unit 1109, as well as on information in the member database, the server 1001 identifies the telephone number of the destination to which to forward the data RE or SE (i.e., delivery destination). Using the telephone number thus identified, the server apparatus 1001 places a call to the delivery destination through the public communication unit 1106 as described announcing that the data to be delivered have arrived.

The control unit 1100 of the server apparatus 1001 then receives through the network communication unit 1105 a data delivery request from the Internet TV set 1003 for which the remote operation data RE are destined or from the mobile phone terminal 1002 for which the verification data SE are bound. In response to the request, the control unit 1100 delivers the remote operation data RE or verification data SE to the Internet TV set 1003 or to the mobile phone terminal 1002 respectively through the network communication unit 1005 and over the Internet 1020.

As described, the server apparatus 1001 of this embodiment offers two capabilities: capability to provide the mobile phone terminal 1002 with the program guide data constituting an electronic program guide as requested, and capability to mediate communication between the mobile phone terminal 1002 and the Internet TV set 1003 acting as the control communication terminal.

[Typical Structure of the Mobile Phone Terminal 1002]

Figure 26:
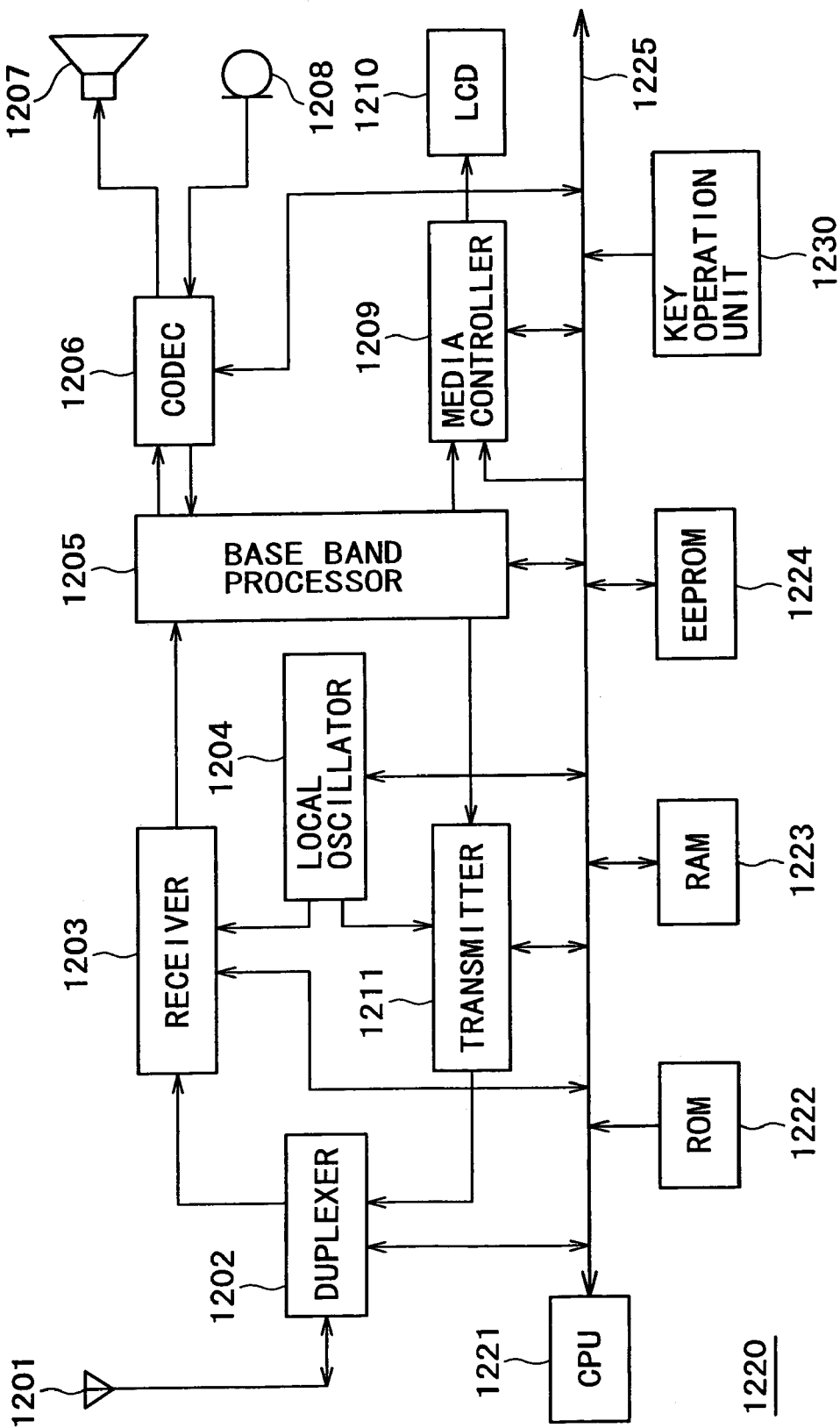
FIG. 26 is a block diagram depicting a typical structure of a mobile phone terminal 1002 for use by the network system in FIG. 22.

How the mobile phone terminal 1002 is typically structured will now be described. FIG. 26 is a block diagram depicting a representative structure of the mobile phone terminal 1002 for use by this embodiment. As shown in FIG. 26, the mobile phone terminal 1002 comprises a transmission/reception antenna 1201, an antenna duplexer 1202, a receiver 1203, a local oscillator 1204 acting as a frequency synthesizer, a base band processor 1205, a codec 1206, a speaker 1207, a microphone 1208, a media controller 1209, an LCD 1210, and a key operation unit 1230.

A control unit 1220 for controlling the component parts of the mobile phone terminal 1002 is constituted by a CPU 1221, a ROM 1222, a RAM 1223, and an EEPROM 1224 interconnected via a CPU bus 1225.

The ROM 1222 retains various programs executed by the CPU 1221 as well as data that may be needed by the CPU 1221 during program execution. The RAM 1223 mainly functions as a work area that temporarily accommodates halfway results of diverse processes. The EEPROM 1224 is a so-called nonvolatile memory that keeps data written therein when power is removed. As such, the EEPROM 1224 holds various settings and parameters that are needed for establishing connection with the Internet 1020.

The key operation unit 1230 connected to the control unit 1220 receives input instructions from the user. The key operation unit 1230 includes numerical keys, a plurality of function keys, and a so-called jog dial key that may be both rotated and depressed to make selections.

Although not shown in FIG. 26, the mobile phone terminal 1002 used by the second embodiment further includes a ringer and a vibrator for announcing the arrival of a call and for giving warnings.

The signal coming from the base station is received by the antenna 1201 and forwarded through the antenna duplexer 1202 to the receiver 1203. The received signal fed to the receiver 1203 is amplified thereby up to a predetermined level for demodulation. After the demodulation, the received signal is supplied to the base band processor 1205.

The base band processor 1205 restores the original digital signal from the received signal having been demodulated. The restored digital signal is supplied to the codec 1206 if the signal is a video signal, to the control unit 1220 if the signal constitutes system information such as control information destined for the phone, or to the media controller 1209 if the signal makes up-display information such as picture information.

The codec 1206 converts the digital audio signal coming from the base band processor 1205 into an analog audio signal and supplies the resulting analog signal to the speaker 1207. The speaker 1207 outputs sounds corresponding to the original audio signal that has been transmitted.

The sound picked up by the microphone 1208 is fed to the codec 1206 as an analog audio signal. The codec 1206 converts the analog audio signal coming from the microphone 1208 into a digital audio signal that is forwarded to the base band processor 1205.

The base band processor 1205 subjects the digital audio signal from the codec 1206 to predetermined processes such as data compression, and supplies the processed digital signal to a transmitter 1211. The transmitter 1211 generates an outgoing signal by modulating and amplifying the supplied digital signal, and causes the generated signal to be transmitted via the duplexer 1202 and antenna 1201. As described, the mobile phone terminal 1002 is capable of making a phone call using its telephone capabilities.

If the received signal turns out to be system information such as control information destined for the phone, the received signal is sent to the control unit 1220 which in turn forwards the signal illustratively to the EEPROM 1224 for storage. The control signal thus stored is then used by the mobile phone terminal 1002 for control purposes.

If the received signal constitutes display information such as picture information, the signal is sent from the base band processor 1205 to the media controller 1209. Given the display information, the media controller 1209 generates a display signal in an LCD-ready format and feeds the generated signal to the LCD 1210. The received display information is thus displayed on the LCD 1210.

The display information held by the mobile phone terminal 1002 such as menus for allowing processes to be selected is made up of character data and other resources stored in the ROM 1222 and EEPROM 1224. The phone's display information is fed from the control unit 1220 to the media controller 1209, so that the latter causes the information to be displayed on the LCD 1210.

When placing a call from the mobile phone terminal 1002 to a desired party, the phone user operates the key operation unit 1230 either to input the telephone number of the opposite party or to select relevant telephone directory data. Given the telephone number or the selected data, the control unit 1220 generates calling data and supplies the generated data to the transmitter 1211. The transmitter 1211 causes the data to be transmitted to the destination so that the desired party will be called.

When gaining access from the mobile phone terminal 1002 to the server apparatus 1001, the phone user suitably operates the key operation unit 1230 to request connection with the Internet 1020. In turn, the control unit 1220 generates an Internet connection request and transmits the request via the transmitter 1211, duplexer 1202 and antenna 1201. The request thus transmitted allows the mobile phone terminal 1002 to access the server apparatus 1001 through the public communication network 1010, ISP server 1030, and the Internet 1020.

Having accessed the server apparatus 1001, the mobile phone terminal 1002 receives the program guide data from the server and causes a program guide reflecting the received data to be displayed on the LCD 1210 by means of the media controller 1209. The control unit 1220 receives program selection input from the user operating the key operation unit 1230, generates an unattended recording reservation request reflecting the input, and transmits the generated request via the transmitter 1211, duplexer 1202 and antenna 1201.

As described, the mobile phone terminal 1002 can both make telephone calls just like conventional mobile phones and gain access to Internet websites to acquire diverse kinds of information therefrom. When supplied with the program guide data from the server apparatus 1001, the mobile phone terminal 1002 may further function as a remote control commander for the VTR 1005.

[Typical Structure of the Internet TV Set 1003]

Figure 27:
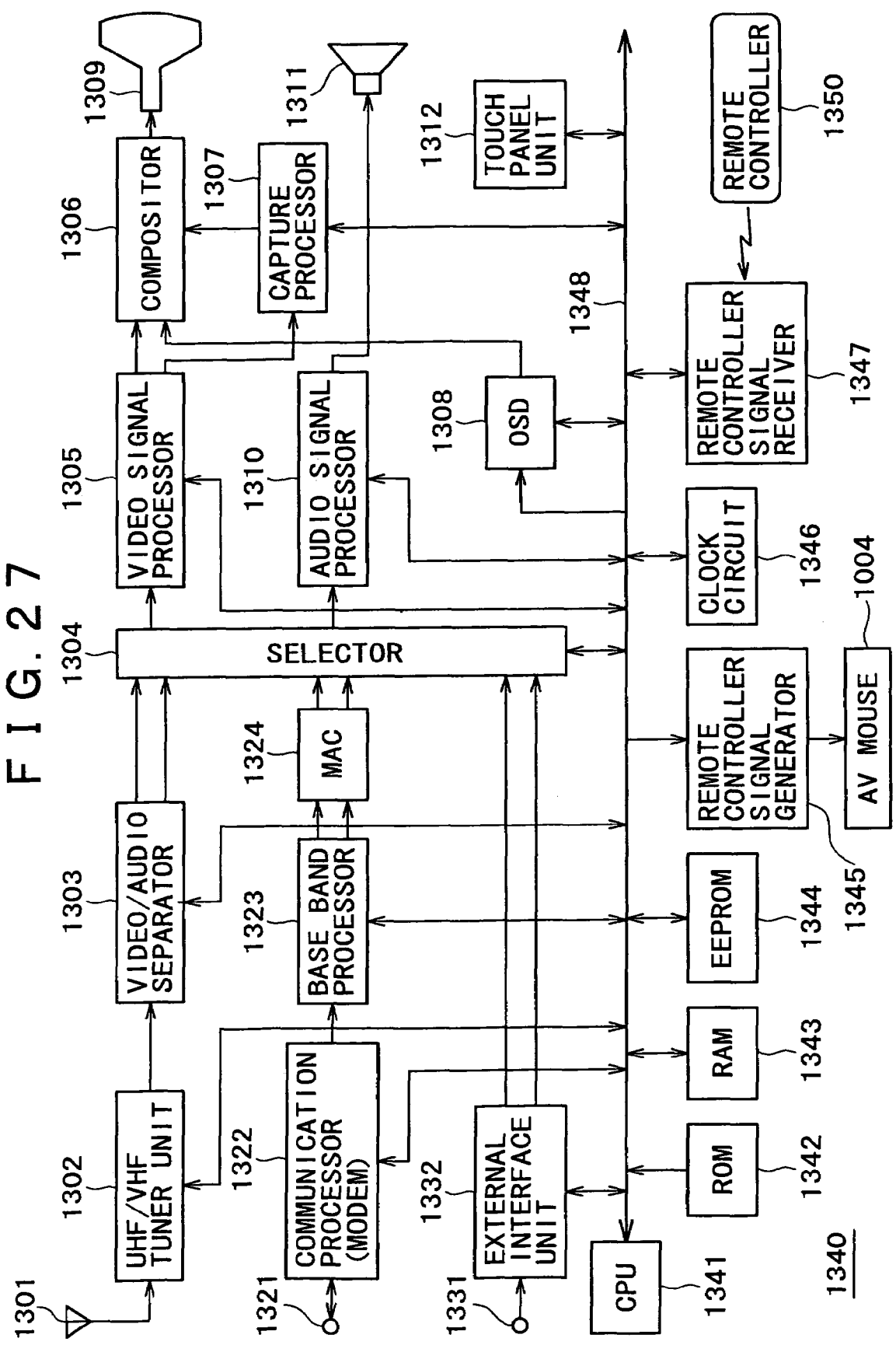
FIG. 27 is a block diagram illustrating a typical structure of an Internet TV set 1003 which is used by the network system in FIG. 22 and to which a control communication terminal as part of the second embodiment of this invention is applied.

How the Internet TV set 1003 is typically structured will now be described. FIG. 27 is a block diagram illustrating a representative structure of the Internet TV set 1003 used by this embodiment of the invention.

As shown in FIG. 27, the Internet TV set 1003 has three signal processing blocks: a terrestrial analog TV broadcast signal processing block composed of a reception antenna 1301, a UHF/VHF tuner unit 1302, and a video/audio separator 1303; a communication data processing block constituted by a communication processor (i.e., modem) 1322, a base band processor 1323, and a media access controller (MAC) 1324; and an external signal processing block comprising an external interface unit 1332 for receiving externally supplied signals.

Downstream of the three process blocks are a selector 1304, a video signal processor 1305, a compositor 1306, a capture processor 1307, an OSD (on-screen display) circuit 1308, a display unit 1309, an audio signal processor 1310, and speakers 1311. With this embodiment, the screen of the display unit 1309 is furnished with a touch panel unit 1312.

The three processing blocks and the downstream circuits are controlled by a control unit 1340. The control unit 1340 is a microcomputer constituted by a CPU 1341, a ROM 1342, a RAM 1343, and an EEPROM 1344 interconnected via a CPU bus 1348.

The ROM 1342 retains various programs executed by the CPU 1341 as well as data that may be needed by the CPU 1341 during program execution. The RAM 1343 mainly functions as a work area that temporarily accommodates halfway results of diverse processes. The EEPROM 1344 is a so-called nonvolatile memory that keeps data written therein when power is removed. As such, the EEPROM 1344 holds various settings and parameters that are needed for establishing connection with the Internet.

The control unit 1340 is connected to a remote controller signal generator 1345. As shown in FIGS. 22 and 23, the remote controller signal generator 1345 is connected to the AV mouse 1004. The remote controller signal generator 1345 combines with the AV mouse 1004 to control the VTR 1005 connected to the Internet TV set 1003.

The control unit 1340 is also connected to a clock circuit 1346. The clock circuit 1346 provides the current year, current month, current day of the month, current day of the week, and current time of day. That is, the clock circuit 1346 offers time information for use in determining whether a recording start time or a recording stop time is reached or not, as will be discussed later.

The control unit 1340 is further connected to a remote controller signal receiver 1347. The remote controller signal receiver 1347 receives an infrared remote controller signal from a remote control commander (i.e., remote controller) that acts as a remote operation device operated by the user of the Internet TV set 1003 for remote control purposes. The received remote controller signal is converted to an electrical signal and sent to the control unit 1340.

Given the remote controller signal from the remote controller signal receiver 1347, the control unit 1340 controls relevant circuits accordingly. The remote controller allows the user of the Internet TV set 1003 to give instructions to the TV set without coming close to the display unit 1309. That is, using the remote controller, the user can readily select the signal block to be used, select different broadcast channels, adjust the volume and quality of sounds to be output as well as the quality of pictures to be displayed, and create and transmit an e-mail.

Terrestrial analog TV broadcast signals received by the reception antenna 1301 are forwarded to the UHF/VHF tuner unit 1302 whereby a desired TV station is selected on the basis of a tuning control signal coming from the control unit 1340. The selected analog TV broadcast signal is demodulated by the tuner unit 1302 before being fed to the video/audio separator 1303 located downstream. The video/audio separator 1303 separates the demodulated analog TV broadcast signal into a video signal and an audio signal and supplies the signals separately to the selector 1304.

The communication processor 1322 in the communication data processing block is connected to a telephone line through a modular jack 1321 at the end of the telephone line led into the household from the public communication network (i.e., telephone network).

The communication processor 1322 is a modem that provides communication capabilities for demodulating received signals and modulating outgoing signals. When establishing connection with the Internet 1020, the control unit 1340 causes the communication processor 1322 to place a call to the ISP server using the latter's telephone number registered in the EEPROM 1344. With a communication line established with the ISP server, the control unit 1340 connects to the Internet 1020 through the ISP server.

The control unit 1340 then outputs the URL of a desired web page through the communication processor 1322 to access and utilize the web page of interest held in the relevant server apparatus. The data downloaded from the web page over the Internet 1020 are demodulated by the communication processor 1322 before being fed to the base band processor 1323.

The base band processor 1323 decompresses the supplied communication data that have been compressed so as to restore the original communication data, and feeds the restored data to the MAC 1324. The MAC 1324 in collaboration with the control unit 1340 activates a predetermined browser and generates video and audio signals out of the video and audio data supplied as the downloaded web page, the generated video and audio data being intended for use in displaying pictures and outputting sounds of the web page. The generated video and audio signals are sent to the selector 1304.

An external signal such as the output signal from the VTR is input through an input terminal 1331 and received by the external interface unit 1332. The external interface unit 1332 separates the received signal into a video signal and an audio signal and sends the separated signals to the selector 1304.

Under control of the control unit 1340, the selector 1304 selects the processing block from which to receive the video and audio signals for output through the selector 1304. The video signal is supplied to the video signal processor 1305 and the audio signal to the audio signal processor 1310.

Given the video signal, the video signal processor 1305 generates a video signal ready for display onto the display unit 1309 and sends the generated video signal through the compositor 1306 to the display unit 1309. In turn, the screen of the display unit 1309 displays the pictures corresponding to the video signal output through the selector 1304.

Upon receipt of the audio signal, the audio signal processor 1310 generates an audio signal ready for output through the speakers 1311 and sends the generated audio signal to the speakers 1311. In turn, the speakers 1311 output the sounds reflecting the audio signal output through the selector 1304.

If the selector 1304 under control of the control unit 1340 selects the terrestrial analog TV broadcast signal processing block, then the video and audio signals coming from the video/audio separator 1303 are output through the selector 1304. The pictures and sounds of a TV broadcast program are then output on the display unit 1309 and through the speakers 1311 for the user to view and hear.

If the selector 1304 under control of the control unit 1340 selects the communication data processing block, then the video and audio signals constituting a web page and coming from the MAC 1324 are output through the selector 1304. The content of the web page is then presented to the user in terms of the pictures displayed on the screen of the display unit 1309 and the sounds output through the speakers 1311.

The control unit 1340 illustratively causes the OSD unit 1308 to superpose a movable arrow mark onto a displayed picture. This arrow mark is used to point to thumbnails or other items on the web page. The control unit 1340 keeps track of the arrow position on the display screen and, based on information from the MAC 1324, grasps displayed information such as the thumbnail corresponding to the arrow position as well a URL and other information associated with the displayed information.

Upon receiving the input of, say, a thumbnail selection instruction through a remote controller 1350, the control unit 1340 transmits the URL and other information corresponding to the selected thumbnail through the communication processor 1322 so as to acquire new picture and sound information or to access another web page.

If the selector 1304 under control of the control unit 1340 is instructed to select the external input processing block, then the video and audio signals input through the external interface unit 1332 are output through the selector 1304. The pictures and sounds coming from external equipment are then displayed on the display unit 1309 and output through the speakers 1311 for the user to view and hear.

As mentioned above, the OSD unit 1308 generates superposing display information such as the arrow mark and guidance messages that are superposed onto the displayed picture. The display information generated by the OSD unit 1308 is supplied to the compositor 1306. In turn, the compositor 1306 superposes the picture coming from the OSD unit 1308 onto the video signal from the video signal processor 1305, and displays a video signal having undergone the superposing process.

The arrangements above make it possible to superpose the arrow mark movably onto the main video signal and to display diverse kinds of information, such as a display showing which processing block is being selected, a display indicating which TV broadcast channel is being selected, and a bar-like indication of the sound volume being adjusted.

As shown in FIG. 27, the video signal from the video signal processor 1305 is also fed to the capture processor 1307. Under control of the control unit 1340, the capture processor 1307 captures a single-frame video signal immediately after a designated point in time, the captured signal being arranged to represent a regular whole-screen picture. That is, the capture processor 1307 captures a video signal constituting a single-frame picture to be displayed over the whole screen in a manner preventing any other adjacent frame pictures from getting displayed side by side.

The capture processor 1307 may turn the captured single-frame video signal into a still picture that is displayed on the display unit 1309 via the compositor 1306. The capture processor 1307 may also convert the captured single-frame video signal into single-frame picture data that are stored into the RAM 1343 of the control unit 1340.

From the single-frame picture data (captured data) placed in the RAM 1343, the control unit 1340 generates picture data for displaying a captured picture resized to fit into the display screen of the mobile phone terminal 1002. The control unit 1340 generates e-mail data containing the resized picture, gets the generated e-mail data addressed to the mobile phone terminal 1002, and causes the e-mail data to be transmitted to the server apparatus 1001 via the communication processor 1322.

The compositor 1306, capture processor 1307, and OSD unit 1308 are not in operation at all times. Each of them may be activated only when necessary.

As described, the Internet TV set 1003 of this embodiment comprises the communication data processing block made up of the communication processor 1322, base band processor 1323, and MAC 1324. When the browser is activated by the MAC 1324 and control unit 1340 working together as described, the user operating the remote controller 1350 can easily access the desired server apparatus 1001 to browse web pages and to exchange e-mails.

Using its Internet connection capability, the Internet TV set 1003 of this embodiment can access the server apparatus 1001, acquire remote operation data destined for the TV set, cause the remote controller signal generator 1345 to generate a remote controller signal reflecting the acquired remote operation data, and transmit the generated remote controller signal to the VTR 1005 via the AV mouse 1004 for VTR control purposes.

In addition, where an unattended recording reservation is set remotely on the VTR 1005 from the mobile phone terminal 1002, the above-described capability of the capture processor 1307 captures a picture immediately after the start of the reserved recording and a picture immediately before the end of the recording. The captured pictures are resized and sent through the server apparatus 1001 back to the mobile phone terminal 1002 that made the recording reservation by remote control.

[Workings of the Configured Devices]

In the network system of this embodiment made of the devices whose structures were discussed above with reference to FIGS. 25 through 27, an unattended recording reservation is set on the VTR 1005 remotely from the mobile phone apparatus 1002 in the manner outlined above with reference to FIGS. 23 and 24. What follows is a more detailed description of how such a recording reservation is accomplished by the configured devices of the system, with reference to the flowcharts of FIGS. 28 through 33.

Figure 28:
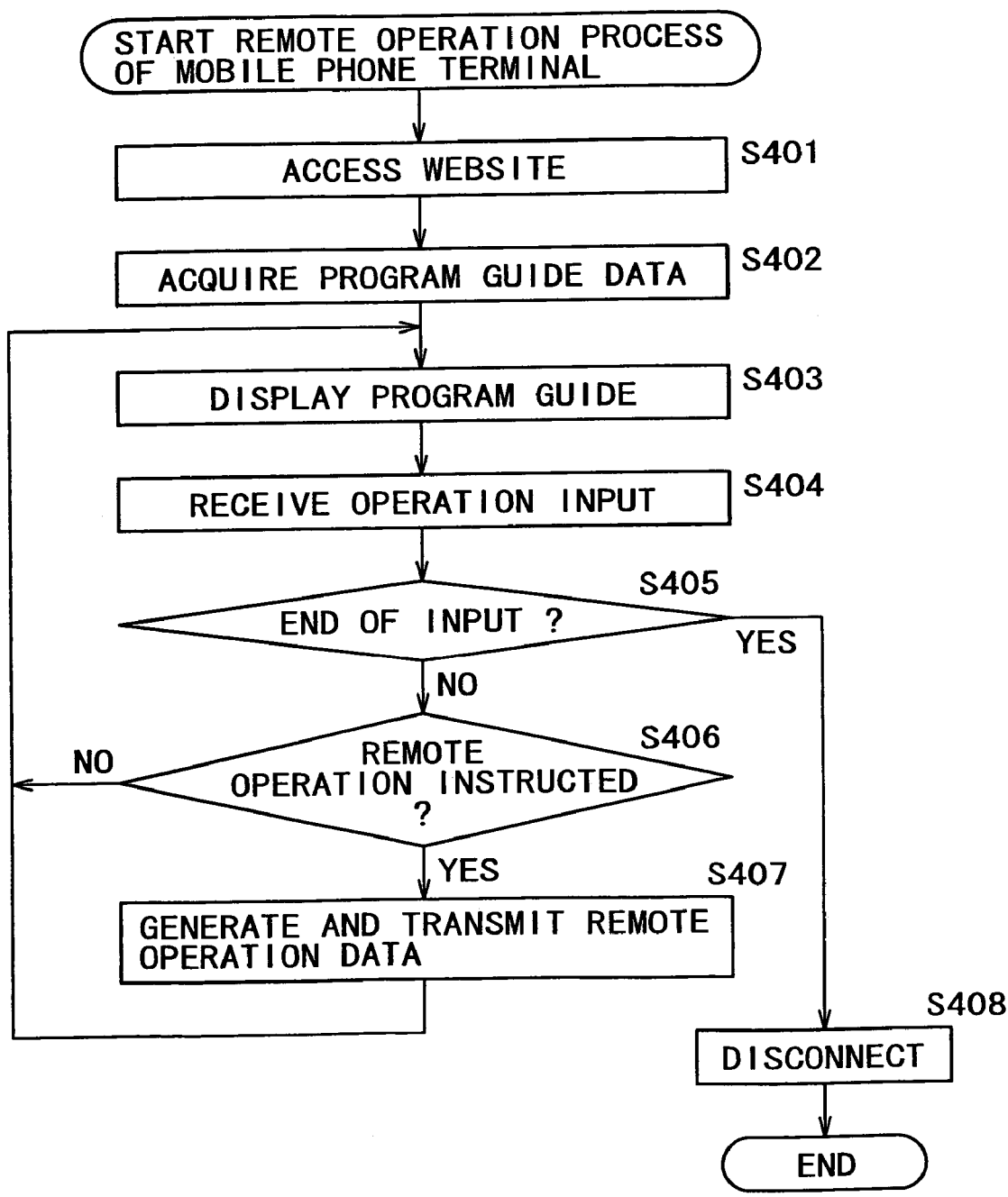
FIG. 28 is a flowchart of steps constituting a process of transmitting remote operation data for unattended recording reservation performed by the mobile phone terminal 1002.
Figure 29:
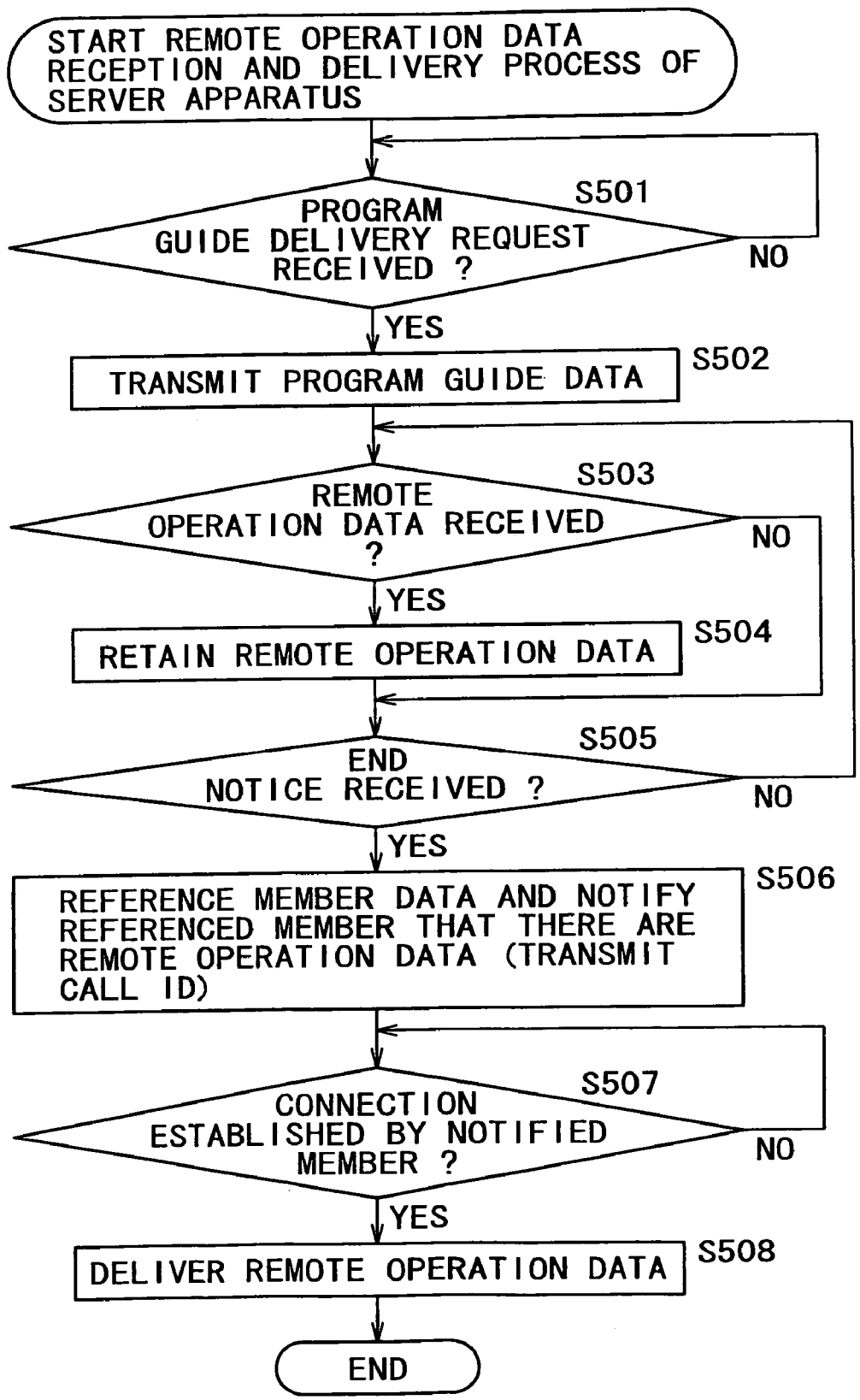
FIG. 29 is a flowchart of steps constituting operations performed by the server apparatus 1 when receiving remote operation data from the mobile phone terminal 1002.
Figure 30:
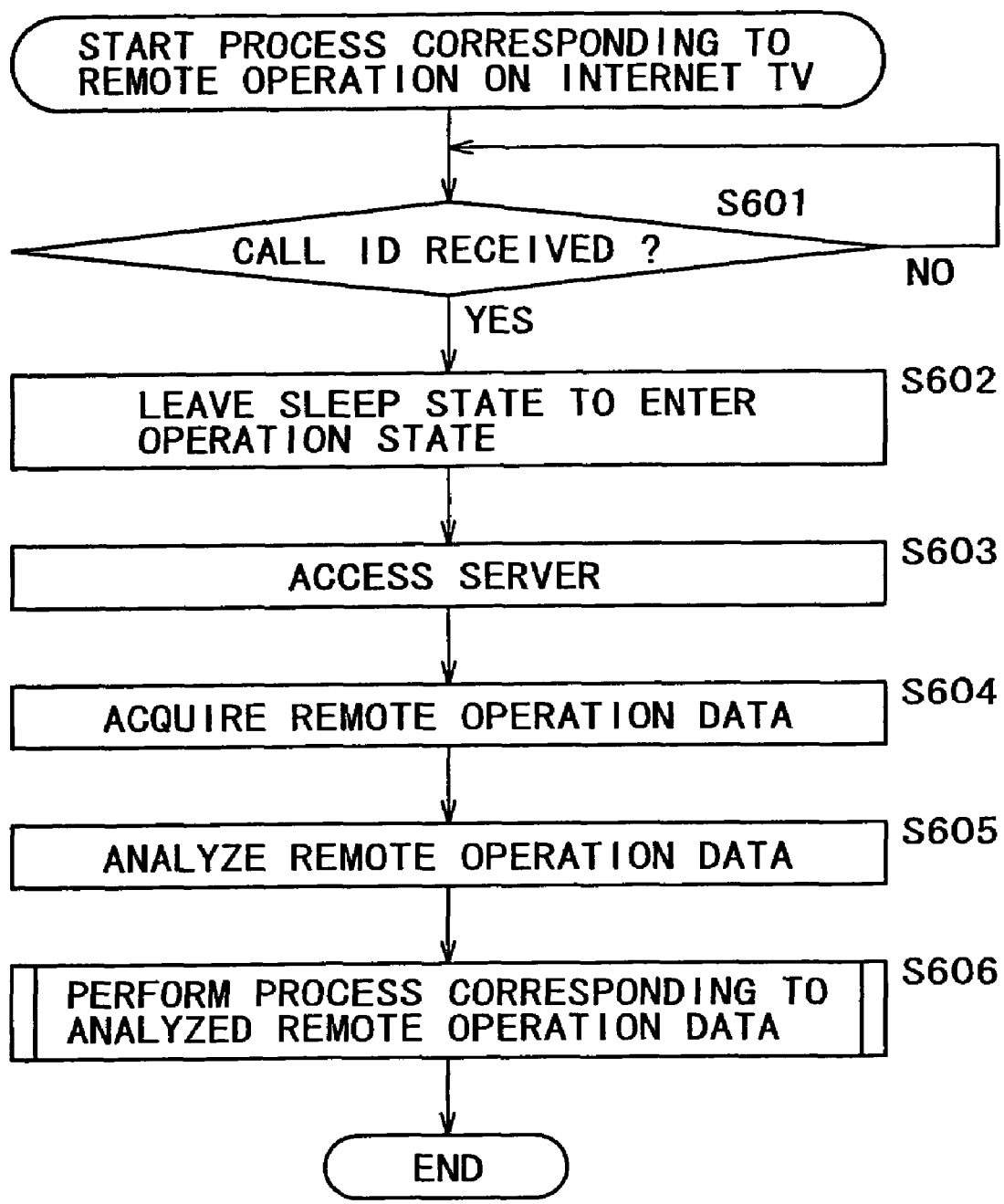
FIG. 30 is a flowchart of steps constituting operations performed by the Internet TV set 1003 when receiving remote operation data RE from the mobile phone terminal 1002 via the server apparatus 1001.
Figure 31:
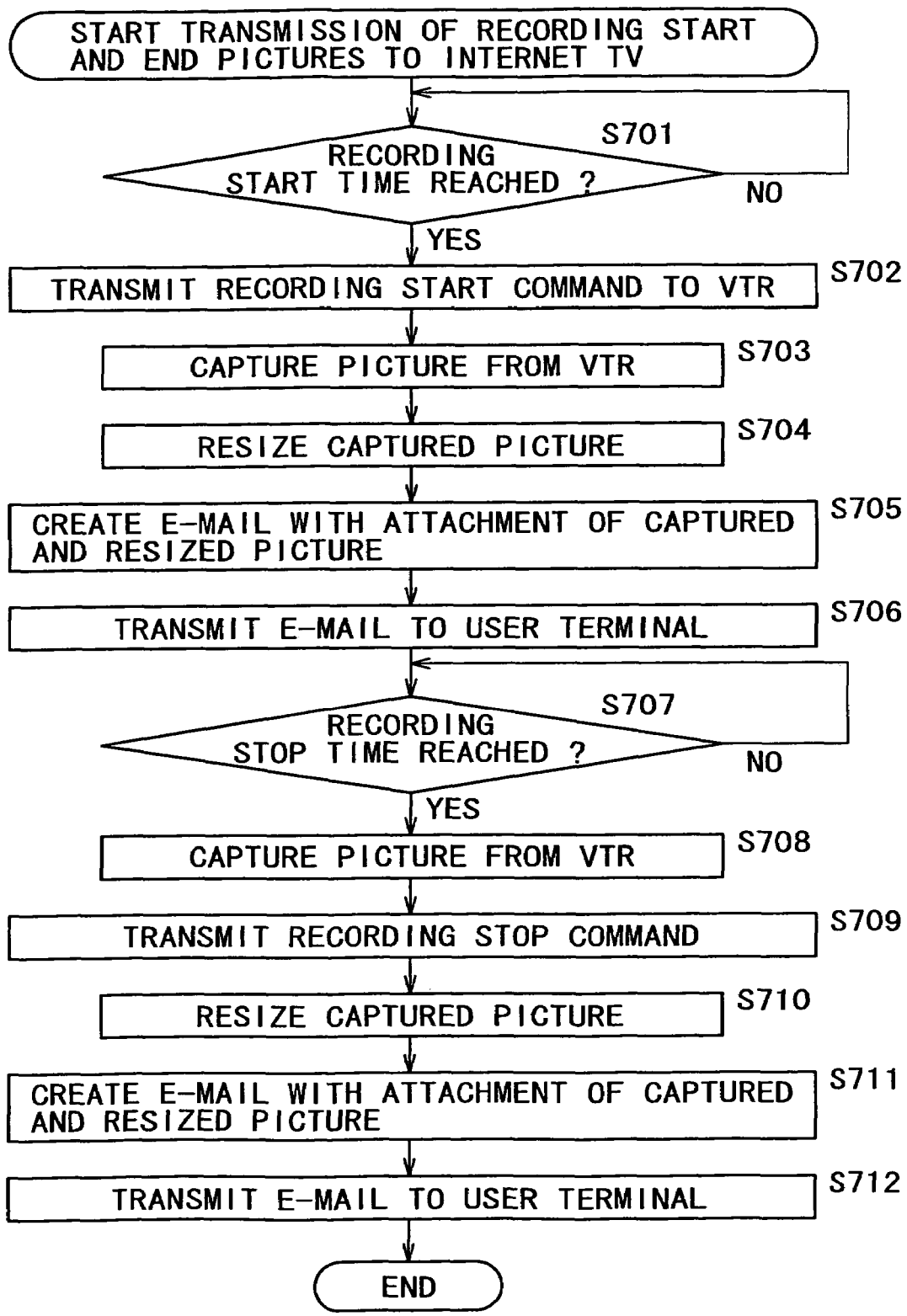
FIG. 31 is a flowchart of steps constituting operations performed by the Internet TV set 1003 in step S406 of FIG. 30.
Figure 32:
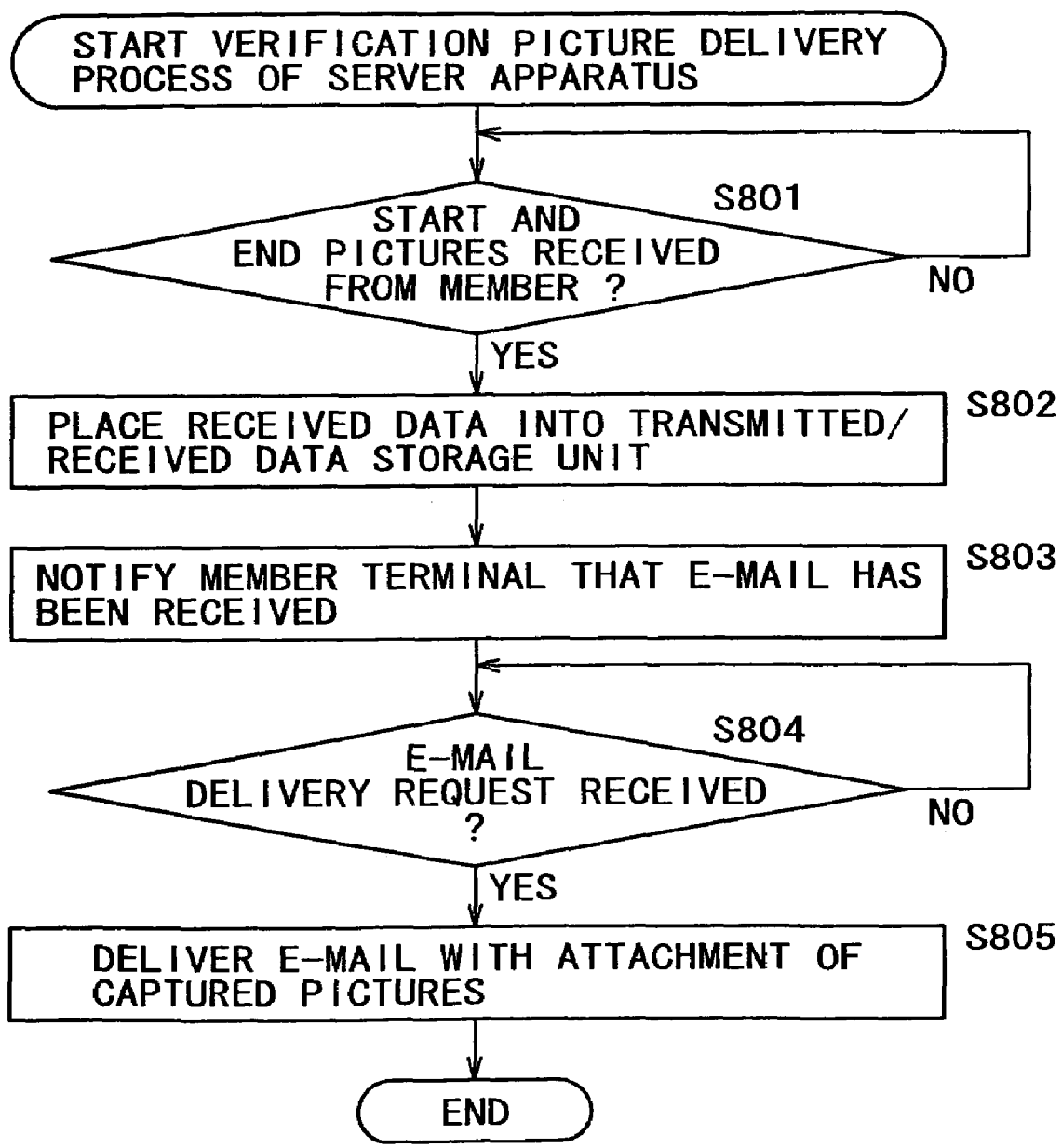
FIG. 32 is a flowchart of steps constituting operations performed by the server apparatus 1001 when receiving start verification data and stop verification data.
Figure 33:
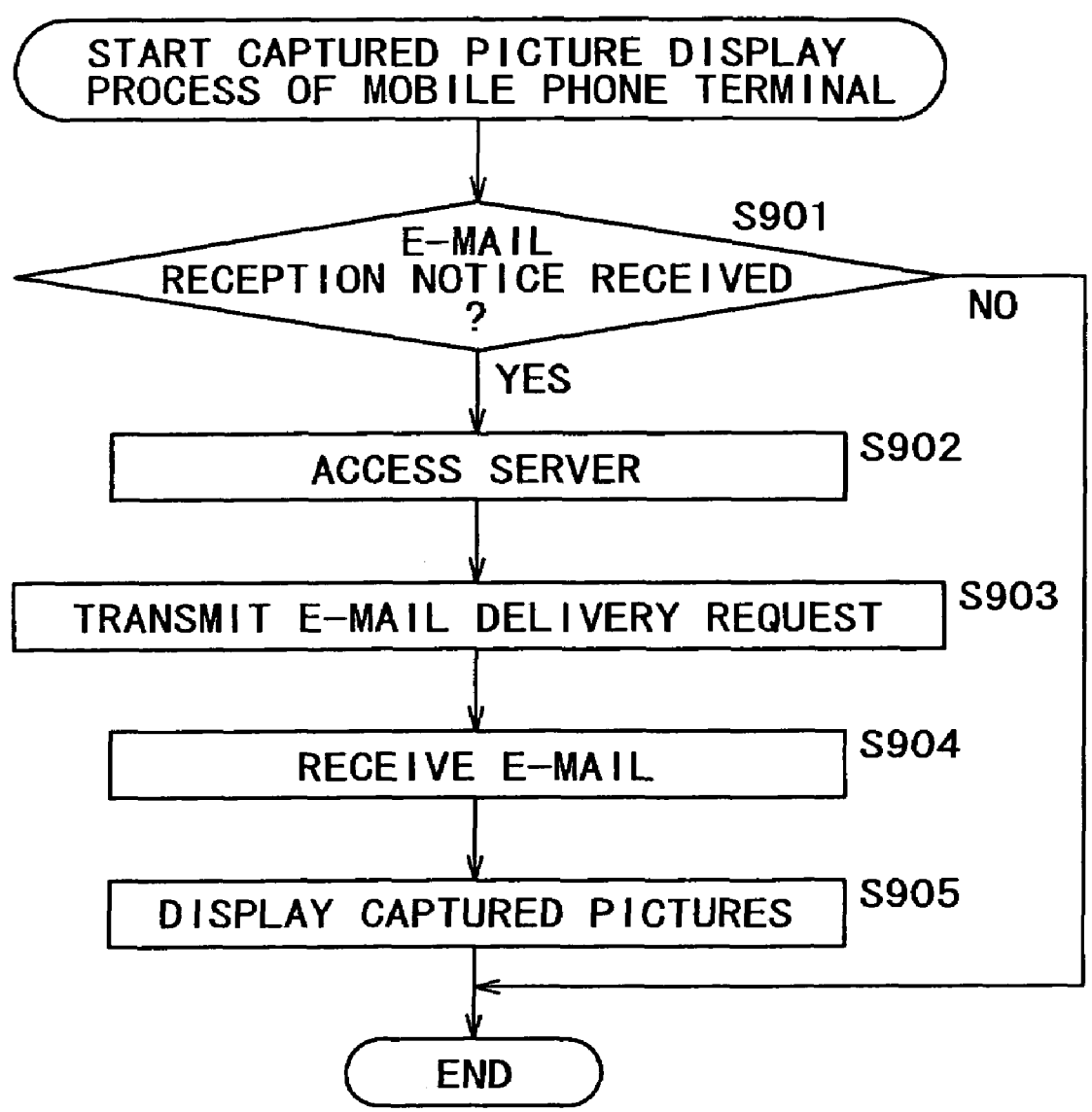
FIG. 33 is a flowchart of steps constituting operations performed by the mobile phone terminal 1002 when receiving a verification data reception notice (SE notice) in the form of an e-mail reception notice.

FIG. 28 is a flowchart of a remote operation process performed by the mobile phone terminal 1002; FIG. 29 is a flowchart of a process performed by the server apparatus 1001 receiving remote operation data from the mobile phone terminal 1002; FIG. 30 is a flowchart of a process performed by the Internet TV set 1003 receiving remote operation data from the server apparatus 1001; FIG. 31 is a flowchart of a process performed by the Internet TV set 1003 returning results of control on the VTR 1005; FIG. 32 is a flowchart of a process performed by the server apparatus 1001 relaying the results of control from the Internet TV set 1003; and FIG. 33 is a flowchart of a process performed by the mobile phone terminal 1002 receiving the results of control.

Described below with reference to FIG. 28 is the process carried out by the mobile phone terminal 1002 transmitting remote operation data for unattended recording reservation. More specifically, the process of FIG. 28 is executed by the control unit 1220 of the mobile phone terminal 1002 when the mobile phone user suitably operates the key operation unit 1230 to receive program guide data from the server apparatus 1001.

The control unit 1220 first connects to the server apparatus 1001 through the base station 1011, public communication network 1010, ISP server 1030 and the Internet 1020. The control unit 1220 then sends the URL of a relevant website in order to access the website in question held in the server apparatus 1001 offering the program guide data (step S401).

By way of the accessed website, the control unit 1220 transmits a program guide data delivery request RQ to the server apparatus 1001. In response to the request, the server apparatus 1001 returns program guide data PG. The returned program guide data PG are received by the control unit 1220 and placed into the EEPROM 1224 (step S402).

Using the program guide data PG placed in the EEPROM 1224 in step S402, the control unit 1220 causes the media controller 1209 to display a corresponding program guide on the LCD 1210 (step S403). The program guide is resized here to fit into the display screen of the mobile phone terminal 1002.

After getting the program guide displayed in step S403, the control unit 1220 of the mobile phone terminal 1002 receives the user's operation input through the key operation unit 1230 (step S404). In step S404, diverse kinds of operation input are received, such as a remote operation instruction, an input end instruction, and a program guide scroll instruction. The control unit 1220 determines whether the user's input end instruction is received through the key operation unit 1230 (step S405).

If in step S405 the input end instruction is not found to be received, the control unit 1220 determines whether the remote operation instruction is received (step S406). If the remote operation instruction is found to be received, the control unit 1220 generates remote operation data RE corresponding to the received instruction and transmits the generated data RE to the server apparatus 1001 (step S407).

When step S407 is completed, or if the remote operation instruction is not found to be received in step S406, then step S403 and the subsequent steps are repeated. If in step S405 the user's input end instruction is found to be received through the key operation unit 1230, the control unit 1220 of the mobile phone terminal 1002 notifies the server apparatus 1001 that the use of the web page in question has ended, and causes the server apparatus 1001 to sever the connection with the Internet 1020 (step S408). This completes the process in FIG. 28.

As described, the mobile phone terminal 1002 of this embodiment acquires the program guide data in accordance with the user's instructions and presents the mobile phone user with a program guide display on the LCD 1210 of the mobile phone. Given the program guide display on the LCD 1210, the user may illustratively give a remote operation instruction to specify unattended recording reservation on the VTR 1005. Upon receiving the instruction, the mobile phone terminal 1002 generates remote operation data reflecting the received instruction and transmits the generated data to the server apparatus 1001.

Illustratively, the program guide display on the LCD 1210 of the mobile phone terminal 1002 may be scrolled crosswise and lengthwise. Viewing the display, the phone user may select a desired broadcast program and have the selected broadcast program reserved for unattended recording through simple operations.

Described below with reference to FIG. 29 are the workings of the server apparatus 1001 receiving remote operation data from the mobile phone terminal 1002. The process of FIG. 29 is performed by the control unit 1100 of the server apparatus 1001 when, in response to a request from the mobile phone apparatus 1002, the control unit 1100 provides a web page through which to offer program guide data PG to the mobile phone and to receive remote operation data RE therefrom.

The control unit 1100 waits for a program guide delivery request RQ to arrive from the mobile phone terminal 1002 to which the web page has been provided (step S501). If in step S501 the program guide delivery request RQ is found to be received from the mobile phone terminal 1002 via the network communication unit 1105, the control unit 1100 retrieves the requested program guide data PG from the program guide database 1107 and transmits the retrieved data PG to the requesting mobile phone terminal 1002 through the network communication unit 1105 and the Internet 1020 (step S502).

The control unit 1100 of the server apparatus 1001 determines whether remote operation data RE have been received from the mobile phone terminal 1002 via the network communication unit 1105 (step S503). If in step S503 the remote operation data RE are found to be received from the mobile phone terminal 1002, the control unit 1100 retains the received data RE in the transmitted/received data storage unit 1109 (step S504). A check is then made to see if a web page use end notice is received from the mobile phone terminal 1002 (step S505).

If in step S505 the use end notice is not found to be received from the mobile phone terminal 1002, the control unit 1100 repeats step S503 and the subsequent steps.

If in step S505 the use end notice is found to be received from the mobile phone terminal 1002, the control unit 1100 references the member database 1108 to identify the destination to which to offer the remote operation data currently retained in the transmitted/received data storage unit 1109. The control unit 1100 places a call to the identified destination which, in this case, is the Internet TV set 1003 through the public communication unit 1106 and public communication network 1010. The call notifies the Internet TV set 1003 (i.e., RE notice) that the TV set-bound remote operation data have arrived (step S506).

The control unit 1100 of the server apparatus 1001 waits for the Internet TV set 1003 to access the server apparatus 1100 through the public communication network 1010 and the Internet 1020 in order to acquire the remote operation data RE bound for the TV set (step S507). At the time of access by the Internet TV set 1003, the control unit 1100 offers the Internet TV set 1003 the remote operation data RE that came from the mobile phone terminal 1002 used as a remote controller for the TV set 1003 (step S508). This completes the process of FIG. 29 performed by the control unit 1100 of the server apparatus 1001.

As described, the server apparatus 1001 of this embodiment offers the program guide data PG in response to the request from the mobile phone terminal 1002, and retains the remote operation data RE sent from the mobile phone terminal 1002 for transfer to the phone user's Internet TV set 1003 installed in his or her household. In response to the request from the Internet TV set 1003, the server apparatus 1001 reliably offers the TV set 1003 the remote operation data RE destined for the. TV set from the mobile telephone terminal 1002.

Described below with reference to FIG. 30 are the workings of the Internet TV set 1003 receiving the remote operation data RE from the mobile phone terminal 1002 via the server apparatus 1001.

While power is being removed, the Internet TV set 1003 of this embodiment is placed in a sleep state in which only the essential parts remain active, i.e., the communication processor 1322, remote controller signal receiver 1347, and control unit 1340 for controlling the two parts.

Upon entering the sleep state, the control unit 1340 of the Internet TV set 1003 starts performing the process shown in FIG. 30. The control unit 1340 initially waits for the server apparatus 1001 to send in a call ID (i.e.; as an RE notice)(step S801). If in step S801 the call ID (RE notice) destined for the Internet TV set 1003 is found to be received from the server apparatus 1001 via the communication processor 1322, the control unit 1340 leaves the sleep state and enters an operation state (step S803). In accordance with the Internet connection setting information held in the EEPROM 1344, the control unit 1340 gains access to the server apparatus 1001 through the communication processor 1322, public communication network 1010, ISP server 1030, and the Internet 1020 (step S803).

The control unit 1340 transmits a request to the server apparatus 1001 asking for the delivery of the remote operation data RE destined for the TV set 1003, and receives from the server apparatus 1001 the TV set-bound data RE that came from the mobile phone terminal 1002 (step S804). The control unit 1340 of the Internet TV set 1003 analyzes the acquired remote operation data RE (step S805). With the remote operation data RE analyzed, the control unit 1340 performs a control process on the VTR 1005 accordingly (step S806). This completes the process shown in FIG. 30.

Described below with reference to FIG. 31 is the control process performed on the VTR 1005 in step S806 of FIG. 30 in keeping with the remote operation data RE. With this embodiment, the process of step S806 is carried out by the Internet TV set 1003 making an unattended recording reservation on the VTR 1005.

In this example, the remote operation data RE constitute a recording reservation request as mentioned above. The control unit 1340 of the Internet TV set 1003 thus checks the current time of the clock circuit 1346 to determine whether the recording start time designated by the data RE is reached (step S701).

If in step S701 the recording start time is found to be reached, the control unit 1340 transmits to the VTR 1005 a remote controller signal containing a recording start command via the remote controller signal generator 1345 and AV mouse 1004, the command being arranged to activate the VTR 1005 and prompt it to start recording a broadcast program on the designated broadcast channel. Given the recording start command, the VTR 1005 starts recording the designated broadcast program.

The control unit 1340 of the Internet TV set 1003 switches the selector 1304 to get the signal from the external interface unit 1332 forwarded to the downstream circuits, and causes the capture processor 1307 to capture a single-frame picture out of the signal from the VTR 1005 (step S703). That is, step S703 is the process of capturing a recording start picture indicative of the start of the recording.

With the recording start picture captured by the capture processor 1307, the control unit 1340 places the captured picture illustratively into the EEPROM 1344 or RAM 1343, and gets the picture resized to fit into the screen on the LCD 1210 of the mobile phone terminal 1002 (step S704).

Thereafter, the control unit 1340 of the Internet TV set 1003 creates an e-mail (start verification data SE) addressed to the mobile phone terminal 1002 together with an attachment of the resized recording start picture (step S705). With the Internet 1020 accessed via the public communication network 1010 and ISP server 1030, the control unit 1340 transmits the e-mail to the server apparatus 1001 having the mail box for the mobile phone terminal 1002, and severs the connection (step S706).

The control unit 1340 of the Internet TV set 1003 then checks the current time of the clock circuit 1346 to determine whether the recording stop time designated by the remote operation data RE from the mobile phone terminal 1002 is reached (step S707).

If in step S707 the recording stop time is found to be reached, the control unit 1340 switches the selector 1304 to get the signal from the external interface unit 1332 forwarded to the downstream circuits, and causes the capture processor 1307 to capture a picture out of the broadcast signal coming from the VTR 1005 (step S708). That is, step S708 is the process of capturing a recording end picture indicative of the end of the recording.

As with the above-mentioned recording start picture, the captured recording end picture is placed into the EEPROM 1344 or ROM 1343. The control unit 1340 transmits to the VTR 1005 a remote controller signal containing a recording stop command via the remote controller signal generator 1345 and AV mouse 1004, the command being arranged to have the VTR 1005 stop recording the broadcast program and to deactivate the device. Given the recording stop command, the VTR 1005 stops recording the designated broadcast program.

The control unit 1340 of the Internet TV set 1003 resizes the captured picture held in the EEPROM 1344 or RAM 1343 so that the picture will fit into the screen on the LCD 1210 of the mobile phone terminal 1002 (step S710).

After that, the control unit 1340 of the Internet TV set 1003 creates an e-mail (stop verification data SE) addressed to the mobile phone terminal 1002 together with an attachment of the resized recording end picture (step S711). With the Internet 1020 accessed via the public communication network 1010 and ISP server 1030, the control unit 1340 transmits the e-mail to the server apparatus 1001 having the mail box for the mobile phone terminal 1002, and severs the connection (step S712).

As described, the Internet TV set 1003 can control the VTR 1005 in accordance with the remote operation data coming from the mobile phone terminal 1002. With the recording start picture and recording end picture acquired as result information derived from the executed control, the Internet TV set 1003 can transfer the pictures to the mobile phone terminal 1002 via the server apparatus 1001. This allows the user of the mobile phone terminal 1002 to ascertain that the VTR 1005 at home has operated normally and has recorded the desired broadcast program as reserved.

Described below with reference to FIG. 32 are the workings of the server apparatus 1001 receiving start verification and stop verification data. Through the network communication unit 1105, the server apparatus 1001 checks continuously whether any outgoing data to be forwarded (i.e., e-mail data) to any member terminal such as the mobile phone terminal 1002 are received (step S801). If any outgoing data addressed to a member terminal are found to be received, the received data are placed into the transmitted/received data storage unit 1109 (step S802).

The control unit 1100 of the server apparatus 1001 then places a call over the public communication network 1010 to the member terminal identified as the destination of the data placed in the transmitted/received data storage unit 1109 (step S803). The call serves as an e-mail reception notice (i.e., SE notice). The control unit 1100 then waits for an e-mail delivery request to arrive from the notified member terminal (step S804).

The member terminal later accesses the server apparatus 1001 via the Internet 1020 to make an e-mail delivery request. In response, the control unit 1100 of the server apparatus 1001 transmits the verification data SE together with the captured pictures from the transmitted/received data storage unit 1109 to the mobile phone terminal 1002, i.e., the requesting member terminal (step S805).

In the manner described, the verification data SE together with the captured pictures are provided by the Internet TV set 1003 to the mobile phone terminal 1002 by way of the server apparatus 1001.

Described below with reference to FIG. 33 are the workings of the mobile phone terminal 1002 which, upon receiving a verification data reception notice (SE notice) in the form of an e-mail, proceeds to acquire the verification data destined for the mobile phone in response.

In its wait state, the control unit 1220 of the mobile phone terminal 1002 may detect a call addressed to the phone. In that case, the control unit 1220 starts carrying out the process of FIG. 33. The control unit 1220 first checks to see whether the received call is an e-mail reception notice (SE notice) from the server apparatus 1001 (step S901). If in step S901 the call is not found to be an e-mail reception notice from the server apparatus 1001, then the control unit 1220 terminates the process of FIG. 33 and proceeds to execute some other ordinary process of the mobile phone terminal such as the process of responding to an incoming call.

If in step S901 the received call is found to be an e-mail reception notice (SE notice) from the server apparatus 1001, the control unit 1220 accesses the server apparatus 1001 through the Internet 1020 and transmits an e-mail delivery request (i.e., verification data delivery request) to the server 1001 asking for the delivery of the verification data (step S903).

In response to the e-mail delivery request, the server apparatus 1001 transmits e-mail data constituting the verification data SE addressed to the mobile phone terminal 1002. The mobile phone terminal 1002 receives the verification data SE and places the received data illustratively into the EEPROM 1344 (step S904). Based on the verification data placed in the EEPROM 1344, the mobile phone terminal 1002 causes the media controller 1209 to display the captured pictures on the LCD 1210 (step S905). This completes the process in FIG. 33.

The captured pictures displayed on the mobile phone terminal 1002 allow its user to verify clearly and reliably that the VTR 1005 has operated normally in accordance with the remote operation data transmitted earlier.

In the network system of this embodiment, as described, the mobile phone terminal 1002 is used simply and dependably to control the VTR 1005 at a remote location. The Internet TV set 1003 and VTR 1005 are the only electrical equipment to be set up in the household; there is no need to configure a more complicated system.

The Internet TV set 1003 and VTR 1005 installed in the household need not be powered at all times for remote control purposes. These devices may be placed in what is known as the wait state ready to be activated when given instructions. This arrangement minimizes wasteful power dissipation of the configured devices.

With this embodiment, the Internet TV set 1003 captures a recording start picture and a recording end picture and transmits the captured pictures to the mobile phone terminal 1002 indicating whether the VTR 1005 has operated normally in keeping with the remote operation data RE sent by the mobile phone. The user of the mobile phone terminal 1002, by viewing the display on the phone, can ascertain whether the VTR 1005 has operated normally in response to the remote operation data RE sent earlier from the phone.

The communication between the mobile phone terminal 1002 and the server apparatus 1001 takes place basically over the Internet 1020. This ensures that communication costs are kept minimal when the user away from home remotely controls the VTR 1005 using the mobile phone.

Although the embodiments above were shown having unattended recording reservations set by remote control, this is not limitative of the invention. The remote control operations may alternatively involve giving instructions individually for starting and stopping reproduction, rewind, fast forward, and recording. In such cases, particularly where a reproduction or a recording start instruction is given, pictures may also be extracted for verification from the broadcast signal being reproduced or recorded.

The operations above allow the user illustratively to check the recorded content of the currently loaded video tape in the VTR 1005 and, after positioning the video tape to its blank area while skipping the recorded portion, to start having additional programs recorded onto the blank tape area.

In the above-described embodiments, the captured recording start and recording stop pictures were shown resized by the Internet TV set 1003. Alternatively, the captured pictures may be transferred to the server apparatus 1001 whereby the pictures may be resized for subsequent uses.

Although the embodiments above were shown having pictures captured from the signal coming from the VTR 1005, this is not limitative of the invention. Alternatively, pictures may be captured from the broadcast signal received by the Internet TV set 1003 at the start and the end of recording by the VTR 1005 for use as a recording start picture and a recording end picture.

As another alternative, pictures provided by the signal broadcast over the channel designated for recording may be captured for verification purposes.

As described, where pictures are not captured from the signal coming from the VTR 1005, pictures may be captured in alternative fashion from the broadcast signal being recorded as reserved, as long as the pictures are captured in synchronism with the start and the end of the recording and indicate that the VTR 1005 has operated normally in accordance with the remote control data RE.

In the above-described embodiments, the Internet TV set 1003 were shown having the capability of making unattended recording reservations. That is, the Internet TV set 1003 sends a recording start command and a recording stop command to the VTR 1005 at a recording start time and at a recording stop time respectively as reserved. The VTR 1005 then acts as commanded to accomplish the reserved recording. However, this is not limitative of the invention. An unattended recording reservation capability of the VTR 1005 may be utilized instead.

The recording reservation capability of the VTR 1005 may be used as follows: a power-on remote controller signal is first transmitted to the VTR 1005 to activate the device. Then a remote controller signal containing a broadcast date, a broadcast channel, a recording start time, and a recording stop time reflecting the remote operation data RE is sent from the Internet TV set 1003 to the VTR 1005. Thereafter a power-off remote controller signal is transmitted to the VTR 1005 to deactivate the device.

The procedure above completes the unattended recording reservation on the VTR 1005. When the designated recording start time is reached, the VTR 1005 with its recording reservation capability starts recording the broadcast program over the designated channel; at the designated recording stop time, the VTR 1005 stops the recording as reserved. This arrangement offers the advantage of reducing the frequency of remote controller signal transmissions from the Internet TV set 1003 to the VTR 1005.

In the preceding example where the recording reservation capability of the VTR 1005 is utilized, pictures may also be captured for verification. That is, a recording start picture may be captured from the signal coming from the VTR 1005 immediately after the recording start time, and a recording end picture may be captured in like manner just before the recording stop time is reached.

In the embodiments above, the unattended recording reservation was shown carried out with the recording start and end pictures used captured as a representative result of the remote control. Alternatively, text message information such as "The recording has started" and "The recording has ended" may be displayed on the display device for verification. As another alternative, these messages may be audibly announced.

It is also possible to mix text messages with an alarm sound, or to use solely the alarm sound or vibrations in order to announce the result of the control. There may be diverse forms in which to notify the mobile phone user of the result of the executed control, including text message display, voice information output, and vibrations.

In FIG. 22, only one mobile phone terminal 1002, one base station 1011, and one ISP server 1030 are shown. In practice, however, there exist a large number of mobile phone terminals 1002 used by a large number of users. A plurality of base stations 1011 are set up so that each base station covers a predetermined portion of the service area. In addition, many ISP servers 1030 are furnished by numerous Internet service providers. It is obviously possible for common carriers to take over the functions of the ISP servers.

It is also possible for the ISP server 1030 to take over the server apparatus 1001 in terms of providing the program guide data to users and mediating the communication between the mobile phone apparatus 1002 and the Internet TV set 1003. A large number of servers offering the functions of the server apparatus 1001 may be set up over the Internet 1020.

The server apparatus 1001 that was shown set up over the Internet 1020 in the above examples may be installed instead in the household along with the Internet TV set 1003 and VTR 1005, the server then acting as a home server for providing overall control on the electronic equipment established therein. In this case, the mobile phone terminal 1002 and the home server taking over the functions of the server apparatus 1001 are connected to a wide area network such as the Internet, while the home server is connected with the Internet TV set 1003 via a local area network.

It is also possible to have the Internet TV set 1003 function as a home server taking over the capabilities of the server apparatus 1001.

The mobile phone terminal 1002 may communicate directly with the Internet TV set 1003 via the public communication network 1010 whereas the program guide data are offered by a suitable server apparatus. This setup has the advantage of letting the remote control operations be carried out more quickly, i.e., in a manner appreciably close to real-time control.

Although the embodiments above were shown using the mobile phone terminal 1002 for remote control purposes, this is not limitative of the invention. Alternatively, PDA's or other diverse portable information terminals with communication capabilities may each be utilized as a remote control device for remotely controlling the electronic equipment installed in the household.

Although the VTR 1005 was shown to be controlled remotely in the embodiments above, this is not limitative of the invention. The invention may be embodied alternatively so as to control remotely the recording/reproducing apparatus incorporating a hard disc drive, DVD recording/reproducing apparatus using a writable DVD (digital versatile disc) as a recording medium, personal computers, or other recording/reproducing apparatuses utilizing such diverse recording media as magnetic discs, magneto-optical discs or optical discs.

The Internet TV set 1003 may be connected to a plurality of recording/reproducing apparatuses that are individually subjected to remote control. In this setup, the multiple recording/reproducing apparatuses connected to the TV set are each given a unique ID for individualized control.

The electronic equipment to be controlled is not limited to recording/reproducing apparatuses. Many other kinds of electronic equipment including cameras, TV sets and radios installed indoors, as well as air conditioners and hot-water supply systems can be controlled by embodiments of this invention. In such setups, various kinds of information resulting from the control may be sent from the equipment being controlled to the user away from home for verification, e.g., pictures sent from the camera and TV set, voices from the radio, operation information such as a preset room temperature and the quantity of air from the air conditioner, and hot-water temperature from the hot-water supply system.

In the case of the second embodiment discussed above, the Internet TV set 1003 was shown acting as the control communication terminal controlling the target electronic equipment. However, this is not limitative of the invention. Alternatively, a personal computer connectable with an AV mouse or dedicated control communication equipment may be used to control the target electronic equipment.

As described, the second embodiment of the invention provides a simply-structured, relatively-inexpensive network system built on a wide area network and allowing target electronic equipment to be remotely controlled, wherein the configured devices are so structured as to economize on their power dissipation.

In the remote control setup implemented by the network system, users who have carried out remote control operations are later notified of symbolic results of their operations. This feature reassures the users that the network system is manifestly dependable.

INDUSTRIAL APPLICABILITY

The network system according to the invention allows the user away from a recording apparatus to reserve the recording of data in advance on the apparatus and to be notified of the reserved recording having been completed.

In the inventive system, portable communication terminals such as mobile phones and PDA's are allowed to receive diverse kinds of information about the configured recording/reproducing apparatuses. The communication terminals receive program guide data, display the received data for the users to make recording reservations thereby, and notify the users of an end of such reserved recording that has been completed.

To recapitulate, the Internet TV set 1003 was shown acting as the control communication terminal controlling the target electronic equipment. However, this is not limitative of the invention. Alternatively, a personal computer connectable with an AV mouse or dedicated control communication equipment may be used to control the target electronic equipment.

This invention provides a simply-structured, relatively-inexpensive network system built on a wide area network and allowing target electronic equipment to be remotely controlled, wherein the configured devices are so structured as to economize on their power dissipation.

In the remote control setup implemented by the network system, users who have carried out remote control operations are notified of symbolic results of their operations. This feature reassures the users that the network system is manifestly dependable.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A network control verification system, comprising:
   a portable communication terminal;
   an electronic apparatus connected to a communication network and that includes a recording apparatus;
   a control communication terminal connected over the communication network to said electronic apparatus, said electronic apparatus being controllable through said control communication terminal; and
   a server apparatus which is connected to the communication network and which mediates communication between said portable communication terminal and said control communication terminal;
   said portable communication terminal including:
      a control information transmitter for transmitting control information regarding said electronic apparatus over the communication network to said control communication terminal in response to receiving as user-inputted instruction regarding said electronic apparatus, the control information including at least one instruction requesting said electronic apparatus to receive a selected information signal over the network and record the information signal to a recording medium, and
      a displaying mechanism; and
   said control communication terminal including:
      a control information acquiring mechanism for receiving the control information regarding said electronic apparatus over the communication network from said portable communication terminal, and for supplying the received control information to said electronic apparatus,
   a result information acquiring mechanism for acquiring from said electronic apparatus result information representative of results of controlling said electronic apparatus in accordance with the control information, the result information including an image derived by said electronic apparatus capturing a picture directly from the information signal and then adjusting the picture for display on said display mechanism of said portable communication terminal, and
   a result information transmitter for transmitting the result information over the communication network to said portable communication terminal; said server apparatus including:
      an information notifying mechanism which, upon receiving the control information from said control information transmitter of said portable communication terminal, notifies said control communication terminal that the control information has been received,
      an information transmitter for transmitting the control information to said control communication terminal in response to a request from said control communication terminal to deliver the control information,
      a result notifying mechanism which, upon receiving the result information from said control communication terminal, notifies said portable communication terminal that the result information has been received, and
      a result transmitter for transmitting the result information to said portable communication terminal in response to a request from said portable communication terminal to deliver the result information;

said display mechanism of said portable communication terminal receiving the result information over the communication network from said control communication terminal and displaying the result information including the derived image.

2. A network control verification system according to claim 1, wherein the control information includes a recording start instruction, and said result information acquiring mechanism of said control communication terminal acquires information about the information signal at a time when the recording of the information signal is started.

3. A network control verification system according to claim 2, wherein the control information from said portable communication terminal includes a recording stop instruction, and said result information acquiring mechanism of said control communication terminal acquires information about the information signal at a time when the recording of the information signal is stopped.

4. A network control verification system according to claim 1, wherein the adjusting of the picture captured directly from the externally supplied information signal includes generating a resized thumbnail image.

5. A network control verification system, comprising:

a control communication terminal connected over a communication network to an electronic apparatus, the electronic apparatus being controllable by said control communication terminal in accordance with control information transmitted from a portable communication terminal over the communication network, the electronic apparatus including a recording apparatus; and a server apparatus which is connected to the communication network and which mediates communication between said portable communication terminal and said control communication terminal;

said control communication terminal comprising:

a control information receiving mechanism for receiving control information regarding the electronic apparatus from the portable communication terminal, the control information including at least one instruction requesting said electronic apparatus to receive a selected information signal over the network and record the information signal to a recording medium, a control information supplying mechanism for supplying the received control information to the electronic apparatus, a result information acquiring mechanism for acquiring from the electronic apparatus result information representative of results of controlling the electronic apparatus in accordance with the control information, the result information including an image derived by the electronic apparatus capturing a picture directly from the information signal and then adjusting the picture for display on said display mechanism of said portable communication terminal; and a result information transmitter for transmitting the result information acquired by said result information acquiring mechanism to the portable communication terminal, including the derived image; said server apparatus comprising:

an information notifying mechanism which, upon receiving the control information from the portable communication terminal, notifies said control communication terminal that the information has been received, an information transmitter for transmitting the control information to said control communication terminal in response to a request from said control communication terminal to deliver the control information, a result notifying mechanism which, upon receiving the result information from said control communication terminal, notifies said portable communication terminal that the result information has been received, and a result transmitter for transmitting the result information to said portable communication terminal in response to a request from said portable communication terminal to deliver the result information.

6. A control communication terminal according to claim 5, wherein the control information includes a recording start instruction, and said result information acquiring mechanism acquires information about the information signal at a time when the recording of the information signal is started.

7. A control communication terminal according to claim 5, wherein the control information from the portable communication terminal includes a recording stop instruction, and said result information acquiring mechanism acquires information about the information signal at a time when the recording of the information signal is stopped.

8. A control communication terminal according to claim 5, wherein the adjusting of the picture captured directly from the externally supplied information signal includes generating a resized thumbnail image.

9. A server apparatus of a network control verification system which includes a portable communication terminal, a control communication terminal, and said sewer apparatus which are connected to each other over a communication network, said sewer apparatus comprising:

an information receiving mechanism for receiving control information transmitted by the portable communication terminal over the communication network, the control information for controlling an electronic apparatus connected to the control communication terminal, the electronic apparatus including a recording apparatus, the control information including at least one instruction for requesting said electronic apparatus to receive a selected information signal over the network and record the information signal to a recording medium;

an information notifying mechanism for notifying the control communication terminal that the control information has been received;

an information transmitter for transmitting the control information over the communication network to the control communication terminal in response to a request from the control communication terminal to deliver the control information;

a result receiving mechanism for receiving over the communication network result information acquired by the control communication terminal from the electronic apparatus, the result information including an image derived by the electronic apparatus capturing a picture directly from the information signal and then adjusting the picture for display on said display mechanism of said portable communication terminal;

a result notifying mechanism for notifying the portable communication terminal over the communication network that the result information has been received; and a result transmitter for transmitting the result information over the communication network to the portable communication terminal in response to a request from the portable communication terminal to deliver the result information including the derived image.

10. A sewer apparatus according to claim 9, wherein the adjusting of the picture captured directly from the externally supplied information signal includes generating a resized thumbnail image.

11. A network control verification method for a system that includes a portable communication terminal and a control communication terminal connected to each other over a communication network and that includes a server apparatus which is connected to the communication network and which mediates communication between said portable communication terminal and said control communication terminal, said network control verification method comprising:

transmitting, from the portable communication terminal to the control communication terminal over the communication network, control information about an electronic apparatus connected to the control communication terminal in response to receiving user-inputted instruction regarding the electronic apparatus, the control information including at least one instruction requesting the electronic apparatus to receive a selected information signal over the network and record the information signal;

supplying the control information from the control communication terminal to the electronic apparatus;

acquiring, at the control communication terminal, result information from the electronic apparatus representative of results of controlling the electronic apparatus in accordance with the control information, the result information including an image derived by the electronic apparatus capturing a picture directly from the information signal and then adjusting the picture for display on said display mechanism of said portable communication terminal;

transmitting the result information from the control communication terminal over the communication network to the portable communication terminal;

receiving at the portable communication terminal, the result information; and displaying, by the portable communication terminal, the received result information including the derived image;

said network control verification method further comprising:

receiving, at the server apparatus, the control information transmitted by the portable communication terminal;

notifying, by the server apparatus the control communication terminal that the control information has been received;

transmitting, from the server apparatus the control information to the control communication terminal in response to a request from the control communication terminal to deliver the control information;

receiving, at the server apparatus the result information transmitted by the control communication terminal;

notifying, by the server apparatus the portable communication terminal that the result information has been received; and transmitting, from the server apparatus, result information to the portable communication terminal in response to a request from the portable communication terminal to deliver the result information.

12. A network control verification method according to claim 11, wherein the control information includes a recording start instruction, and said result information acquiring step performed by the control communication terminal includes acquiring information about the information signal in effect when the recording of the information signal is started.

13. A network control verification method according to claim 12, wherein the control information from the portable communication terminal includes a recording stop instruction, and said result information acquiring step performed by the control communication terminal includes acquiring information about the information signal in effect when the recording of the information signal is stopped.

14. A network control verification method according to claim 11, wherein the adjusting of the picture captured directly from the externally supplied information signal includes generating a resized thumbnail image.

* * * * *

UNITED STATES PATENT AND TRADEMARK OFFICE
CERTIFICATE OF CORRECTION

PATENT NO. : 7,516,203 B2
APPLICATION NO. : 10/498205
DATED : April 7, 2009
INVENTOR(S) : Toshiyuki Watanabe et al.

It is certified that error appears in the above-identified patent and that said Letters Patent is hereby corrected as shown below:

Column 41, line 48, after "the", delete ".".

Column 48, line 24, "as" should read --a--.

Column 50, line 30, "sewer" should read --server--.

Column 50, line 32, "sewer" should read --server--.

Column 51, line 1, "sewer" should read --server--.

Column 52, line 5, after "apparatus", insert --,--.

Column 52, line 8, after "apparatus", insert --,--.

Column 52, line 12, after "apparatus", insert --,--.

Column 52, line 14, after "apparatus", insert --,--.

Column 52, line 17, after "apparatus,", insert --the--.

Signed and Sealed this

Twenty-second Day of June, 2010

David J. Kappos
*Director of the United States Patent and Trademark Office*